US012367996B1

(12) United States Patent
Gabara

(10) Patent No.: US 12,367,996 B1
(45) Date of Patent: Jul. 22, 2025

(54) METHOD AND APPARATUS FOR MAGNETIC ARRANGEMENTS

(71) Applicant: Thaddeus Gabara, Murray Hill, NJ (US)

(72) Inventor: Thaddeus Gabara, Murray Hill, NJ (US)

(73) Assignee: MAGNOTIZE LLC, Murray Hill, NJ (US)

( * ) Notice: Subject to any disclaimer, the term of this patent is extended or adjusted under 35 U.S.C. 154(b) by 0 days.

(21) Appl. No.: 19/046,614

(22) Filed: Feb. 6, 2025

(51) Int. Cl.
*H01F 7/02* (2006.01)

(52) U.S. Cl.
CPC ......... *H01F 7/0242* (2013.01); *H01F 7/0221* (2013.01); *H01F 7/0236* (2013.01); *H01F 7/0247* (2013.01)

(58) Field of Classification Search
CPC .... H01F 7/0247; H01F 7/0221; H01F 27/306; H01F 7/206; H01F 7/0242; H01F 7/0236
See application file for complete search history.

(56) References Cited

U.S. PATENT DOCUMENTS 9,418,781 B2 * 8/2016 Kertsopoulos ........ H01F 7/0273
12,224,114 B2 * 2/2025 Gabara ................. H01F 7/0221
2006/0232369 A1 * 10/2006 Gorshkov ............ G01R 33/383 335/306
2009/0145229 A1 * 6/2009 Gabara ................... G01P 15/18 73/514.32
2009/0145631 A1 * 6/2009 Gabara ................... H01L 23/48 174/254
2009/0251242 A1 * 10/2009 Fullerton ............ H01L 27/0266 335/209
2009/0295521 A1 * 12/2009 Fullerton ............... G01D 18/00 335/306
2012/0068797 A1 * 3/2012 Lauder .................. G06F 1/1656 29/428
2012/0286912 A1 * 11/2012 Fullerton ............... H02K 49/10 335/306
2015/0170815 A1 * 6/2015 Kertsopoulos ....... G01R 33/383 335/306

* cited by examiner

*Primary Examiner* — Mohamad A Musleh

(57) ABSTRACT

A periodic arrangement of magnets are used to form structures that channel the potential energy that a magnet possesses into kinetic energy in a controlled fashion to perform some useful work or some function. One apparatus that performs a function is created from a pair of magnetic arrangements formed in a radial pattern around a central magnet and securing each arrangement within a disk that is fabricated from a non-magnetic material. The pair of disks can be manipulated which, in some cases, flips an upper disk 180 degrees and snaps to and overlays the lower disk.

20 Claims, 60 Drawing Sheets

Magnet Face exposed (0) or covered (1) with non-magnetic material

| | | | | | | | | | | | | | | | | |
|---|---|---|---|---|---|---|---|---|---|---|---|---|---|---|---|---|
| **Lower face of Upper magnet** | 0 | 1 | 0 | 1 | 0 | 1 | 0 | 1 | 0 | 1 | 0 | 1 | 0 | 1 | 0 | 1 |
| **Top face of Projectile Magnet** | 0 | 0 | 1 | 1 | 0 | 0 | 1 | 1 | 0 | 0 | 1 | 1 | 0 | 0 | 1 | 1 |
| **Bottom face of Projectile Magnet** | 0 | 0 | 0 | 0 | 1 | 1 | 1 | 1 | 0 | 0 | 0 | 0 | 1 | 1 | 1 | 1 |
| **Upper face of lower magnet** | 0 | 0 | 0 | 0 | 0 | 0 | 0 | 0 | 1 | 1 | 1 | 1 | 1 | 1 | 1 | 1 |
| | | | | | | | FIG. 2B; FIG. 1B | | | FIG. 2C; FIG. 1A | | | | | | FIG. 2A |

Table 1

FIG. 3A

Characteristics of magnet and magnetic chute system

| | Parameter | Value |
|---|---|---|
| Magnet | Type (disc) | N42 |
| | Diameter (mm) | 12.7 |
| | Thickness (mm) | 1.6 |
| System 1 | Configuration | 0110 |
| | Gap (mm) | 1.9 |
| | Chute Height | 6.0 |
| | Slab thickness | 0.0 |
| | Projectile thickness | 4.5 |
| | Projectile diameter | 32.9 |
| System 2 | Configuration | 1111 |
| | Gap (mm) | 1.9 |
| | Chute Height | 6.0 |
| | Slab thickness | 1.2 |
| | Projectile thickness | 2.3 |
| | Projectile diameter | 32.9 |
| System 3 | Configuration | 1111 |
| | Gap (mm) | 3.6 |
| | Chute Height | 7.7 |
| | Slab thickness | 2.9 |
| | Projectile thickness | 6.3 |
| | Projectile diameter | 32.9 |

Table 2

FIG. 3B

Perspective View of axially and diametrically magnetized magnets

Shapes of diametrically (top) and axially (bottom) magnetized magnets

Naming Convention of System

Perspective View

Top View

Top View

Can enter projectile along the path and experience sliding along 'well'

| Harmonic oscillator | | |
|---|---|---|
| Losses | Cause | Solution |
| Friction | Air molecules | Vacuum |
| Heat | Eddy currents | Superconductor wires |
| Noise | Not remaining balanced in well | Low temperature |

Table 3

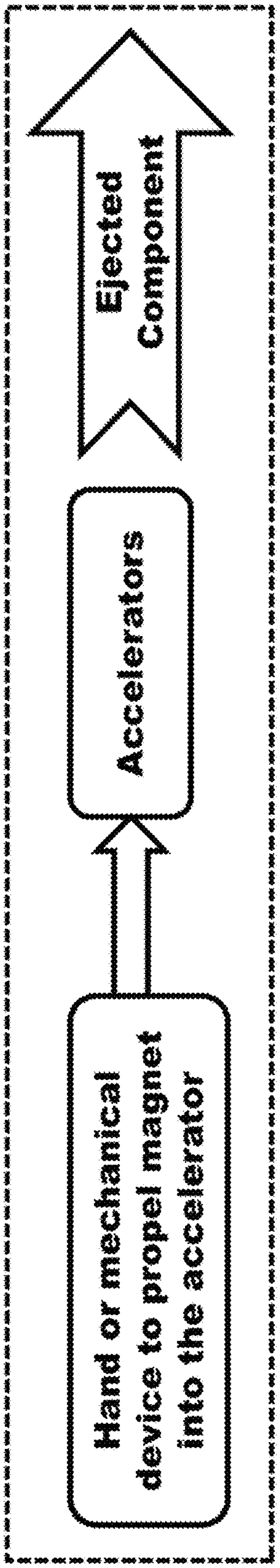
FIG. 26A Reusable Accelerator System
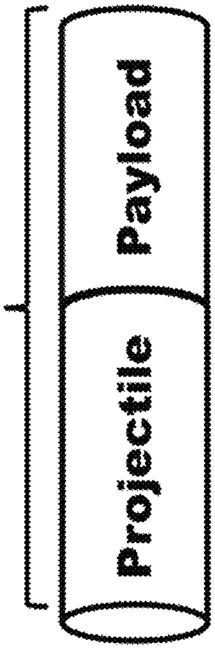
FIG. 26B Magnet accelerating payload
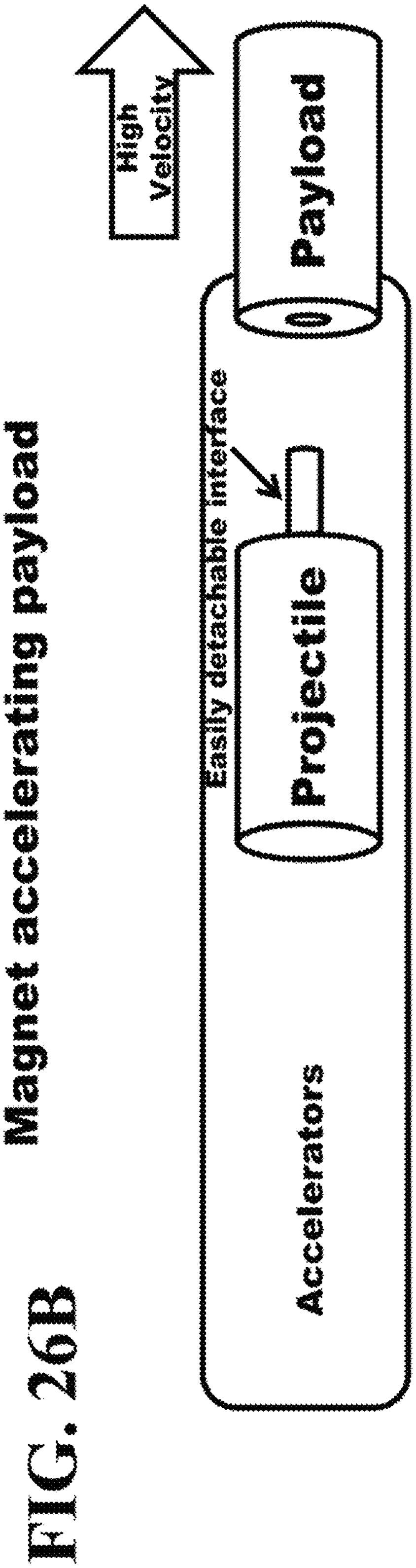
FIG. 26C Payload detaches after magnet is stopped

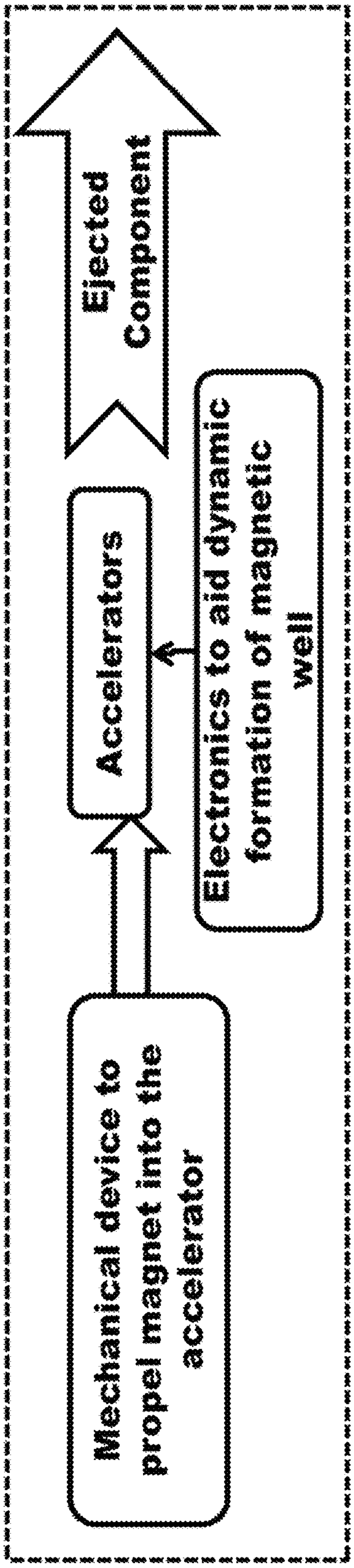
FIG. 27A Electronically Accelerator System
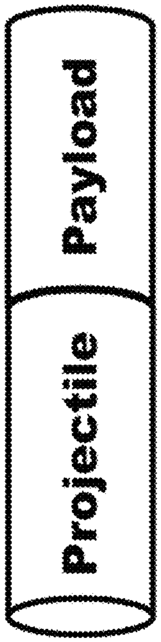
FIG. 27B Magnet accelerating payload
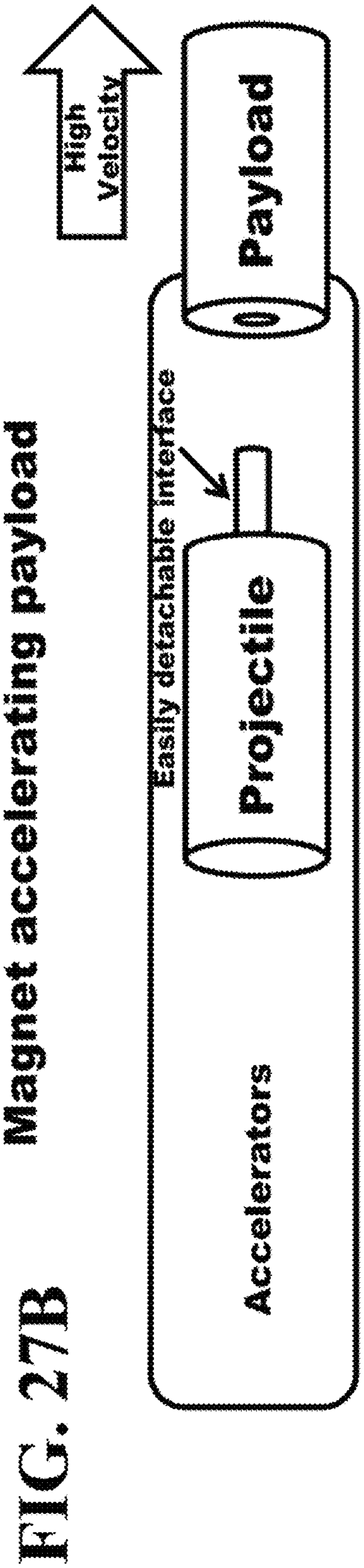
FIG. 27C Payload detaches after magnet is stopped

Feeling Snap of Rotational Magnetic disks

| Magnet | 32-1 | 28-1 |
|---|---|---|
| Type (disc) | N42 | N42 |
| Diameter (mm) | 12.7 | 12.7 |
| Thickness (mm) | 1.6 | 1.6 |
| Gap (mm) | 27.8 | 1.9 |

Table 4

| D (mm) | 32-1 | 28-1 |
|---|---|---|
| 2.4 | Very strong | Very strong |
| 5.5 | strong | strong |
| 8.6 | weak | Not discernable |
| 11.7 | Very weak | Not discernable |
| 16 | discernable | -- |

Table 5

Larger Rotational Magnetic disks

METHOD AND APPARATUS FOR MAGNETIC ARRANGEMENTS

RELATED APPLICATIONS

The present application is a continuation of the U.S. patent application Ser. No. 18/673,348 filed May 24, 2024, entitled METHOD AND APPARATUS FOR MAGNETIC ARRANGEMENTS, which claims the benefit and priority of the filing date of the U.S. patent application Ser. No. 18/519,216, filed Nov. 27, 2023, entitled METHOD AND APPARATUS FOR MAGNETIC ARRANGEMENTS, which claims the benefit and priority of the filing date of the U.S. patent application Ser. No. 18/077,274, filed Dec. 8, 2022, entitled METHOD AND APPARATUS FOR MAGNETIC ARRANGEMENTS, which further claims the benefit and priority of the filing date under 35 U.S.C. 119(e) of Provisional U.S. Patent Application Ser. No. 63/287,191, filed Dec. 8, 2021, entitled METHOD AND APPARATUS FOR MAGNETIC CHUTES, whereby the three earlier applications are invented by the at least one common inventor as the present application and all earlier applications are hereby incorporated by reference in their entirety.

BACKGROUND OF THE INVENTION

Magnets present interesting properties to a user. Configured one way, two magnets repel one another; configured another way, they attract. The mysterious power of the magnet can be exploited by assembling the magnets into various physical configurations that offer interesting qualities and properties.

BRIEF SUMMARY OF THE INVENTION

One of the inventive embodiments of this invention is using a periodic arrangement of magnets to form structures that channel the potential energy that a magnet possesses into kinetic energy in a controlled fashion to perform some useful work or function. One function is to create a magnetic chute that converts the potential energy of a magnetic projectile into kinetic energy that is used to channel the projectile to follow a path achieving high velocities along a path. The path is formed by assembling magnets periodically along the path in a certain fashion to create a magnetic chute that allows the magnetic projectile to slide easily along the path since the projectile is confined by the shape of the magnetic chute.

In one embodiment, a magnetic arrangement comprising: a lower planer surface; an upper planar surface substantially parallel to and separated by a clearance from said lower planer surface; a first plurality of magnets periodically placed and positioned on a line within said lower planar surface, wherein edges of adjacent magnets are separated by a gap, and a second plurality of magnets positioned on said upper planar surface substantially superimposed over said first plurality of magnets, wherein all magnets are axially magnetized and have their magnetic poles aligned in the same direction, wherein said arrangement is configured to convert potential energy into kinetic energy.

In another embodiment, a magnetic arrangement comprising: a lower planer surface; an upper planar surface substantially parallel to and separated by a clearance from said lower planer surface; a center of a first face of each magnet of a first plurality of magnets is positioned and placed on a line within said lower planar surface; a gap separates each pair of edges of adjacent magnets; and a center of each of a second plurality of magnets positioned on said upper planar surface substantially superimposed over said center of said first plurality of magnets, wherein all magnets are axially magnetized and have their magnetic poles aligned in the same direction, wherein said arrangement is configured to convert potential energy into kinetic energy.

In another embodiment, a magnetic arrangement comprising: a lower planer surface; an upper planar surface substantially parallel to and separated by a vertical height from said lower planer surface; a center of a face of each magnet of a first plurality of magnets is positioned along a line on said lower planar surface; a magnetic moment of each said magnet of said first plurality of magnets points perpendicular to said line on said lower planar surface; a gap separates each pair of edges of adjacent magnets; and a center of a face of each magnet of a second plurality of magnets positioned on said upper planar surface substantially superimposed over said center of said first plurality of magnets, wherein all magnets of said first and second pluralities of magnets have their said magnetic moments parallel aligned in the same direction, wherein said arrangement is configured to convert potential energy into kinetic energy.

In another embodiment, a magnetic arrangement comprising: a lower planer non-magnetic slab; an upper non-magnetic slab substantially parallel to and separated by a chute height from said lower planer non-magnetic slab; a center of a face of each magnet of a first plurality of magnets positioned along a line on a lower surface of said lower non-magnetic slab; a magnetic moment of each said magnet of said first plurality of magnets points perpendicular to said line on said lower surface; a gap separates each pair of edges of adjacent magnets; and a center of a face of each magnet of a second plurality of magnets positioned on upper surface of said upper non-magnetic slab substantially superimposed over said center of said first plurality of magnets, wherein all magnets of said first and second pluralities of magnets have their magnetic moments aligned parallel to each other, wherein said arrangement is configured to convert potential energy into kinetic energy.

In another embodiment, a magnetic arrangement comprising: a lower non-magnetic x-y slab with finite dimensions; an upper non-magnetic x-y slab with finite dimensions substantially parallel to and separated by a z-direction chute height from said lower non-magnetic x-y slab; a center of a face of each magnet of a first plurality of magnets positioned along a line on a lower surface of said lower non-magnetic x-y slab; a magnetic moment of each said magnet of said first plurality of magnets points perpendicular to said line on said lower surface; a gap separates each pair of edges of adjacent magnets; and a center of a face of each magnet of a second plurality of magnets positioned on an upper surface of said upper non-magnetic x-y slab, said center of said second plurality of magnets substantially superimposed over said center of said first plurality of magnets, wherein all magnets of said first and second pluralities of magnets have their magnetic moments aligned parallel to each other, wherein said arrangement is configured to convert potential energy into kinetic energy.

In another embodiment, a magnetic arrangement comprising: a lower non-magnetic slab; an upper non-magnetic slab substantially parallel to and separated by a chute height from said lower planer non-magnetic slab; a center of a face of each magnet of a first plurality of magnets positioned along a line on a lower surface of said lower non-magnetic slab; a magnetic moment of each said magnet of said first plurality of magnets points perpendicular to said line on said lower surface; a gap separates each pair of edges of adjacent magnets; and a center of a face of each magnet of a second plurality of magnets positioned on upper surface of said upper non-magnetic slab substantially superimposed over said center of said first plurality of magnets, wherein all magnets of said first and second pluralities of magnets have their magnetic moments aligned parallel to each other, wherein said arrangement is configured to convert potential energy into kinetic energy.

In other embodiments, some include the following: an apparatus wherein an injection molding machine is used to manufacture any of any non-magnetic components of said magnetic arrangement. The apparatus wherein said arrangement is configured to convert said potential energy into said kinetic energy along at least a portion of said line. The apparatus chute wherein said magnets that are axially magnetized are disc magnets having a diameter greater than its thickness. The apparatus wherein said potential energy is used to accelerate the mass of the projectile. The apparatus wherein said line is straight, a curve or a combination of straight and curve segments. The apparatus wherein said line is either closed or open, said open path having a first end and second end. The apparatus wherein said gap is a fraction of a distance across a face of said magnets. The apparatus wherein said line is straight, a curve or a combination of straight and curve segments. The apparatus wherein said magnets are alnico, ceramic, or rare-earth magnets. The apparatus wherein said magnets have identical parameters of dimensions. The apparatus wherein said upper planar surface is displaced from said lower planar surface by a clearance. The apparatus wherein said surface of said upper non-magnetic slab is parallel to said surface of said lower non-magnetic slab. The apparatus wherein said lower non-magnetic slab and said upper non-magnetic slab have a first thickness and second thickness, respectively. The apparatus wherein said lower non-magnetic slab and said upper non-magnetic slab are composed of one or more non-magnetic materials. The apparatus wherein said first thickness equals said second thickness. The apparatus wherein said upper non-magnetic slab is parallel to said lower non-magnetic slab.

In another embodiment, a set of magnetic disks comprising: a first disk comprising; a north face of a first plurality of magnets aligned to a first plane, said magnets arranged in a radial pattern around a first central magnet, a north face of said first central magnetic aligned to said first plane; a first surface of a non-magnetic material positioned a first distance from said north face of said first plurality of magnets; and a second surface of a said non-magnetic material positioned a second distance from a south face of said first plurality of magnets and a south face of said first central magnet; and a second disk comprising; a south face of a second plurality of magnets aligned to a second plane, said magnets arranged in said radial pattern around a second central magnet, a south face of said second central magnetic aligned to said second plane; a first surface of a second non-magnetic positioned a third distance from said south face of said second plurality of magnets; and a second surface of said second non-magnetic material positioned a fourth distance from a north face of said second plurality of magnets and a north face of said central magnet.

In another embodiment, a set of magnetic disks comprising: a first disk comprising; a north face of a first plurality of magnets aligned to a first plane, said magnets arranged in a radial pattern around a first central magnet, a north face of said first central magnet aligned to said first plane; a non-magnetic material surrounding all said magnets, said non-magnetic material having a first surface parallel to said first plane and displaced from said first plane in a first direction by a first distance, and said non-magnetic material having a second surface parallel to said first plane and displaced from said first plane in a direction opposite to said first direction by a second distance; and a second disk identical to said first disc, wherein either an attractive or repulsive force occurs when one of said surfaces of said first disk is placed in contact to one of said surfaces of said second disk.

In another embodiment, a set of magnetic disks comprising: a first disk comprising; a north face of a first plurality of magnets aligned to a first plane; a north face of a first central magnet aligned to said first plane, wherein said first plurality of magnets are arranged in a radial pattern around said first central magnet; a non-magnetic material surrounding all said magnets, said non-magnetic material having a first surface parallel to said first plane and displaced from said first plane in a first direction by a first distance, and said non-magnetic material having a second surface parallel to said first plane and displaced from said first plane in a direction opposite to said first direction by a second distance; and a second disk identical to said first disc, wherein either an attractive or repulsive force occurs when one of said surfaces of said first disk is placed in contact to said second surface of said second disk.

In another embodiment, a set of magnetic disks comprising: a first disk comprising; a north face of a first plurality of magnets aligned to a first plane, said magnets arranged in a radial pattern around a first central magnet, a north face of said first central magnet aligned to said first plane; a non-magnetic material surrounding all said magnets, said non-magnetic material having a first surface parallel to said first plane and displaced from said first plane in a first direction by a first distance, and said non-magnetic material having a second surface parallel to said first plane and displaced from said first plane in a direction opposite to said first direction by a second distance; and a second disk identical to said first disc, wherein a magnetic moment of all said magnets are reversed.

In another embodiment, a set of magnetic disks comprising: a first disk comprising; a north face of a first plurality of magnets aligned to a first plane; a north face of a first central magnet aligned to said first plane, wherein said first plurality of magnets are arranged in a radial pattern around said first central magnet; a non-magnetic material surrounding all said magnets, said non-magnetic material having a first surface parallel to said first plane and displaced from said first plane in a first direction by a first distance, and said non-magnetic material having a second surface parallel to said first plane and displaced from said first plane in a direction opposite to said first direction by a second distance; and a second disk identical to said first disc, wherein a magnetic moment of all said magnets are reversed.

In another embodiment, a set of magnetic disks comprising: a first disk comprising; a north face of a first plurality of magnets aligned to a first plane; a north face of a first central magnetic aligned to said first plane, wherein said magnets are arranged in a radial pattern around said first central magnet; a first non-magnetic material surrounding all said magnets, said first non-magnetic material having a first surface parallel to said first plane and displaced from said first plane in a first direction by a first distance, and said first non-magnetic material having a second surface parallel to said first plane and displaced from said first plane in a direction opposite to said first direction by a second distance; and a second disk comprising; a south face of a second plurality of magnets aligned to a second plane; and a south face of a second central magnetic aligned to said second plane, wherein said magnets are arranged in said radial pattern around said second central magnet; a second non-magnetic material surrounding all said magnets of said second disk, said second non-magnetic material having a first surface parallel to said second plane and displaced from said first plane in a second direction by said third distance, and said non-magnetic material having a second surface parallel to said second plane and displaced from said second plane in a direction opposite to said second direction by a fourth distance, wherein an attractive force occurs when said first surface of said first disk is placed in contact to said second surface of said second disk.

In another embodiment, a set of magnetic disks comprising: a first disk comprising; a face of a portion of a first plurality of magnets aligned to a first plane, remaining said portion aligned to a second face; said magnets positioned in said first plane in a random order; and a non-magnetic material surrounding all said magnets, said non-magnetic material having a first surface parallel to said first plane and displaced from said first plane in a first direction by a first distance, and said non-magnetic material having a second surface parallel to said first plane and displaced from said first plane in a direction opposite to said first direction by a second distance; and a second disk identical to said first disc, wherein either an attractive or repulsive force occurs when one of said surfaces of said first disk is placed in contact to one of said surfaces of said second disk.

In another embodiment, a set of magnetic disks comprising: a first disk comprising; a face of a portion of a first plurality of magnets aligned to a first plane, remaining said portion aligned to a second face; said magnets positioned in said first plane in a random order; and a non-magnetic material surrounding all said magnets, said non-magnetic material having a first surface parallel to said first plane and displaced from said first plane in a first direction by a first distance, and said non-magnetic material having a second surface parallel to said first plane and displaced from said first plane in a direction opposite to said first direction by a second distance; and a second disk identical to said first disc, wherein a magnetic moment of all said magnets are reversed.

In another embodiment, a set of magnetic disks comprising: a first disk comprising; a north face of a first plurality of magnets aligned to a first plane, wherein said first plurality of magnets are positioned and arranged in Cartesian coordinate grid pattern, wherein said first plurality of said magnets are equally spaced from one another; and a non-magnetic material surrounding all said magnets, said non-magnetic material having a first surface parallel to said first plane and displaced from said first plane in a first direction by a first distance, and said non-magnetic material having a second surface parallel to said first plane and displaced from said first plane in a direction opposite to said first direction by a second distance; and a second disk identical to said first disc, wherein a magnetic moment of all said magnets are reversed.

In other embodiments, some include the following: an apparatus wherein an injection molding machine is used to manufacture any of any non-magnetic components of said set of said magnetic disks. The apparatus wherein said first distance is either different or the same as said second distance. The apparatus wherein said radial pattern of said plurality of magnets of said first disk is identical to and matches said radial pattern of said plurality of magnets in said second disk. The apparatus wherein said plurality of magnets are magnets with substantially identical characteristics. The apparatus wherein said plurality of magnets are magnets with substantially identical characteristics. The apparatus wherein said plurality of magnets are axial magnetized disc magnets. The apparatus wherein said first thickness equals said third thickness and said second thickness equals said fourth thickness. The apparatus wherein a fifth non-magnetic material adhering said first non-magnetic material to said second non-magnetic material. The apparatus of wherein a sixth non-magnetic material adhering said third non-magnetic material to said fourth non-magnetic material.

In another embodiment, a magnetic arrangement apparatus comprising: a lower planer surface; an upper planar surface substantially parallel to and separated by a clearance from said lower planer surface; a first upper face of each magnet of a first plurality of magnets is positioned and placed coincident to said lower planar surface; and a first lower face of each magnet of a second plurality of magnets is positioned and placed coincident to said upper planar surface; wherein each center of said lower face is substantially superimposed and aligned over a corresponding center of said upper face of a magnet from said first plurality of magnets, wherein said centers of said first plurality of magnets are positioned to form a line, wherein all magnets are axially magnetized and all said magnets have their magnetic poles aligned in a first direction. The apparatus, wherein said magnetic arrangement is configured to convert potential energy into kinetic energy. The apparatus, further comprising: a gap separates each pair of edges of adjacent magnets. The apparatus, further comprising: a projectile magnet configured to be oriented with its magnetic poles aligned in a direction that is opposite to said first direction. The apparatus, wherein said projectile magnet is initially positioned near an opening formed between said first upper face and said first lower face of a first such pair of magnets until said potential energy of said projectile magnet is converted into said kinetic energy after said apparatus pulls said projectile magnet into said opening. The apparatus, wherein said projectile magnet after receiving kinetic energy, starts accelerating in a direction as indicated by said line and continues travelling between the space enclosed by said first upper faces and said first lower faces of all said plurality of magnets. The apparatus, wherein said line is a straight segment, a curve or a combination of straight and curved segments, wherein said segments can extend along any one or more of three dimensions. The apparatus, wherein said magnets are alnico, ceramic, or rare-earth magnets.

In another embodiment, a magnetic disk arrangement apparatus comprising: two or more magnetic disks, each magnetic disk is further comprised of: a first central magnet; a first plurality of magnets arranged in a radial pattern around said first central magnet; a first plane wherein all magnets are located on one side of said first plane; a north face of said first plurality of magnets positioned and placed coincident to said first plane; a south face of said first central magnet positioned and placed coincident to said first plane, wherein a magnetic pole of said first central magnet is opposite in direction to a magnetic pole of said first plurality of magnets; a non-magnetic material surrounding and securing together all said magnets; a first surface of said non-magnetic material positioned a first distance from said north face of said first plurality of magnets; and a second surface of said non-magnetic material positioned from said north face by a second distance, in a direction opposite to that of said first distance, wherein said non-magnetic material is formed into a disk of said magnetic disk. The apparatus, wherein wherein said magnetic interactions between said two or more magnetic disks convert potential energy into kinetic energy. The apparatus, wherein said conversion of energy can potentially cause one of said magnetic disks to flip with respect to other said magnetic disk. The apparatus, wherein said first distance equals said second distance. The apparatus, further comprising: a gap separating an edge of each magnet from an edge of another adjacent magnet within said magnetic disk. The apparatus, wherein said magnets are alnico, ceramic, or rare-earth magnets.

In another embodiment, a composite tube apparatus comprising: a metal tube formed from a first material that exhibits an eddy current effect; and a transparent tube formed from a second material that does not exhibit said eddy current effect, wherein an inside diameter of said metal tube and said transparent tube are substantially equal, wherein said tubes are positioned collinearly on a common axis, and wherein metal tubes directly attach to transparent tubes and said transparent tubes directly attach to said metal tubes. The apparatus, wherein said metal material is copper or aluminum. The apparatus, wherein said second material is plastic or glass. The apparatus, wherein a magnet falling through a vertical section of said metal tube experiences a decreased velocity while said magnet falling through a vertical section of said transparent tube experiences an increased velocity. The apparatus, further comprising: a magnetic wire wrapped multiple times around said transparent tube, wherein said magnetic wire is configured to carry a current. The apparatus wherein a magnet falling through a vertical section of said transparent tube experiences a decreased velocity when current flows in a first direction within said magnetic wire and an increased velocity when current flows in a direction opposite to said first direction within said magnetic wire.

BRIEF DESCRIPTION OF THE DRAWINGS

Please note that the drawings shown in this specification may not necessarily be drawn to scale and the relative dimensions of various elements in the diagrams are depicted schematically. The inventions presented here may be embodied in many different forms and should not be construed as limited to the embodiments set forth herein. Rather, these embodiments are provided so that this disclosure will be thorough and complete, and will fully convey the scope of the invention to those skilled in the art. In other instances, well-known structures and functions have not been shown or described in detail to avoid unnecessarily obscuring the description of the embodiment of the invention. Like numbers refer to like elements in the diagrams.

FIG. 3A illustrates Table 1 that presents all the various embodiments of using (1) or not using (0) non-magnetic material to form the chute in the magnetic chute system in the present disclosure.

FIG. 3B depicts Table 2 presenting the characteristics of the magnet and several different magnetic chute systems in the present disclosure.

FIG. 26A shows a block diagram of another embodiment using the magnetic chute system to eject components in accordance with the present disclosure.

FIG. 26B depicts an embodiment of a projectile comprising a first component that contains magnets for the magnetic chute system to propel the projectile and a second component that carries a payload in accordance with the present disclosure.

FIG. 26C shows the projectile accelerates and then stops, the payload converts the initial potential energy built up by the chute system into kinetic energy and transferring the kinetic energy to the payload once detached from propellant in accordance with the present disclosure.

FIG. 27A shows a block diagram of another embodiment using the magnetic chute system and additional electronics to build magnetic fields to eject components in accordance with the present disclosure.

FIG. 27B depicts a projectile comprising a first component that contains magnets for the magnetic chute system to propel and a second component that carries a payload in accordance with the present disclosure.

FIG. 27C shows the projectile converts the potential energy built up by the chute system and accelerates the projectile and then stops, whereby the payload receives the kinetic energy, and detaches from propellant in accordance with the present disclosure.

DETAILED DESCRIPTION OF THE INVENTION

Figure 1A:
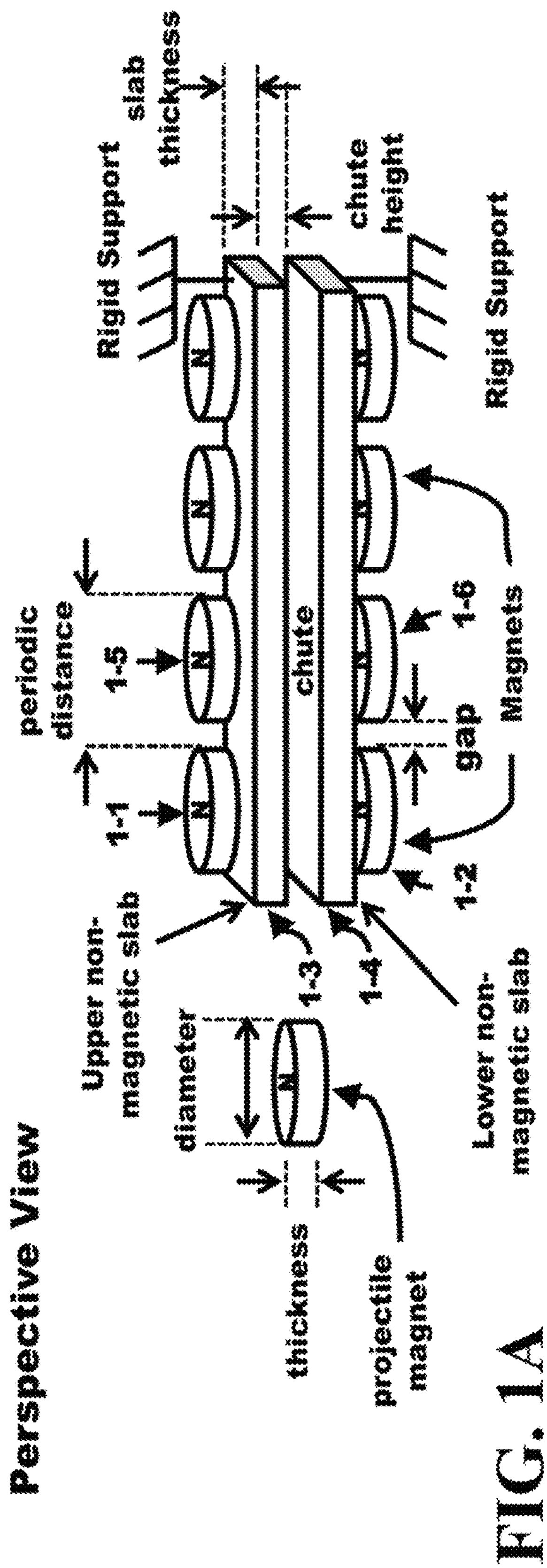
FIG. 1A shows a perspective view of an embodiment of a magnetic chute system comprising periodically arranged magnets and two non-magnetic slabs forming a chute to guide a projectile magnet in the present disclosure.

FIG. 1A shows one embodiment of a magnetic chute system for a projectile magnet. The magnetic chute is formed by the periodic repetition of the basic magnet configuration of magnets 1-1 and 1-2, called a 'magnet pair;' these are disc magnets and are positioned so that they are attractive to each other. Magnets with different shapes can also be used to form the magnet pair. The upper non-magnetic slab 1-3 and the lower magnetic slab 1-4 have a slab thickness and are rigidly supported and prevent the two magnets from completing their desired attempt to mate to one another. The slabs have finite values for their length and width dimensions. A space exists between the two slabs; this space is called the chute. The surfaces of the upper and lower slabs facing the chute are smooth and parallel to each other. The slab thicknesses of the lower and upper slab can be equal or unequal. The chute has a dimension given by the chute height. For example, the mechanical structure of the magnetic chute system can be manufactured using an injection molding process. The molded material can be designed to form a housing that correctly positions and holds the magnets relative to each other while creating the space corresponding to the chute. The walls of the molded forms can used to form the upper and lower slabs. The non-magnetic slabs that form the structure of the final molded product would be comprised of one or more non-magnetic materials. Examples of non-magnetic materials include, but are not limited to; air, aluminum, gold, copper, acrylonitrile butadiene styrene, nylon, polycarbonate, and polyethylene, for example. The slabs can also be comprised of non-magnetic adhesives and glues. The projectile magnet has thickness and a diameter, as illustrated. However, the thickness of the projectile magnet is less than that of the chute height to insure that the projectile magnet can pass through the chute.

The basic magnet configuration of magnets 1-1 and 1-2 is periodically repeated using the periodic distance as shown between the right edge of magnet 1-1 and the left edge of magnet 1-5. The basis magnet configuration is repeated four times (can be more or less than four) along a line, in this case, a straight line. The magnets on a given slab are separated by a gap as illustrated between the right edge of magnet 1-2 and the left edge of magnet 1-6. Once the projectile is captured by the magnetic field of the magnetic chute system, these magnets form a magnetic chute that can apply forces to the projectile magnet, causing the projectile magnet to accelerate and propel along the chute, once the projectile has been introduced into the chute.

Figure 1B:
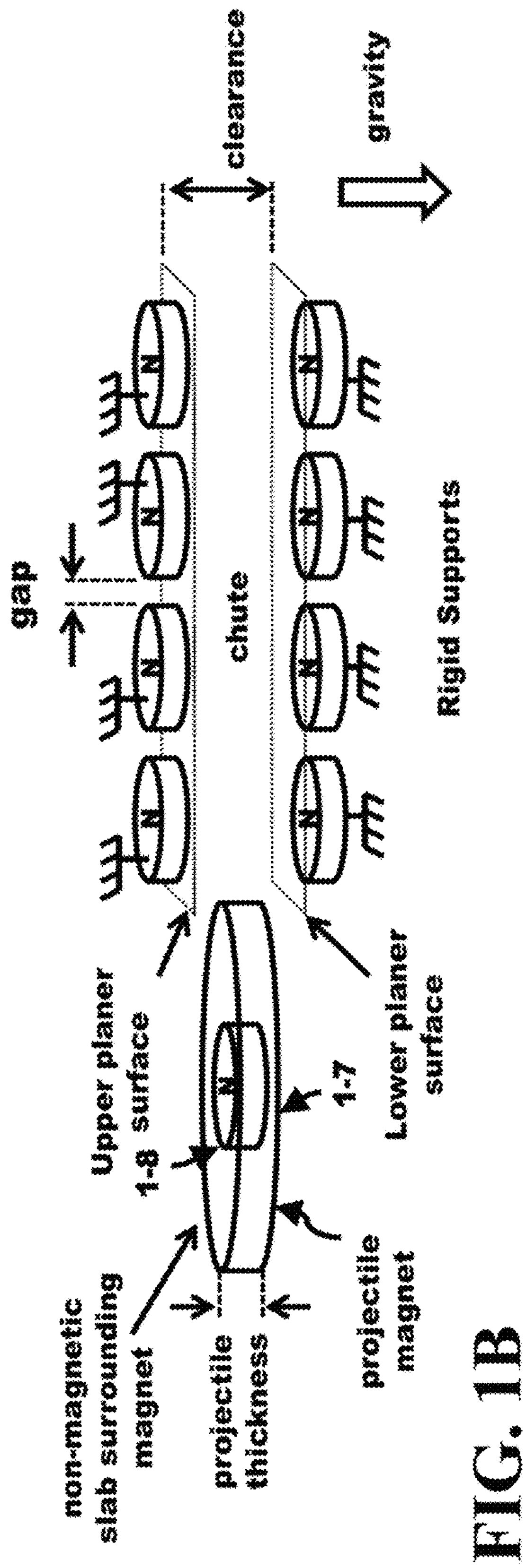
FIG. 1B depicts a perspective view of another embodiment of said magnetic chute system comprising periodically arranged magnets forming a chute to guide a projectile magnet, said projectile magnet surrounded by a non-magnetic slab in the present disclosure.

FIG. 1B presents another embodiment of the magnetic chute system. Instead of associating the slabs of non-magnetic material with the periodic magnetic configuration, the non-magnetic material surrounds the projectile magnet. The magnet alone or the magnet with a non-magnetic material is called magnet projectile (herein after 'projectile'). The chute is formed between the lower faces of the upper magnets (the upper planar surface) and the upper faces of the lower magnets (the lower planar surface). The distance between the magnet face to opposing magnet face is called the clearance. The chute height equals the clearance, when the chute is at its maximum height. For this injection molded parts, the magnets can be glued to the outside of the molded material, where the mold is designed to form a chute bounded by these magnets. The dimension of the chute height is greater than the projectile thickness of projectile 1-7 allowing the projectile to move freely in the chute. The non-magnetic material surrounds the upper and lower face of the magnet 1-8.

Figure 1C:
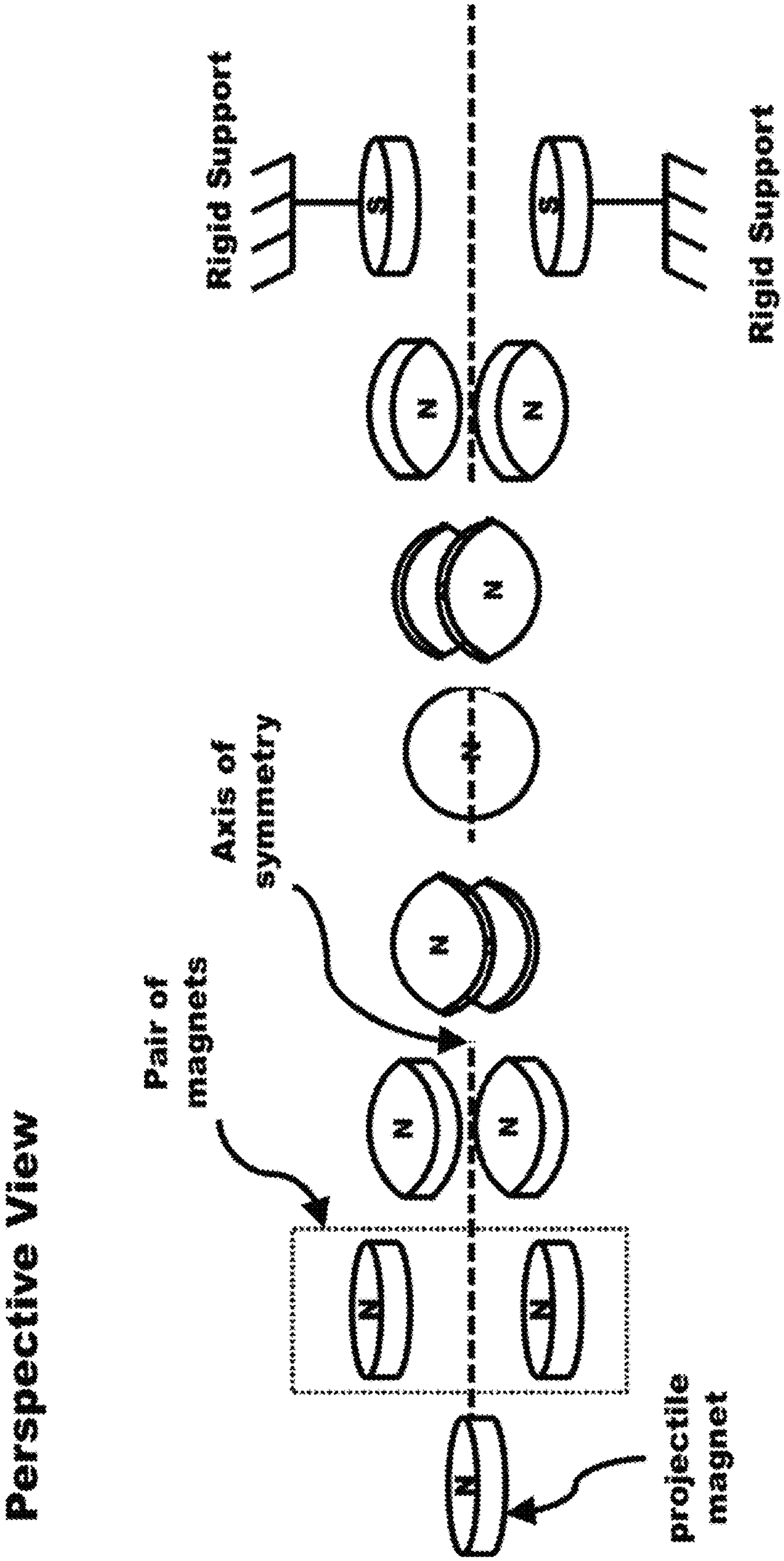
FIG. 1C depicts a perspective view of another embodiment of said magnetic chute system comprising periodically arranged magnets where the pairs of magnets are rotated around an axis of symmetry forming a chute to guide a projectile magnet, said projectile magnet surrounded by a non-magnetic slab in the present disclosure.

The upper face of the magnet 1-8 is magnetized 'north' and as the projectile 1-7 enters the chute, since the lower faces of the upper magnets are magnetized 'south,' the projectile 1-7 is forced upwards. However, at the same time, the lower face of the magnet 1-8 is magnetized 'south' and as the projectile 1-7 enters the chute, since the upper faces of the lower magnets are magnetized 'north,' the projectile 1-7 is forced downwards. There is a point where this upward force on the projectile equals the downward force on the projectile and the gravitation force of the projectile. At this point, the projectile travels along the chute effectively weightlessly balanced. It is experiencing the frictional forces of at least the air if the system is not operating within a vacuum. FIG. 1C illustrates another embodiment where the pairs of magnets are rotated around an axis of symmetry forming a spiral chute to guide a projectile magnet. The projectile magnet turns around an axis of symmetry as the projectile magnet propagates along the axis of symmetry.

In orbit or in outer space, one embodiment of this system can be mounted on the spacecraft and can be used to propel payloads into higher or lower orbits, for example, or targeting the ejected payloads to perform other functions. The magnetic chute system offers a 'potential energy to kinetic energy transfer' that is a renewable energy source; the same magnetic chute system can be used over and over again, always offering the use of some maximum 'potential energy to kinetic energy transfer' for each new payload launched as described shortly. The final kinetic energy delivered to the projectile can be controlled by adjusting, for instance, the gap, the chute height, the strength of the magnets, or the magnetic strength of the projectile to control the amount of 'potential energy to kinetic energy transfer' delivered to each new payload.

Figure 2A:
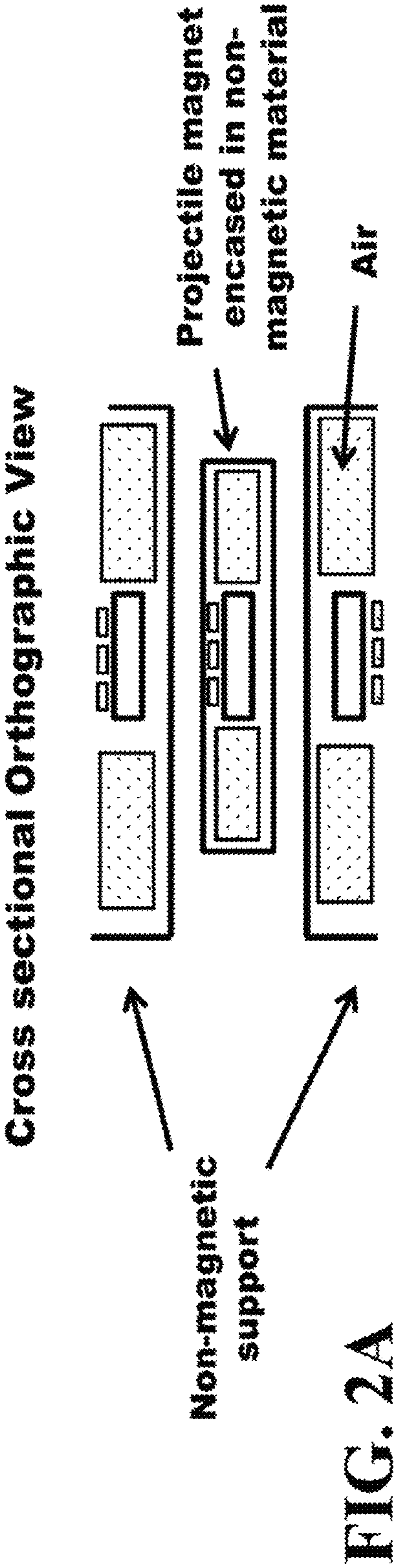
FIG. 2A-C shows a cross-sectional view, of a few embodiments, looking along a length of a chute in the use of non-magnetic slabs to form a chute in said magnetic chute system to guide a projectile in the present disclosure.
Figure 2B:
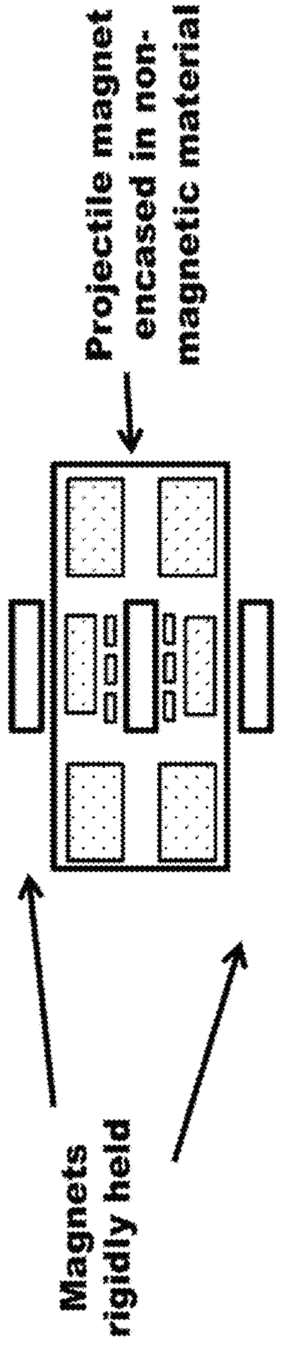
Figure 2C:
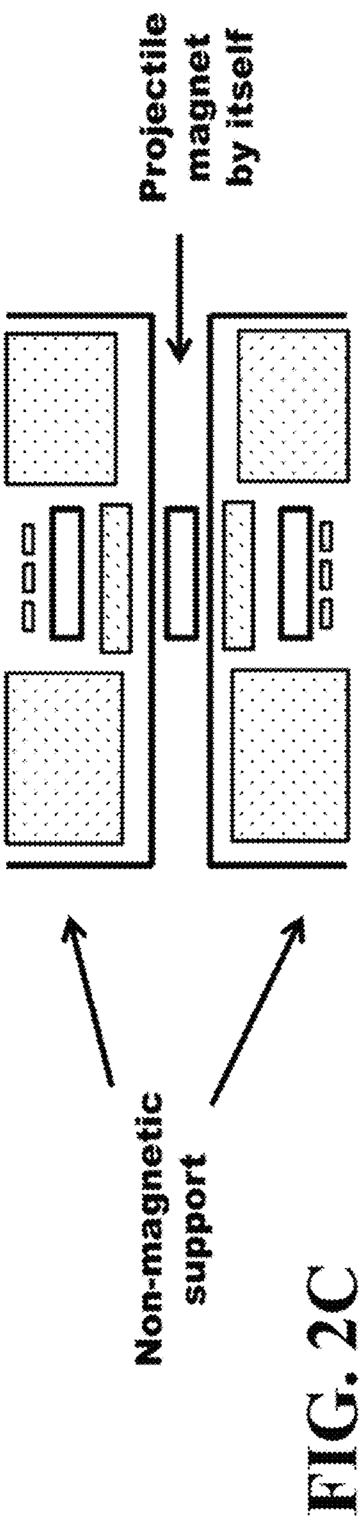

FIGS. 2A-C presents a few examples of how the non-magnetic material may be used within the magnetic chute system to support and form the projectile and the chute. FIG. 2A presents the chute formed between the two non-magnetic supports surrounding and supporting the periodically placed magnets. Note that for a plastic or metal molded part, such parts would also have cavities as represented by the 'air' pockets. The non-magnetic supports can include air pockets and non-magnetic glues. The non-magnetic supports can be formed using milling machines, plastic mold injection process, 3D printing, etc. The projectile has the non-magnetic material covering both sides of the magnet's faces. FIG. 2B, on the other hand, leaves the lower faces of the upper periodically placed magnets and the upper faces of the lower placed magnets exposed. These periodically placed magnets are held in place via their back face and glued to the structure of the molded part. The overall structure holding the back faces of these magnets is designed to be a rigid structure able to support or withstand the attractive forces between the lower faces of the upper magnets to that of the upper faces of the lower magnets. FIG. 2C represents the cross sectional view of FIG. 1A. In this case, the magnet alone travels through the chute.

FIG. 3A illustrates Table 1 which provides all possible combinations of using non-magnetic material to form a variety of chute and projectile combinations. For example, the column labelled with FIG. 2A, is a '1111'. The lower faces of the upper periodic magnets are covered (1) with a non-magnetic material, the top face and side of the projectile is covered (1), the bottom face and side of the projectile is covered (1), and the upper face of the lower magnet is covered (1). Another example is the first column 0000. The lower faces of the upper periodic magnets are not covered (0) with a non-magnetic material, the top face and side of the projectile is not covered (0), the bottom face and side of the projectile is not covered (0), and the upper face of the lower magnet is not covered (0). Further examples; include the case '0110' representing FIGS. 1B and 2B and the case '1001' representing FIGS. 1A and 2C.

FIG. 3B provides Table 2. This table gives the specification of the disc magnet that were used in the design of the three different magnetic chute systems 1, 2 and 3. In system 1, the configuration was '0110'. The lower faces of the upper periodic magnets is not covered (0) with a non-magnetic material, the top face and side of the projectile is covered (1), the bottom face and side of the projectile is covered (1), and the upper face of the lower magnet is not covered (0). The gap or spacing between adjacent magnets is 1.9 mm. The chute height was 6 mm while a slab thickness was not used. The projectile thickness and diameter was 4.5 mm and 32.9 mm, respectively.

Figure 4A:
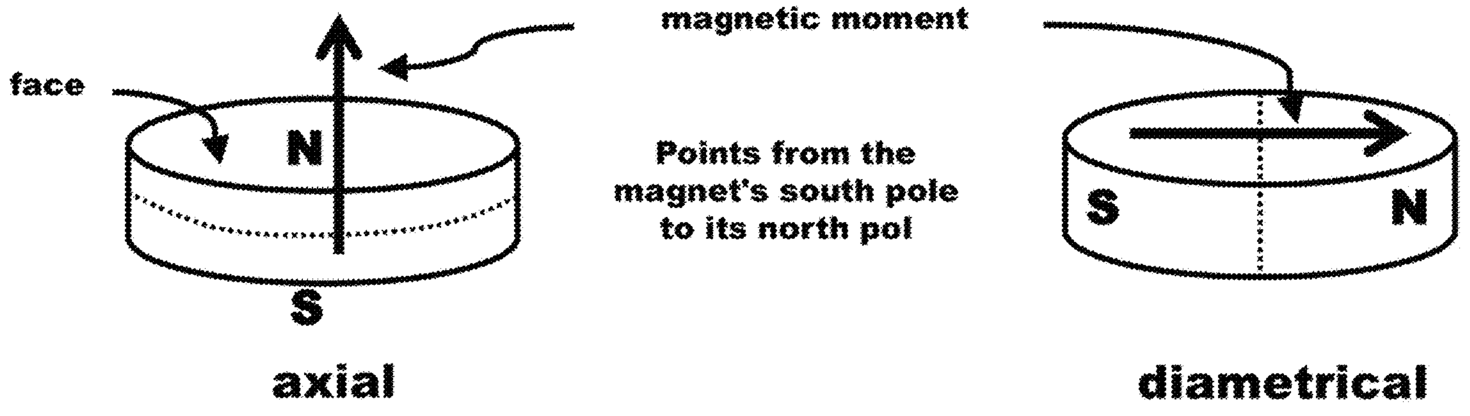
FIG. 4A depicts the direction of the magnetic moment of an axial and diametrical magnetized disc magnet in accordance with the present disclosure.

FIG. 4A presents an axial (left) and diametrical (right) magnetized disc magnets. The axial disc magnet has the magnetic moment pointing from the south face to the north face and is radially located in the center of the face. The magnetic moment of the diametrical magnetized magnet points across it width from it south half to its north half.

Figure 4B:
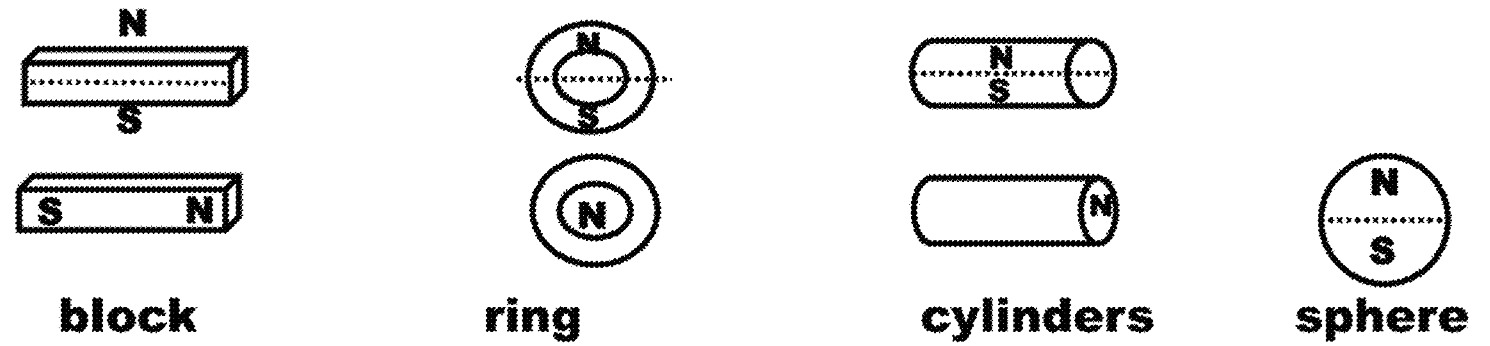
FIG. 4B show shapes and magnetized areas of several different types of magnets in accordance with the present disclosure.

FIG. 4B illustrates block, ring and cylinder magnets that are magnetized diametrically (top row) and magnetized axially for the bottom row, including the sphere. All of these shapes and magnetic orientations offers the ability to construct other magnetic systems exploiting the various features of these shapes and magnetic orientations.

Figure 5A:
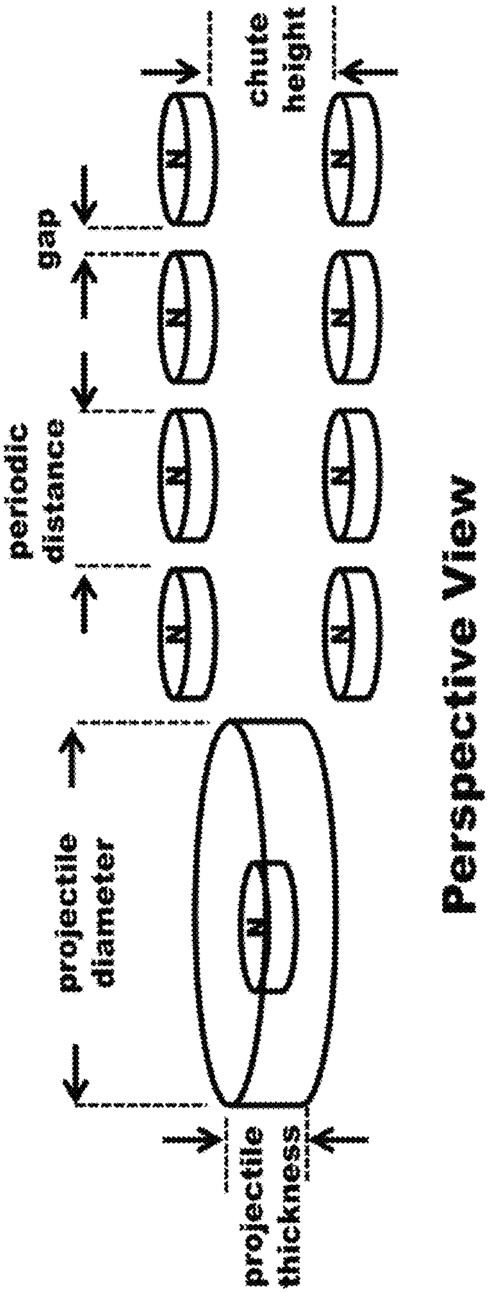
FIG. 5A depicts some of the naming conventions of this system that are used in the present disclosure.

FIG. 5A presents the naming convention applied to the magnetic chute system. The projectile has a projectile thickness and a projectile diameter. The projectile shown is surrounded in a non-magnetic material; even if, it was only the magnet itself, it is still considered a projectile. The periodic distance is the distance from a section of the disc (edge) to the identical section in the adjacent disc (edge). A gap is the measurement from the edge of a magnet to the edge of the adjacent magnet. The distance from the bottom face of the upper magnets to that of the upper face of the lower magnets is caked the chute height.

Figure 5B:
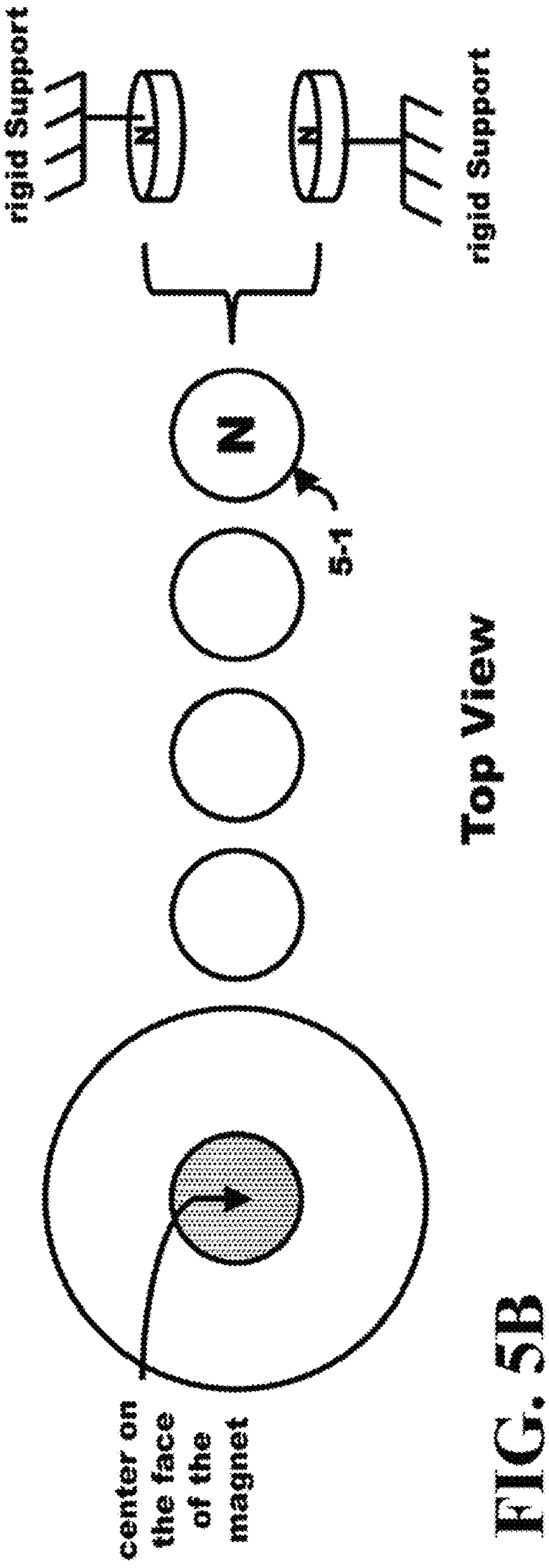
FIG. 5B shows the center of the face (shaded region) of the disc magnet in a top view of FIG. 5A in the present disclosure.

FIG. 5B illustrates the top view of FIG. 5A. The center of the magnet disc is in the center of the face (shaded) of the disc. The basic configuration of the magnet structure 5-1 that are periodically placed is shown by the adjacent diagram (on the far right) showing the magnets rigidly held in place and having the same or parallel oriented magnetic moment.

Figure 6:
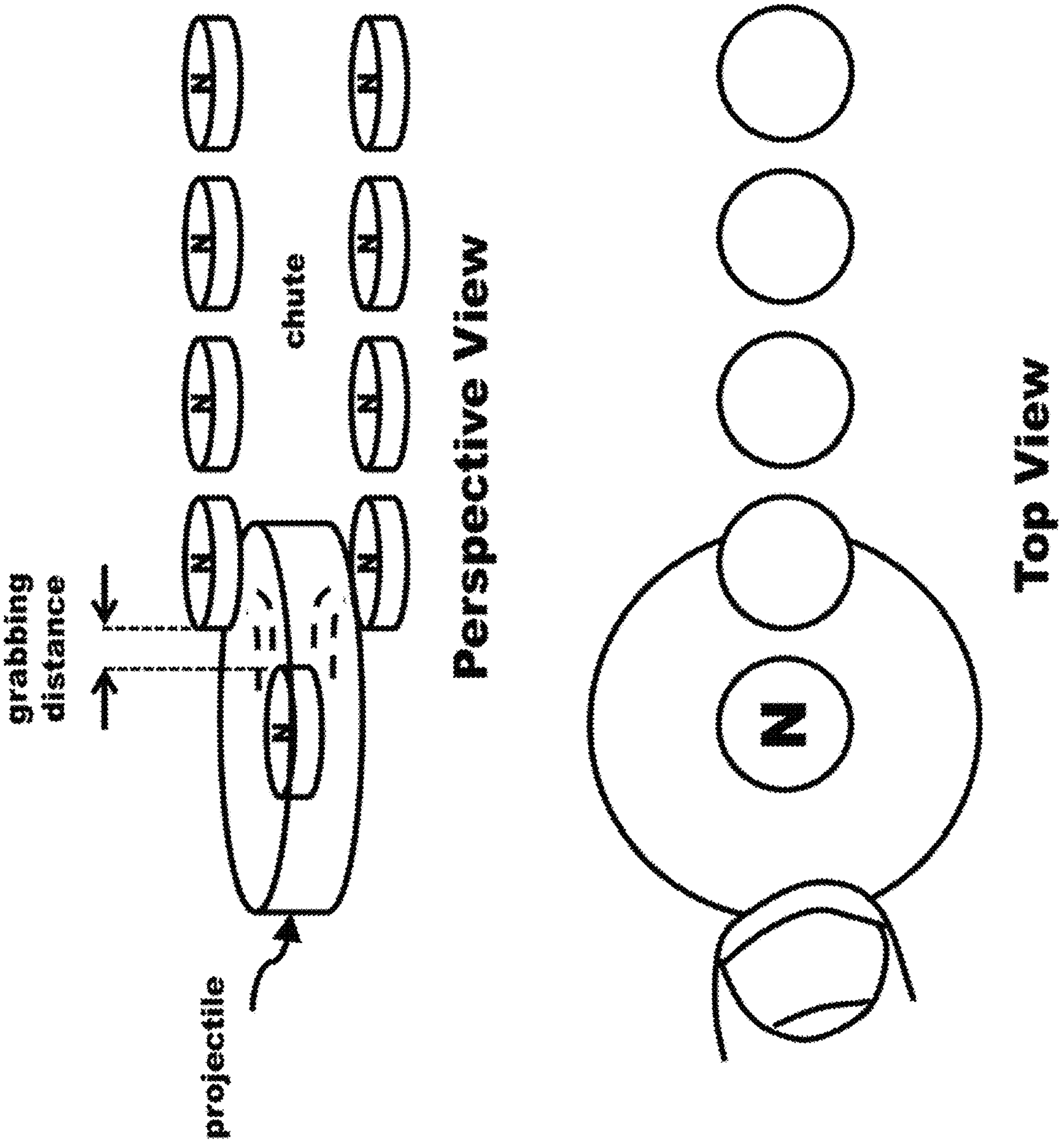
FIG. 6 illustrates (top) a grabbing distance when the projectile just starts to experience a pulling force into the chute and (bottom) a top view of said embodiment in the present disclosure.
Figure 7:
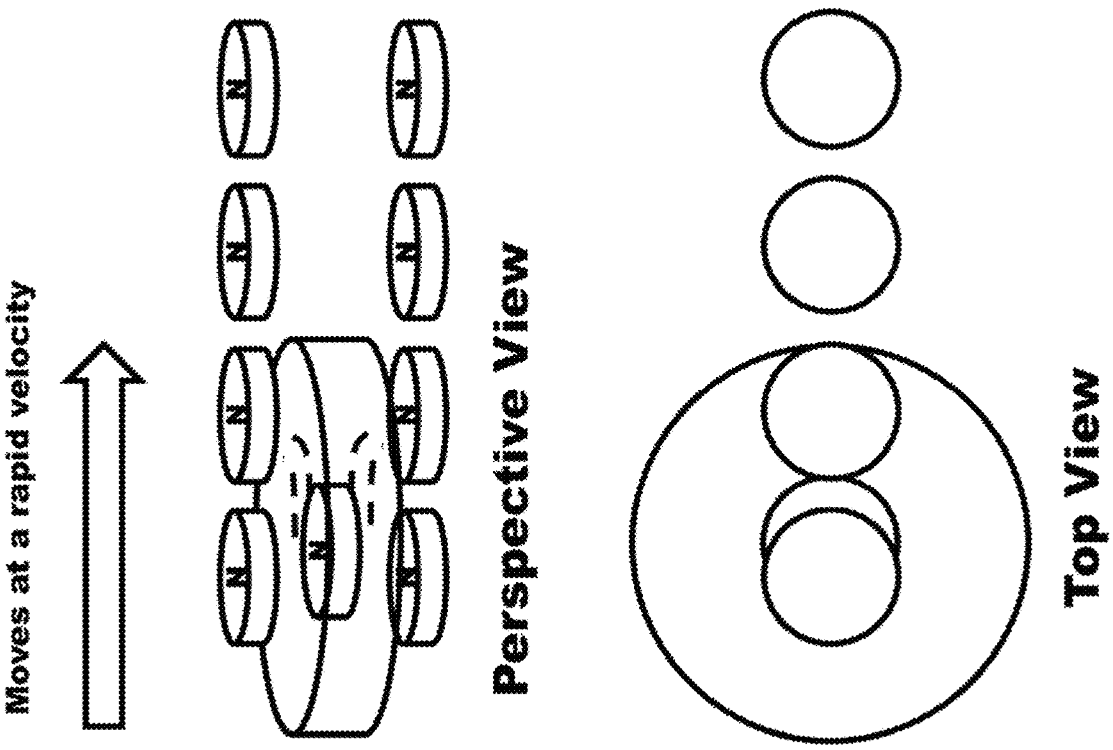
FIGS. 7-9 depicts said embodiment of FIG. 6 when the projectile is released into the chute several snapshot views of the projectile being pulled by the periodic magnetic field causing movement at a high velocity in the chute in the present disclosure.
Figure 8:
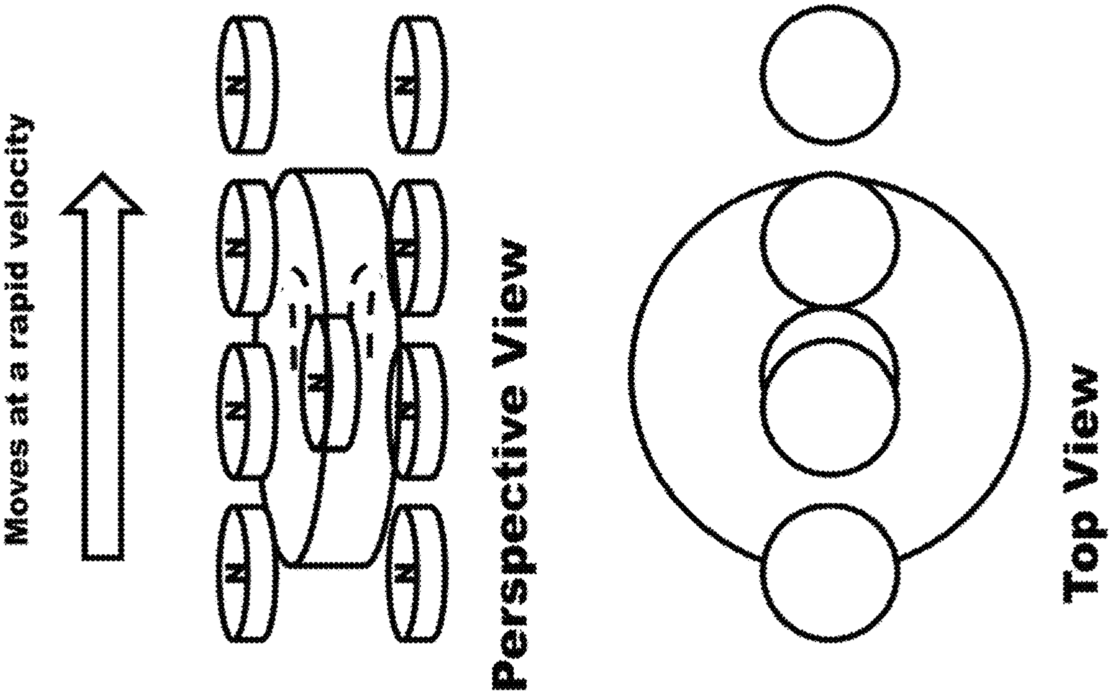
Figure 9:
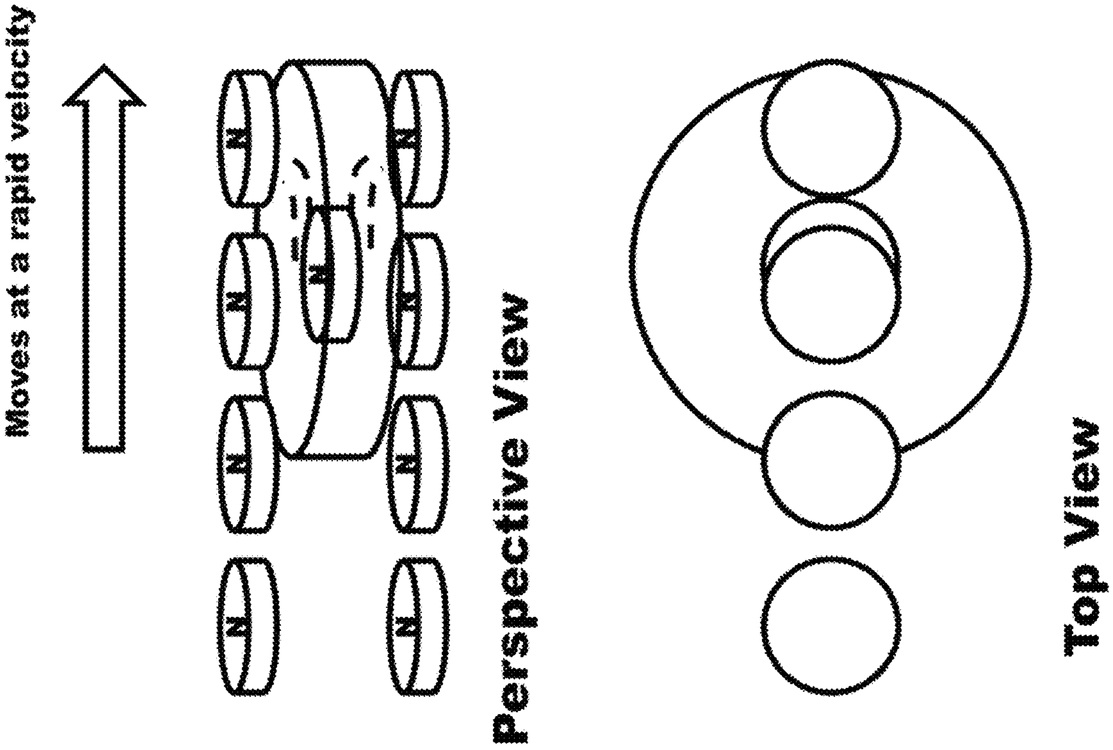
Figure 13:
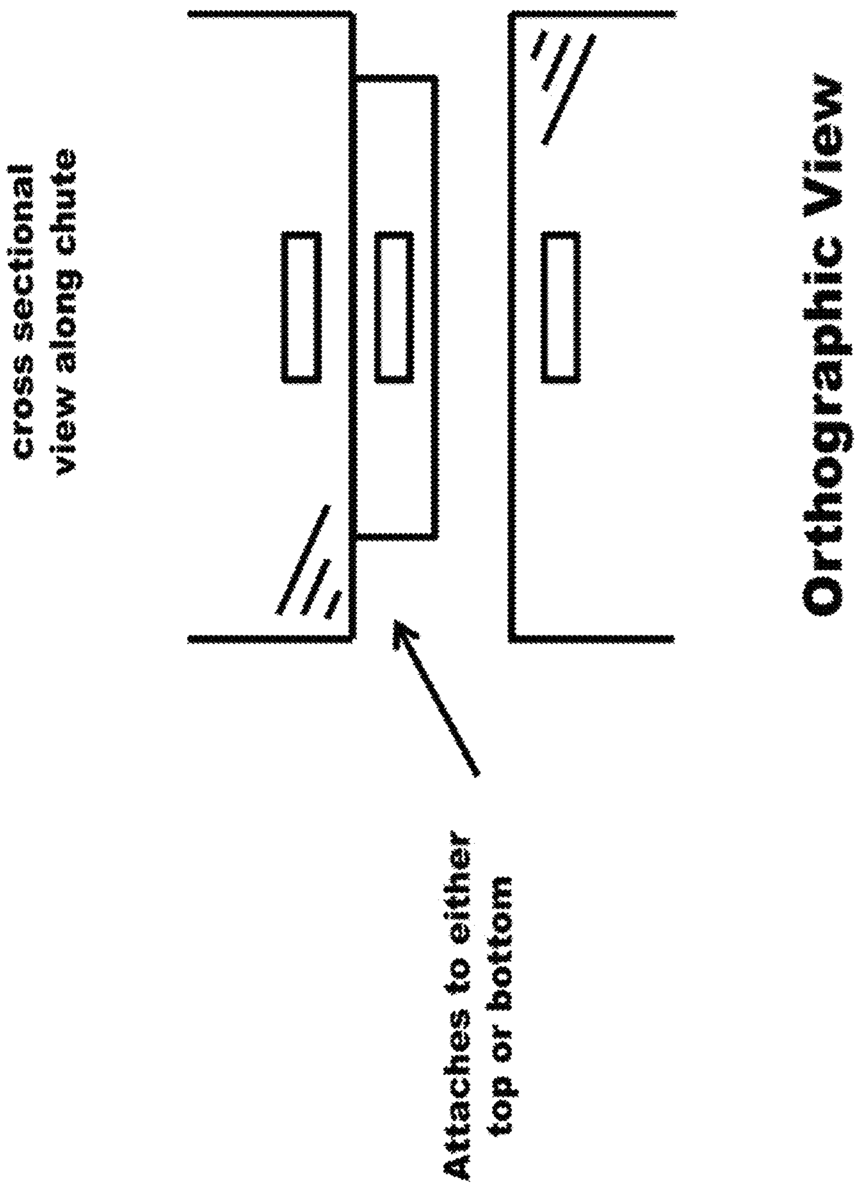
FIG. 13 illustrates a cross sectional view along the chute with the projectile attached to the top non-magnetic material after losing its energy in accordance with the present disclosure.

Each of FIGS. 6-12 illustrates a perspective view (top) and a top view (bottom) of a four magnet magnetic chute system. FIG. 6 illustrates the projectile being physically applied to one end of the system until the projectile is placed within the grabbing distance. Once the system captures and accelerates the projectile into the chute (FIG. 7), the potential energy was turned into kinetic energy and the projectile moves at a rapid velocity within the chute. The magnetic lines of force from the next adjacent magnet pulls on the projectile. FIG. 8 and FIG. 9 continue showing the projectile moving within the chute. When the projectile arrives at the end of the periodic array of magnets (FIG. 10), the projectile decelerates stops and stores all the energy as potential energy. Then, in FIG. 11, the projectile reverts course, accelerates, reaches a high velocity and retraces its path though the chute. At some point, energy is lost in the system due to friction and the projectile stops and attaches and rests to either the top or bottom magnets as shown in FIG. 13 by magnetic attraction as shown in the orthographic view along the chute.

Figure 14:
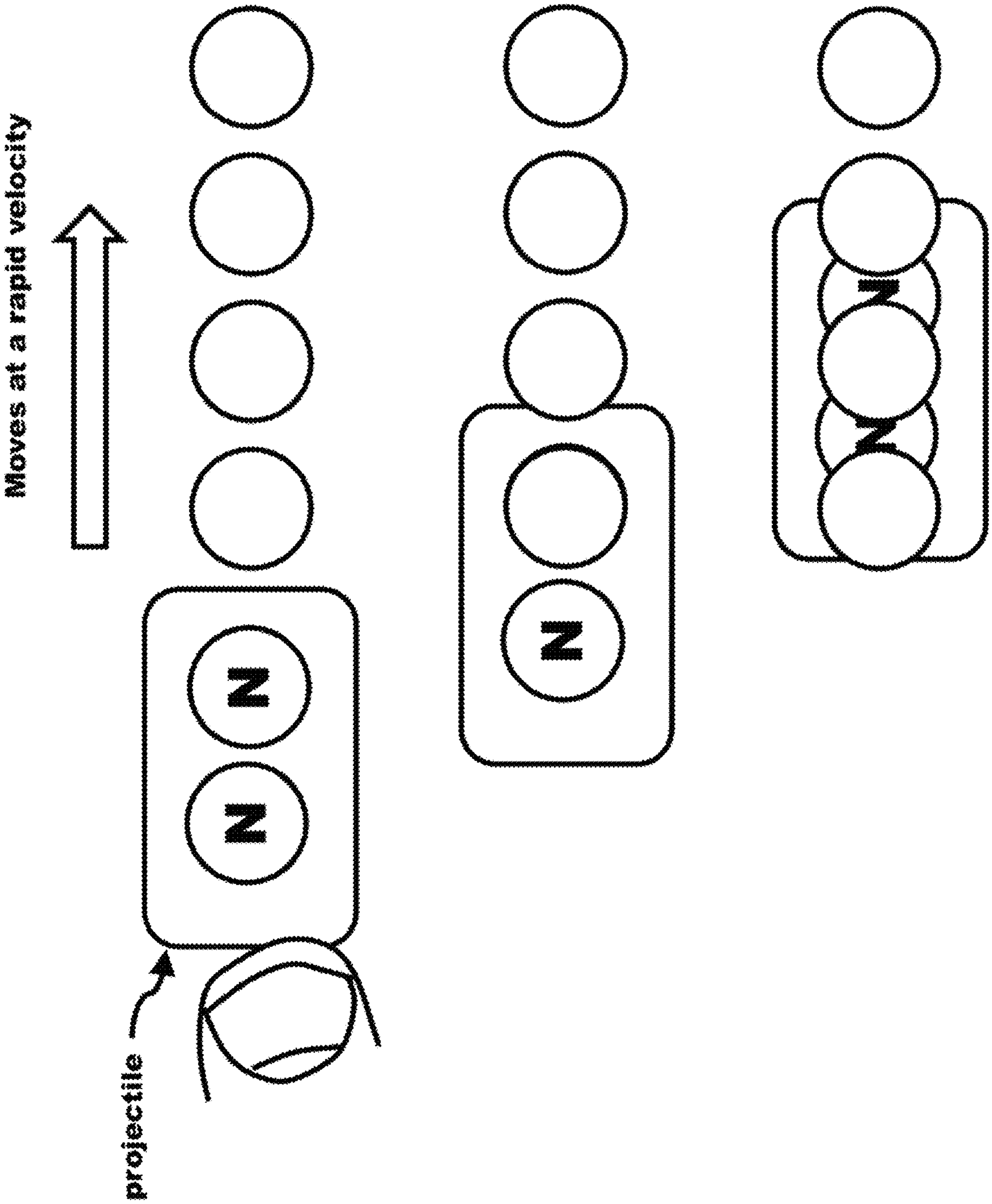
FIG. 14 shows another embodiment of the magnetic chute system where the projectile comprises two or more magnets in accordance with the present disclosure.
Figure 15:
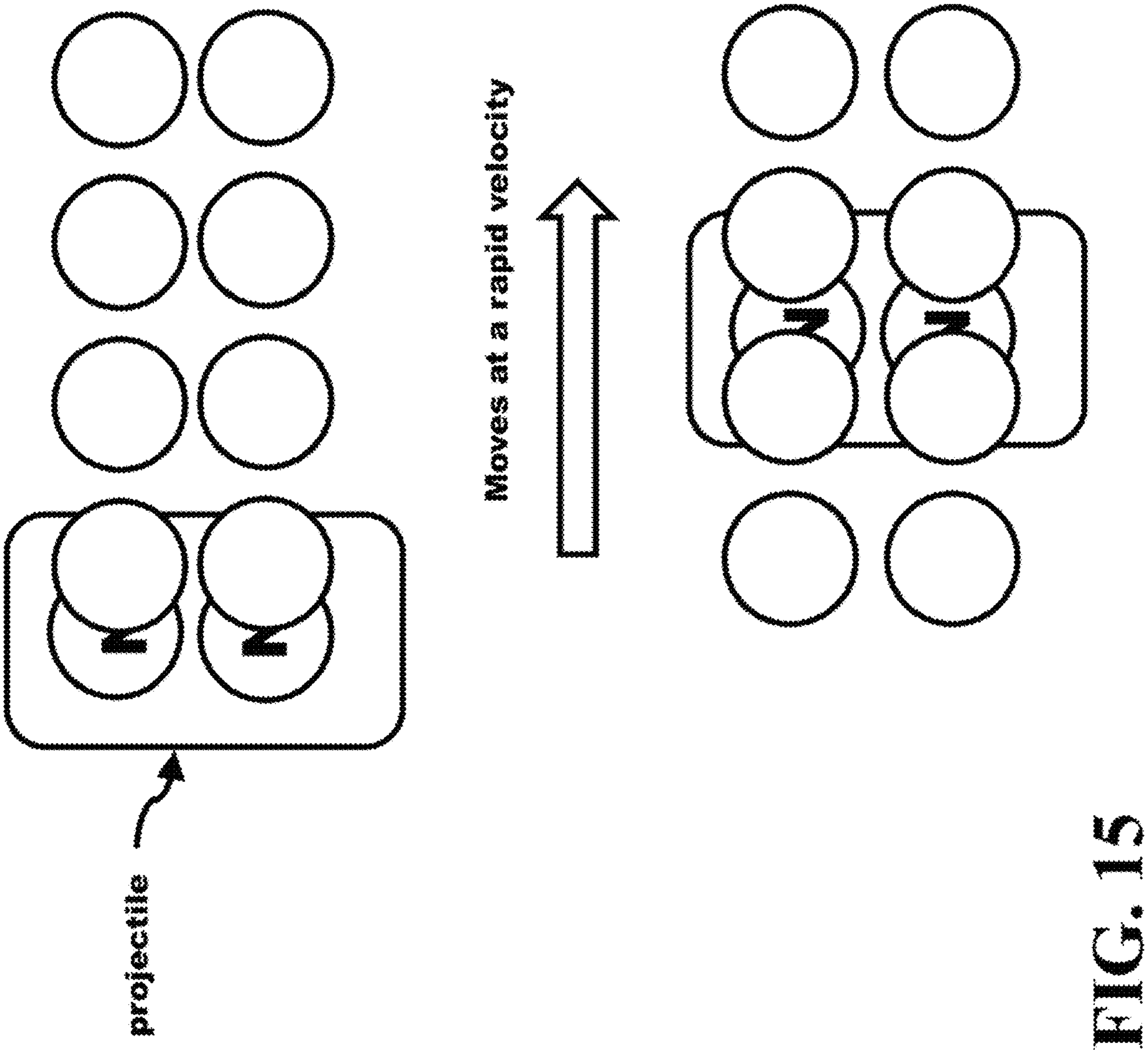
FIG. 15 depicts yet another embodiment of the magnetic chute system where the projectile comprises two or more magnets such that these magnets are shared among two (or more) periodic arrangements of magnets in accordance with the present disclosure.

FIG. 14 presents the projectile comprising of 2 (or more) magnets in a serial configuration. The projectile moves along the single chute. FIG. 15 illustrates 2 (or more) magnets in parallel in the projectile. The projectile is acceleration is increased and moves along the two chutes at a higher velocity. Various embodiments to form the serial configurations using both perpendicular and parallel orientations to form larger area plane projectiles.

Figure 16:
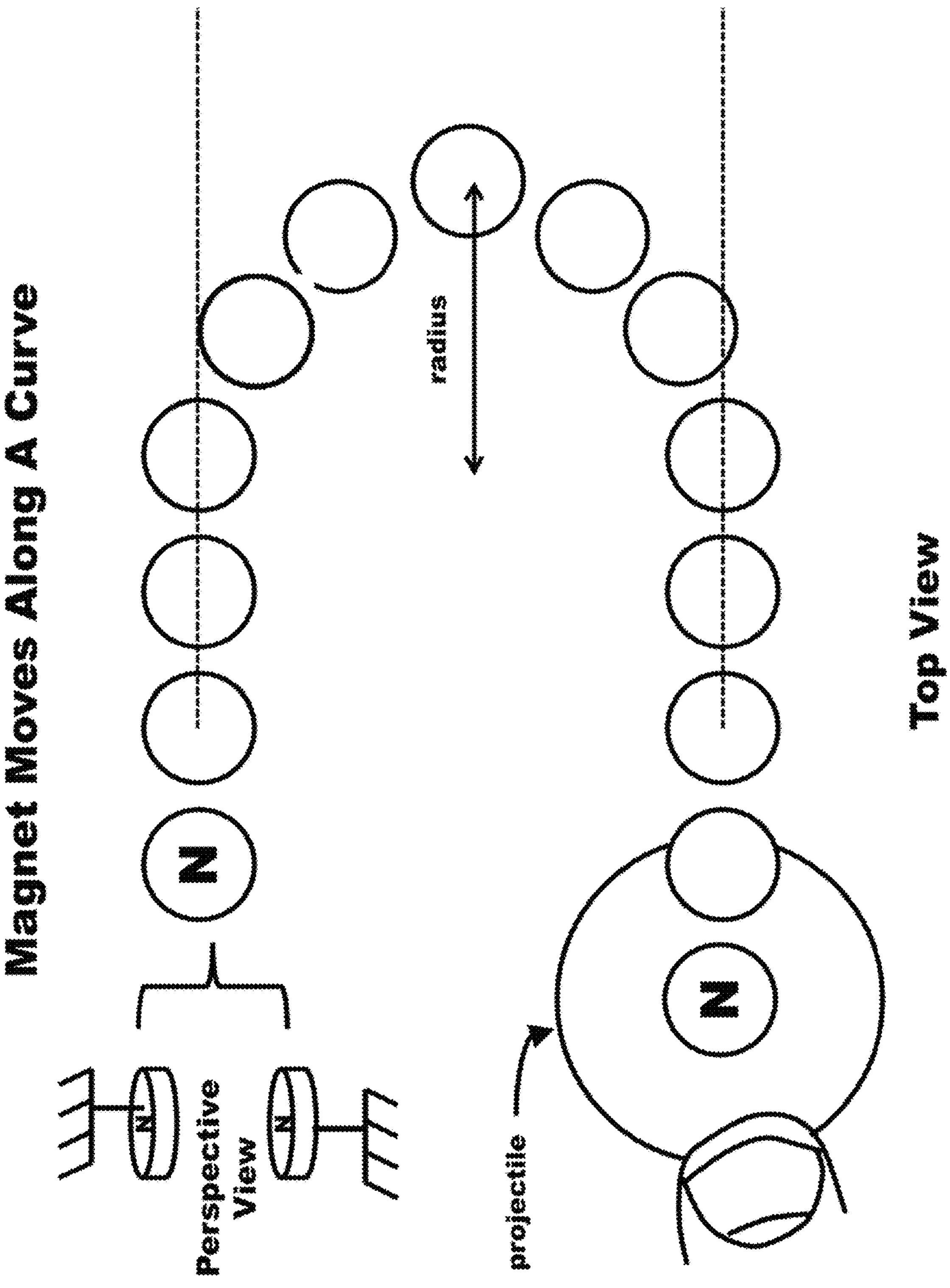
FIG. 16 shows another embodiment of the top view of a magnetic chute system using an arrangement of periodic magnets along a radius forming a curved line in accordance with the present disclosure.
Figure 17:
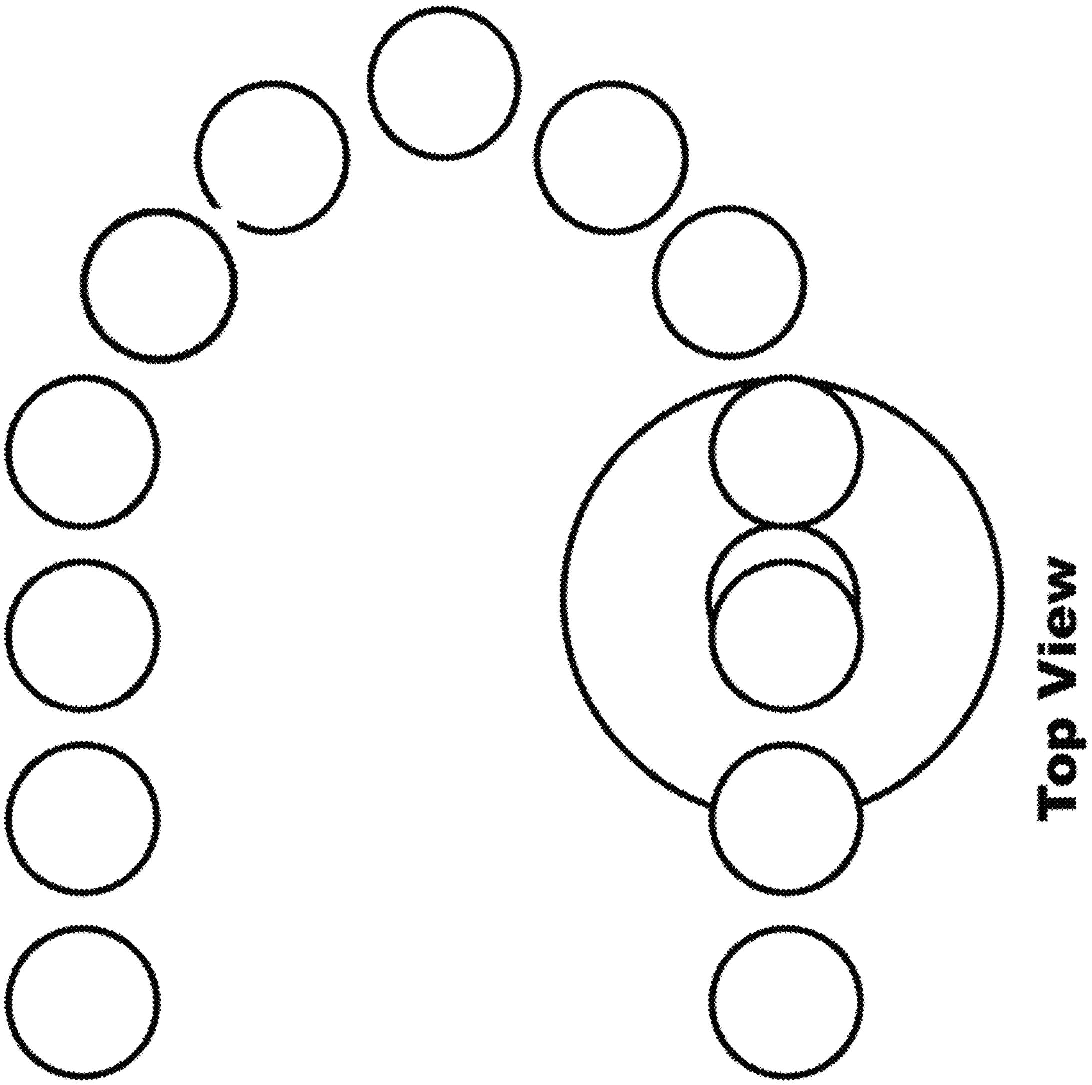
FIGS. 17-21 depict the movement of the projectile along the curved path in accordance with the present disclosure.
Figure 18:
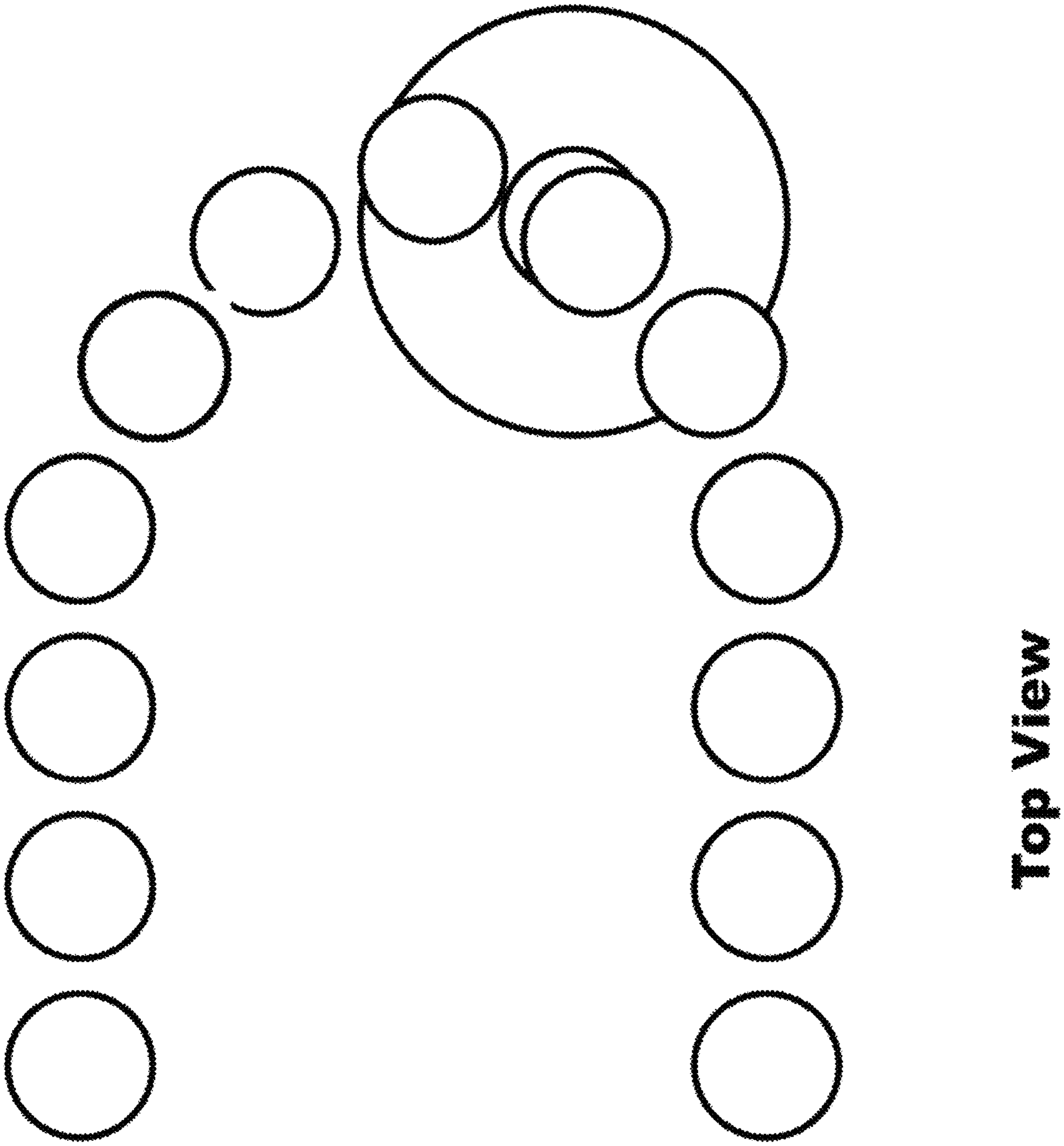
Figure 19:
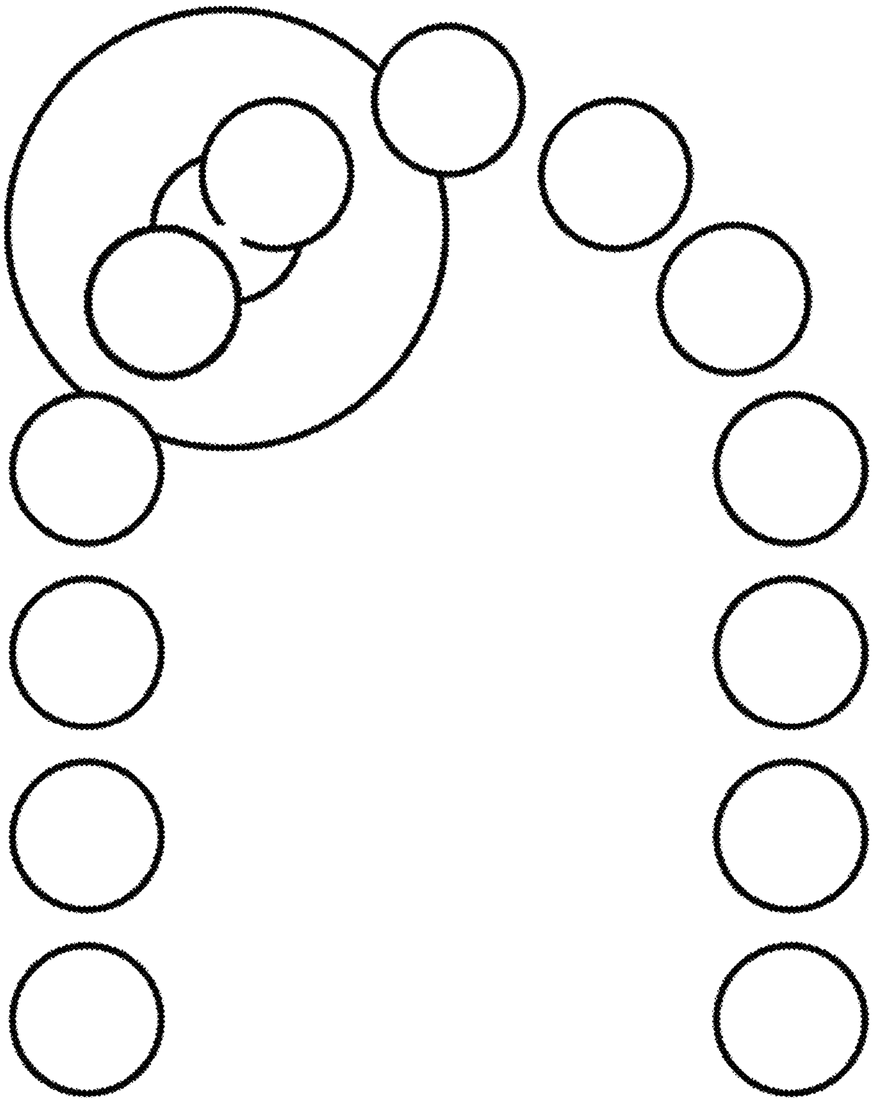
Figure 20:
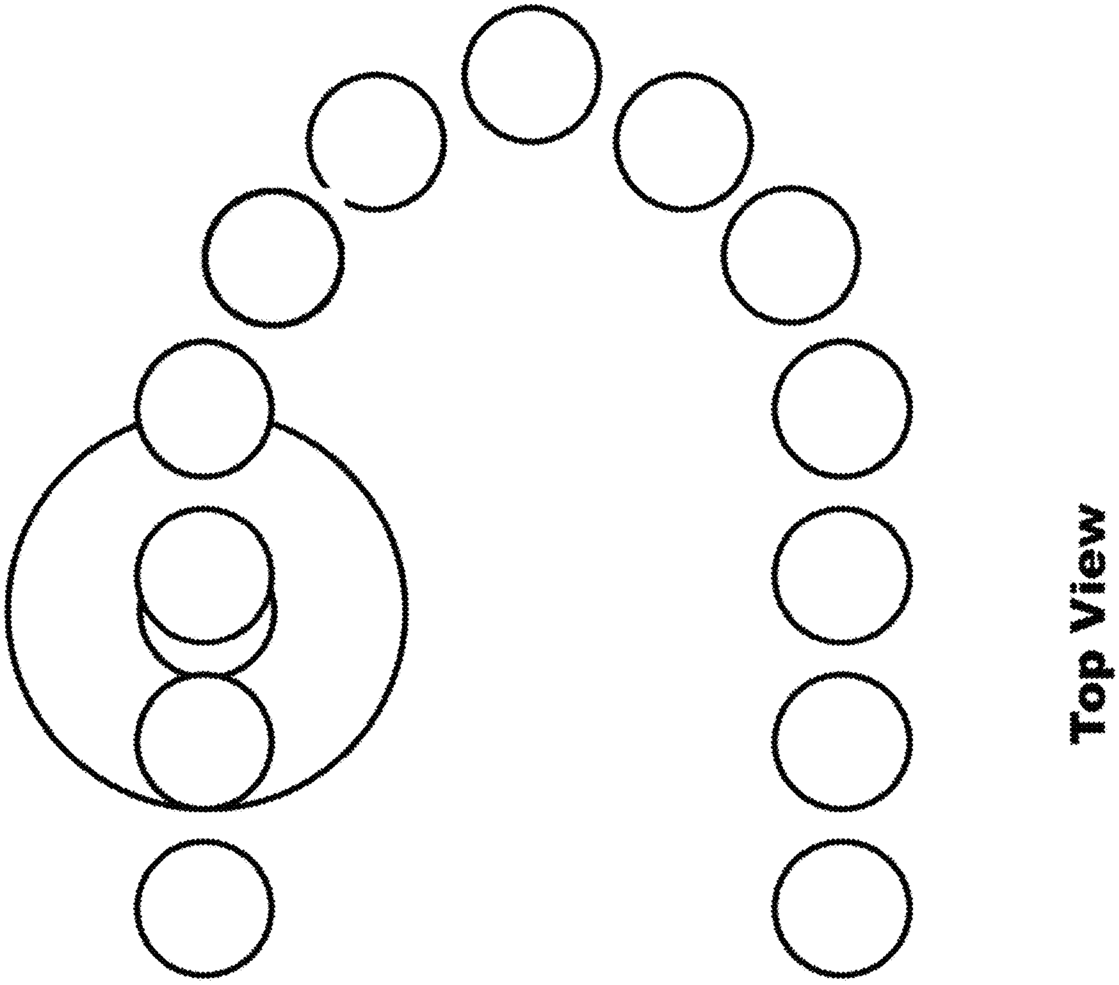
Figure 21:
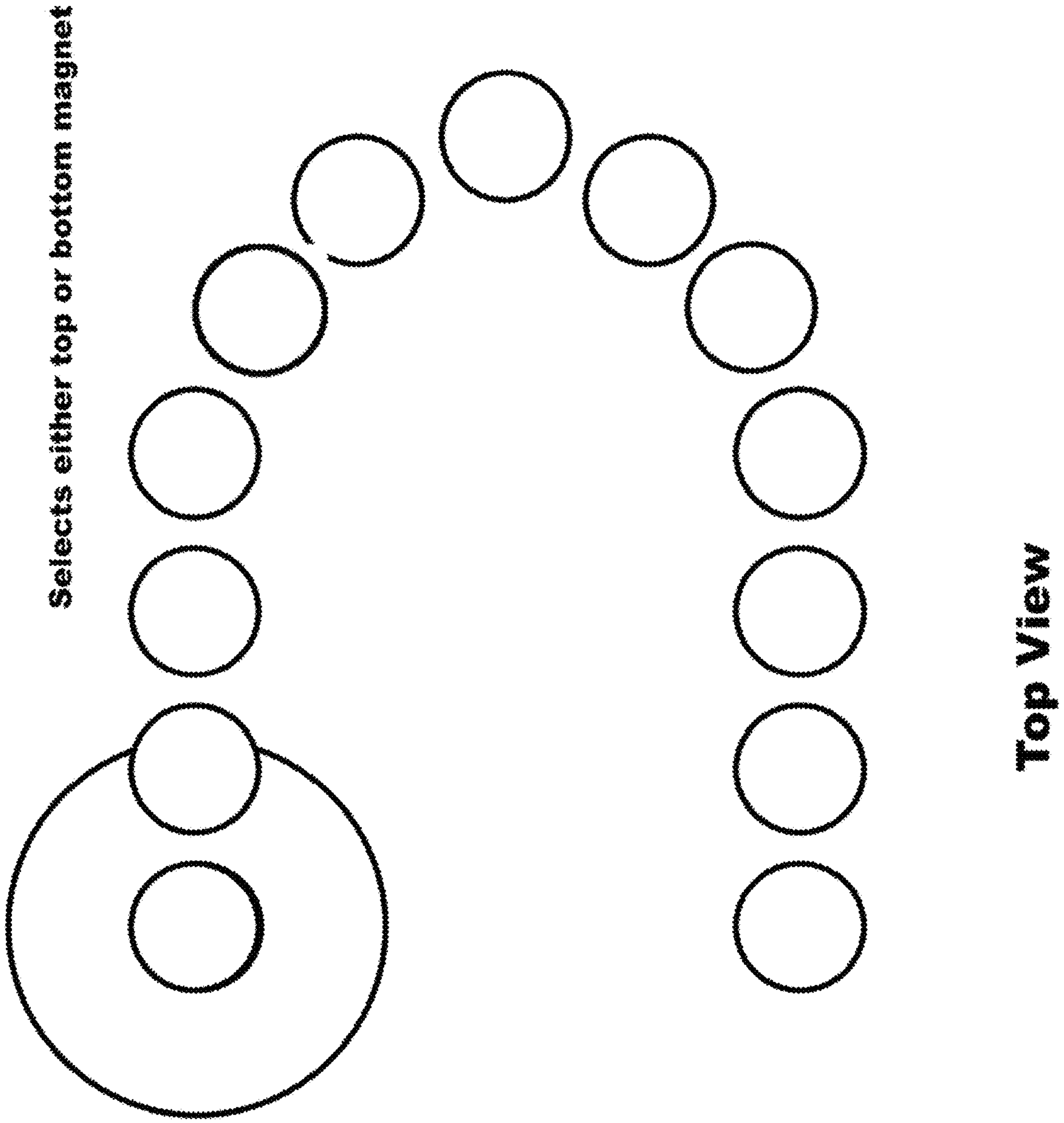

FIGS. 16-21 show an embodiment where the path taken by the projectile is curved and moves around a semi-circular path of a given radius; thus, the projectile, besides being propelled along straight paths, the chute that is formed around the curve, helps to guide the projectile as the projectile moves around the curve. A horseshoe curve is illustrated but curves shaped as an ellipse, circle or any other conceivable path of consideration may be used. FIG. 16 shows the projectile being applied to one end of the periodic confirmation of magnets. The projectile accelerates to a high velocity. All 13 periodic magnets, other embodiments include systems with more and less than this number, are comprised of the two overlapping magnets as shown in the perspective view illustrated in the upper left. FIG. 17 illustrates the projectile between the 3$^{rd}$ and 4$^{th}$ periodic magnets moving at a high velocity. FIG. 18 illustrates the projectile between the 6$^{th}$ and 7$^{th}$ periodic magnets moving at a high velocity rounding the curve. FIG. 19 illustrates the projectile between the 8$^{th}$ and 9$^{th}$ periodic magnets moving at a high velocity finishing the curve. In FIG. 20, the magnet is moving along the straight segment of the 11$^{th}$ and 12$^{th}$ periodic magnets moving at a high velocity and still moving. Finally, in FIG. 21, the projectile stops and is attracted to either the last top or bottom magnet of the periodic series. The projectile final stopping point is a function of several factors: frictional contact while travelling within chute, alignment of the magnetic slab, initial placement of projectile at starting point, moment of releasing the projectile, etc.

Figure 22:
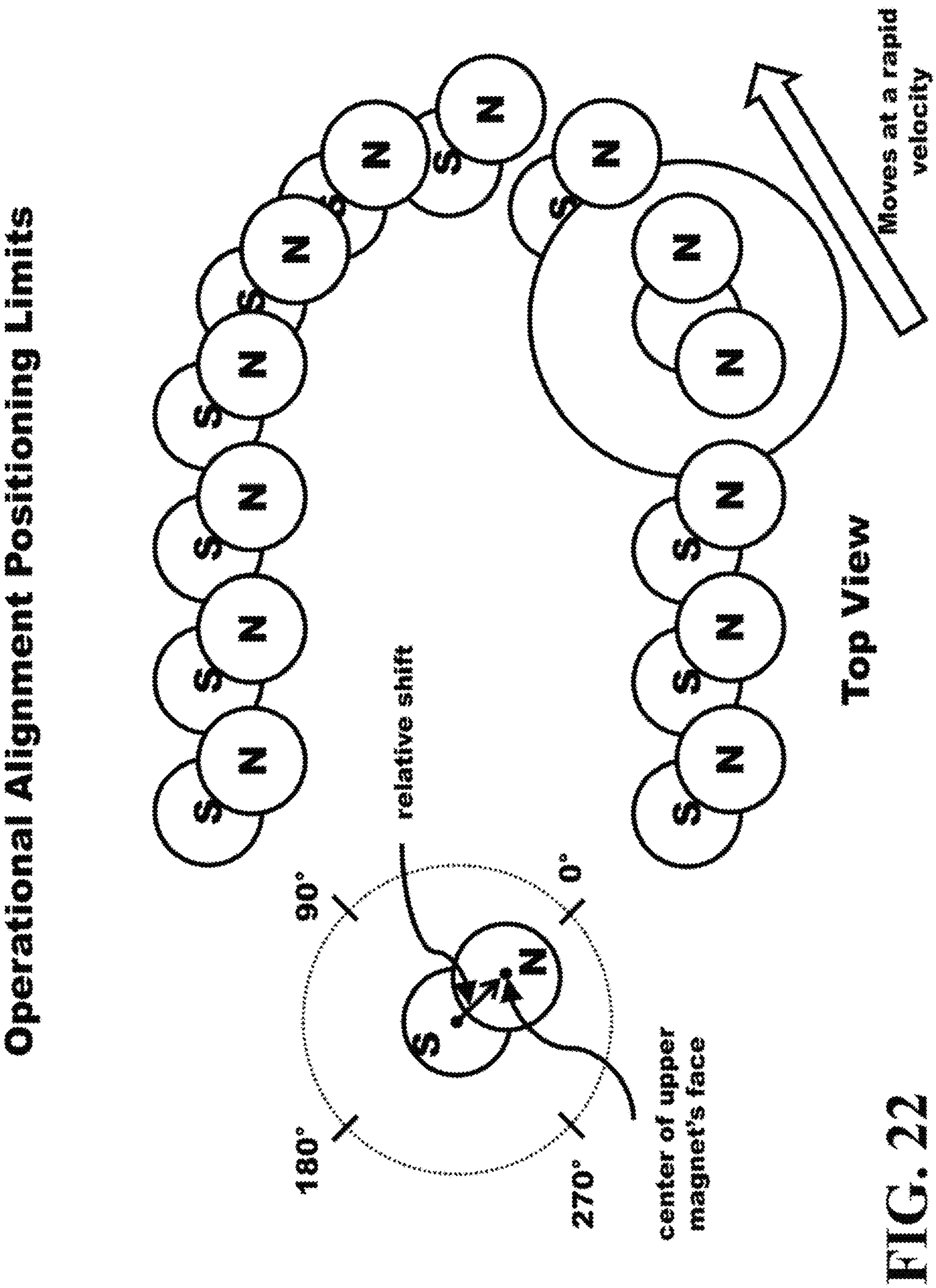
FIG. 22 shows a relative shift between the upper and lower arrangements of periodic magnets where the chute magnetic system still partially operates in accordance with the present disclosure.
Figure 23:
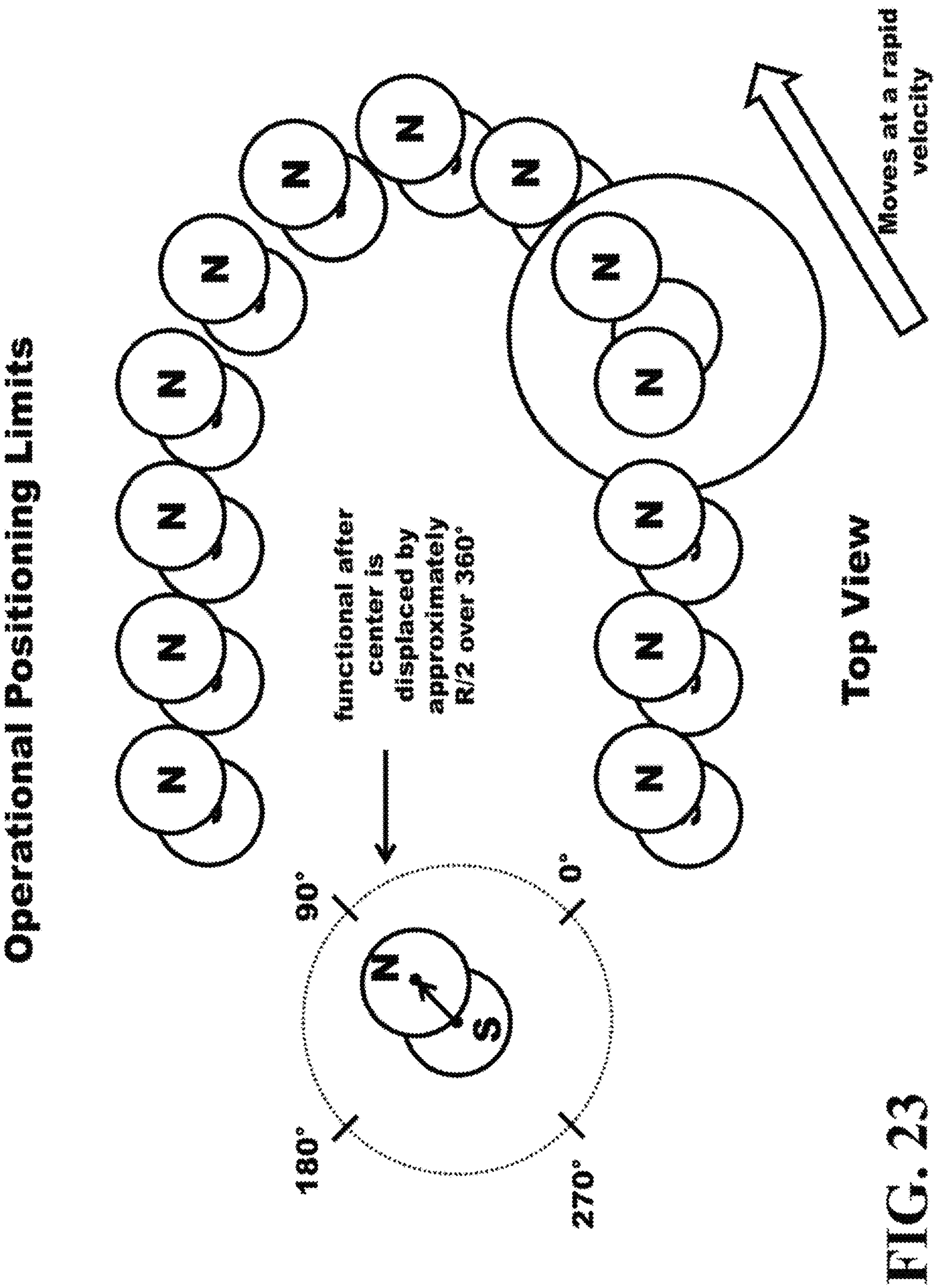
FIG. 23 illustrates a 90° shift of the two arrangements of periodic magnets given in FIG. 22 where the chute magnetic system still partially operates in accordance with the present disclosure.

Experiments were conducted with a real magnetic system that was misaligned as indicated. FIGS. 22-23 present a misalignment formed between the upper and lower periodic magnets by as much as ½ of the radius of the magnet. Interestingly, the projectile does not completely fail to operate but manages to travel a partial distance along the path. FIG. 22 shows the upper magnet shifted from the center of the lower magnet in the periodic structure by the relative shift (see insert in mid-left). FIG. 23 shows the relative shift pointing to 90°. The operation of the curved periodic magnetic structure also operates when the relative shift is at 180° and 270°. The magnetic chute system has a wide operating range of misalignment.

Figure 24A:
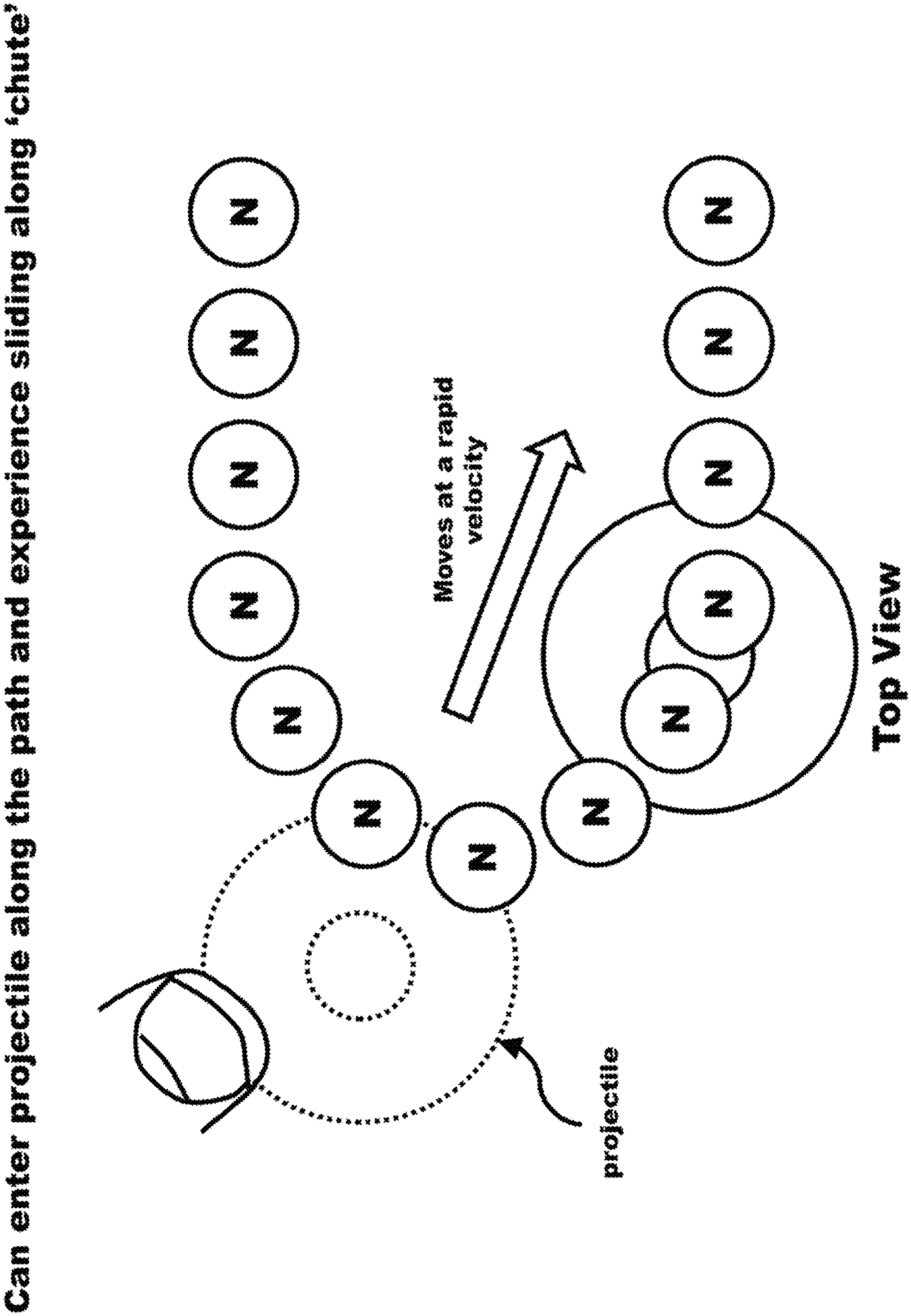
FIG. 24A depicts pushing the projectile into a mid-point path of the magnetic chute system and experiencing the magnetic field of the chute system in accordance with the present disclosure.

FIG. 24A shows an experiment using manual entry of the projectile into the middle of the path. After several attempts, the projectile was entered into the chute successfully and the projectile moved along the path.

Figure 24B:
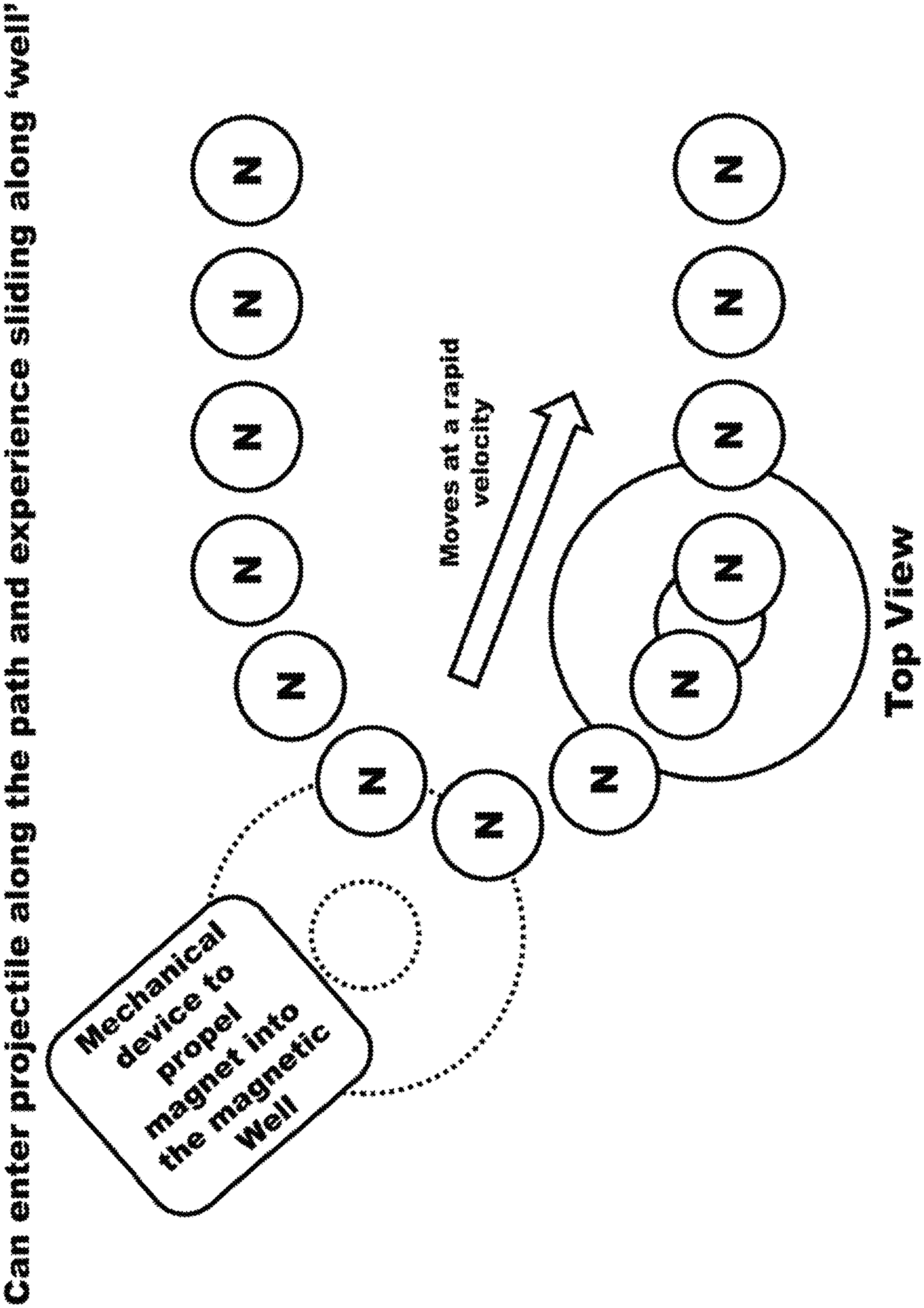
FIG. 24B illustrates mechanically pushing a projectile into the chute into a mid-point path of the magnetic chute system and experiencing the magnetic field of the chute system in accordance in accordance with the present disclosure.

In another embodiment, a mechanical device may be useful to cause the acceptance of the projectile into the chute by being able to repeat the same type of ejection from the device into either one of the ends of the path or introducing the projectile in between the ends as shown in FIG. 24B.

Figure 25:
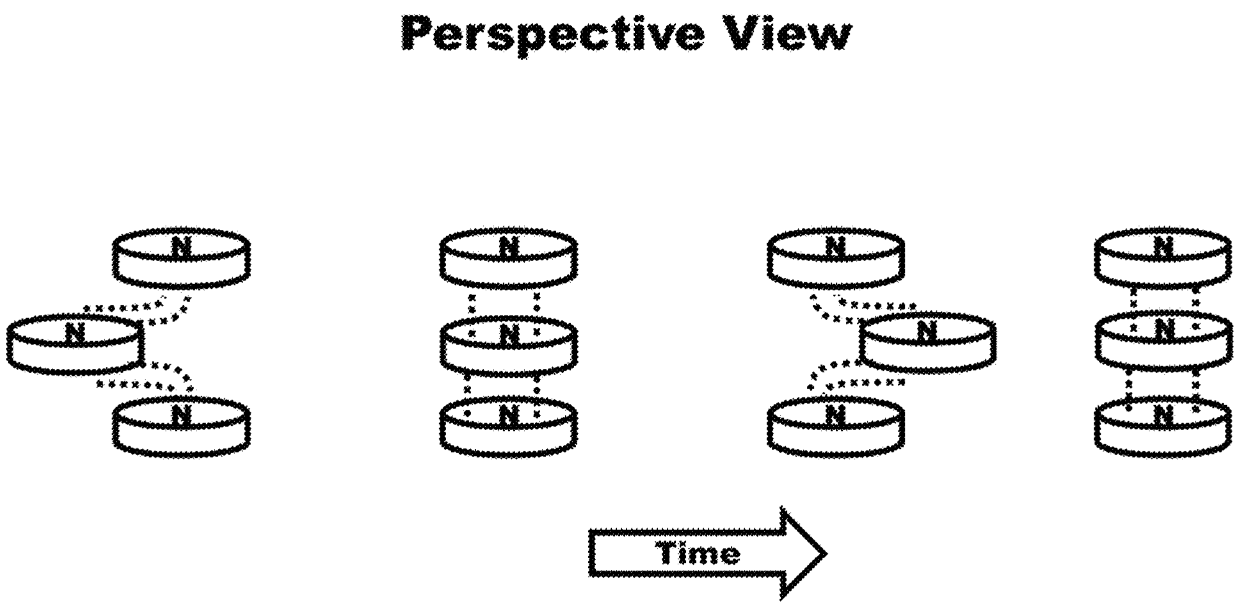
FIG. 25 presents a harmonic oscillator in accordance in accordance with the present disclosure.

FIG. 25 depicts a simple magnetic chute harmonic oscillator. Can a single magnet within the chute, once given kinetic energy, remain in oscillation?Table 3 lists several losses. Friction with the air molecules causes energy loss. This loss can be eliminated by placing the system in a vacuum. Because the projectile is moving and the magnets are conductive, eddy currents form in the conductors of the magnet and rob the system of energy due to heating. Magnets formed using a superconductive material would be necessary. The magnets can be formed of coils of superconductive wires and operated at cryogenic temperatures. The moving magnet in this case would be a coil that is initially given a current that continuously loops in the closed circuit forming a magnetic field. This coil becomes the projectile. Lastly, the coil must be positioned where the balance between the magnetic forces pulling up balance the magnetic forces and gravity pulling down on the coil. Noise can easily upset this balance. Placing the system at cryogenic temperature can reduce or eliminate noise from the system.

Figure 10:
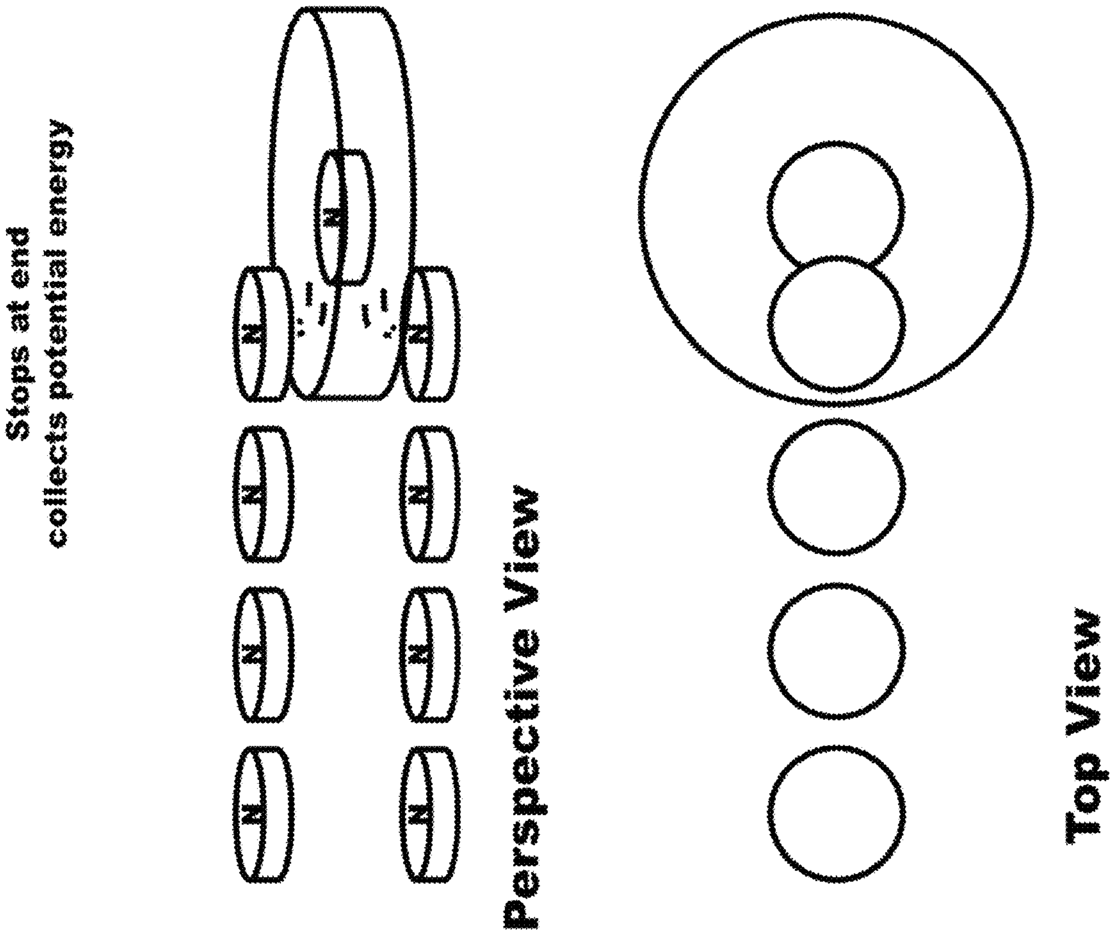
FIG. 10 illustrates the projectile moving past the end of the periodic arrangement of magnets and stopping thereby converting the entire projectile's kinetic energy to potential energy in the present disclosure.
Figure 11:
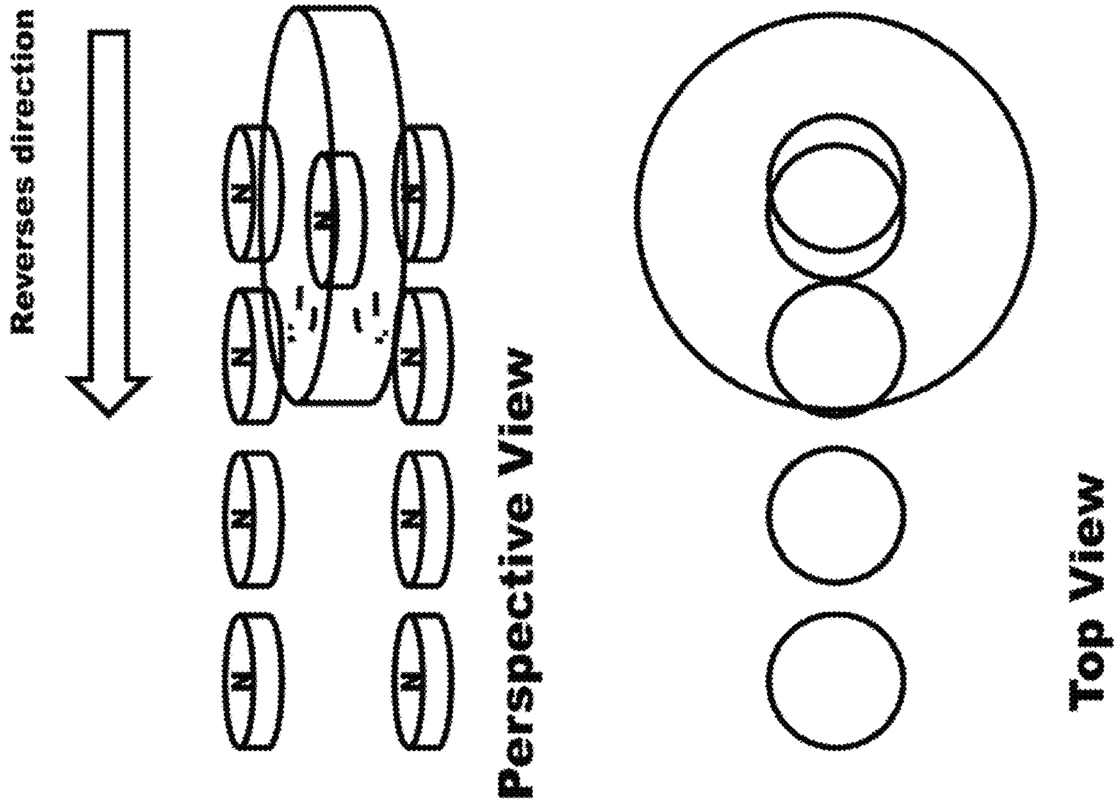
FIG. 11 shows the projectile re-entering the chute transferring the potential energy back into kinetic energy in the reverse direction in accordance with the present disclosure.
Figure 12:
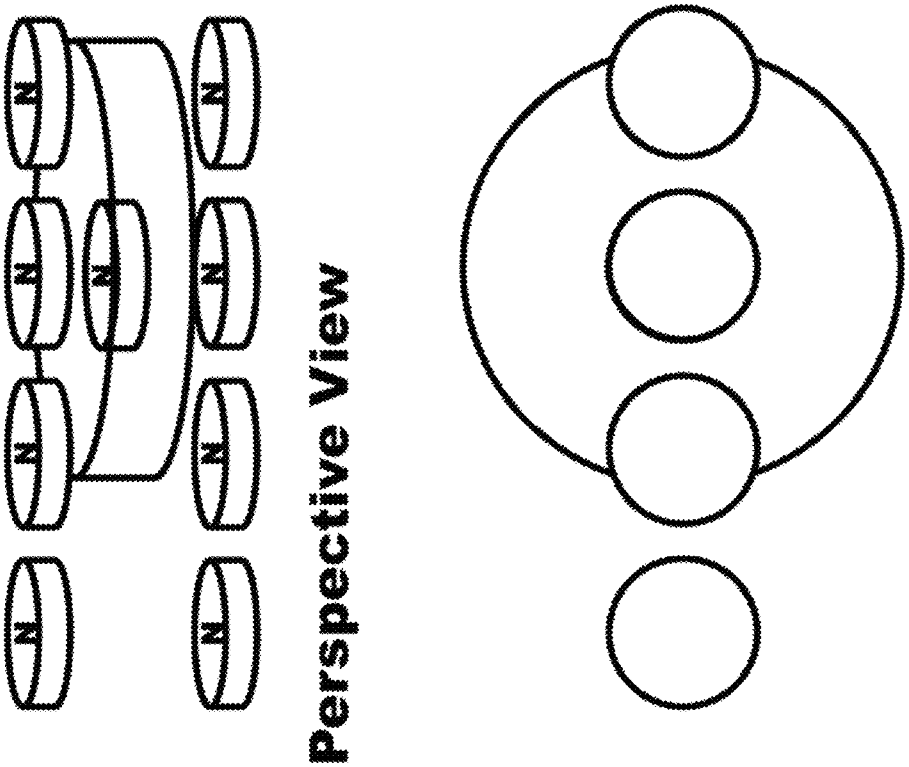
FIG. 12 depicts the projectile magnetically attached to either the top or bottom periodic arrangement of magnets after friction reduces the projectile's energy to zero in accordance with the present disclosure.

After the projectile had been accelerated at the start of the path and when the projectile reached the end of the path, the projectile stops quickly and reverts directions, as previously described in FIG. 10. It is at this transition point that a payload can be launched. FIG. 26A presents such a system to launch payloads. The projectile comprised of the propelled magnet and payload can be entered into the chute either by hand or mechanically. After the projectile and payload are accelerated, the projectile reaches the end of the path; the accelerated payload is ejected out of the machine after the projectile stops. FIG. 26B illustrates the payload being in front of the projectile. The payload has only one degree of freedom of movement (along the small cylindrical shaft parallel to the direction of movement) with respect to the projectile; that is the forward direction. FIG. 26C illustrates the one degree of freedom of the payload being attached to the projectile. Once the projectile stops, the payload slides along the thin cylinder (easily detachable interface) and off into space at a high velocity.

FIG. 27A-C illustrates a similar system as in FIG. 26 with the exception that electronics and magnetic coils can be used to aid the existing magnets during the acceleration process. The electronics includes coils to form magnetic fields strategically placed that would aid in accelerating the payload.

Figure 28A:
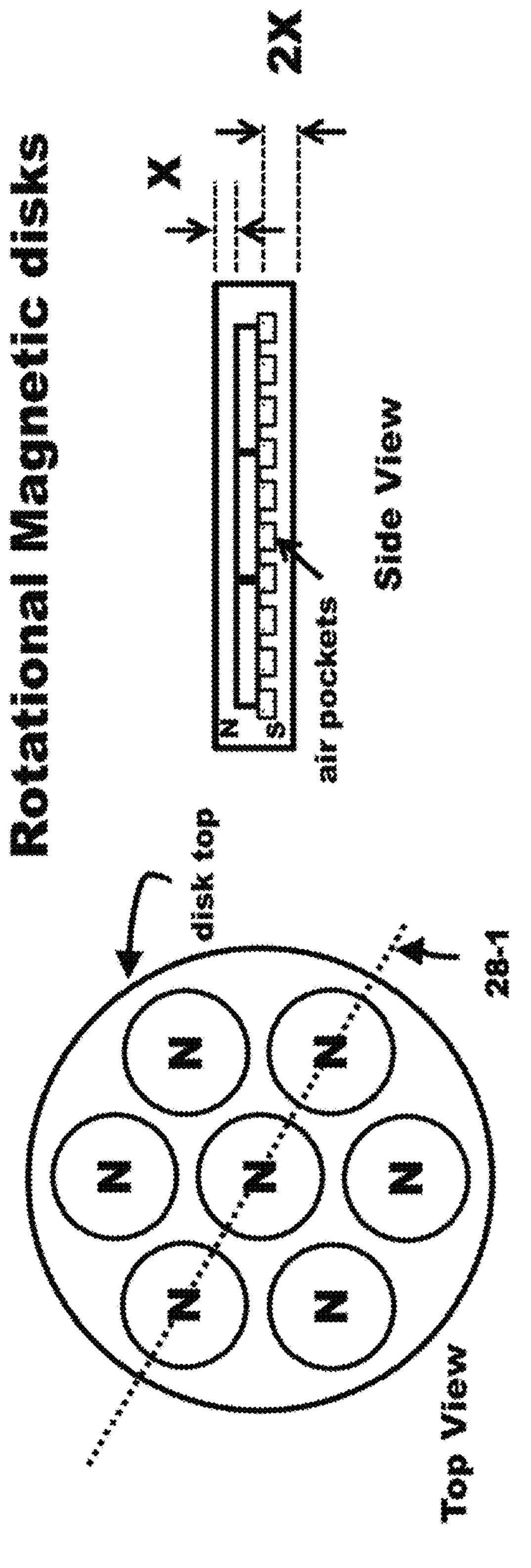
FIG. 28A depicts an embodiment of using a periodic magnetic arrangement to create a rotational magnetic disk, one face of the magnets includes a first thickness of non-magnetic material and the other face includes a second thickness of non-magnetic material arranged in accordance with the present disclosure.
Figure 28B:
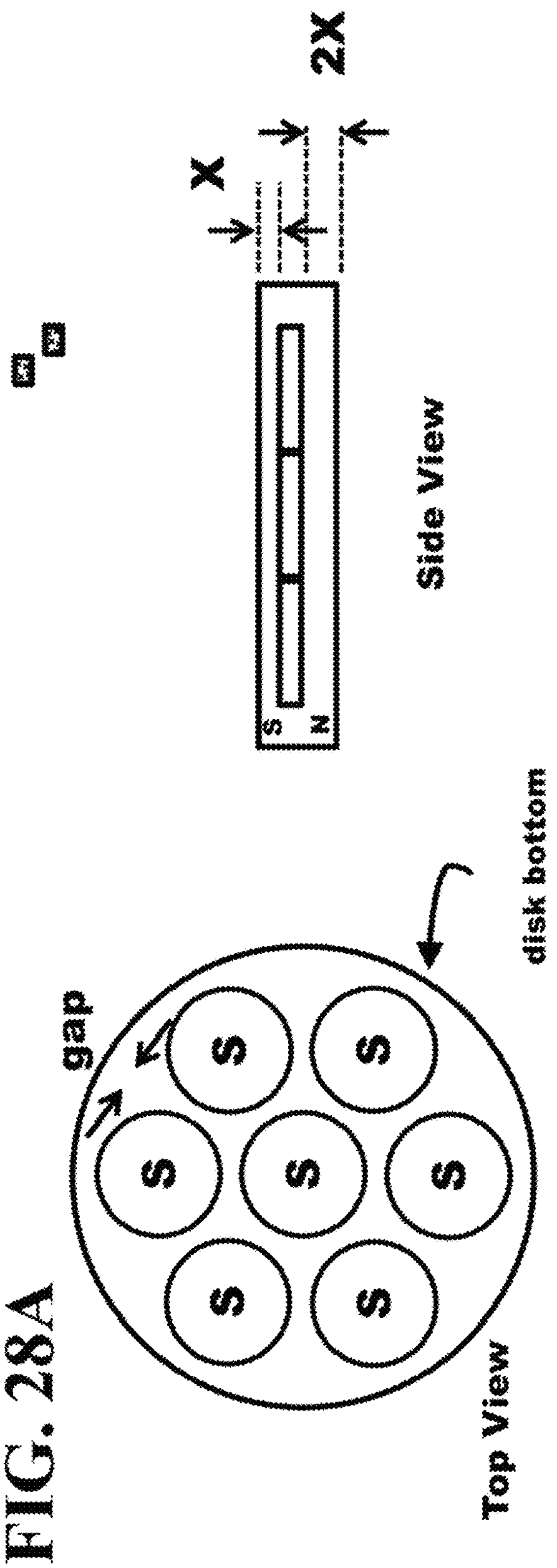
FIG. 28B shows another embodiment using a periodic magnetic arrangement to create a rotational magnetic disk, one face of the magnets includes a first thickness of non-magnetic material and the other face includes a second thickness of non-magnetic material arranged as in FIG. 28A, but the south magnetic field pointing at the reader in accordance with the present disclosure.

A different type of an embodiment arranging magnets is illustrates in FIG. 28. This type of embodiment uses the attractive and repulsive forces of magnets arranged on an annular pattern to make a hand held fidget. FIG. 28 illustrates magnet discs arranged on a plane in an annular pattern around a central magnet. The magnets along the radial curve are separated by a gap as shown in FIG. 28B. The magnets are encased within a non-magnetic material forming a larger disk. One further embodiment is where the thickness surrounding the magnets on one side may be different or similar to that of the other side.

FIG. 28A illustrates a top view of a 'disk top' that is comprised of six axial magnets, 'north' face up, arranged radially around a central magnet. The side view (to the left) shows the 'north' face of the magnets is covered with a first thickness X, while the 'south' face of the magnets is covered with a first thickness 2X. In this case, it is a 2 to 1 ratio, but can be of other ratios as well. FIG. 28B presents a top view of a 'disk bottom' that comprises six axial magnets, 'south' face up, arranged radially around a central magnet. The two disk's radial positioning of the magnets is identical. The side view shows the 'south' face of the magnets is covered with a first thickness X, while the 'south' face of the magnets is covered with a first thickness 2X. This is the same ratio as in FIG. 28A but can be other ratios as well. The diameters of the 'disk top' and 'disk bottom' are sized similarly.

Figure 29:
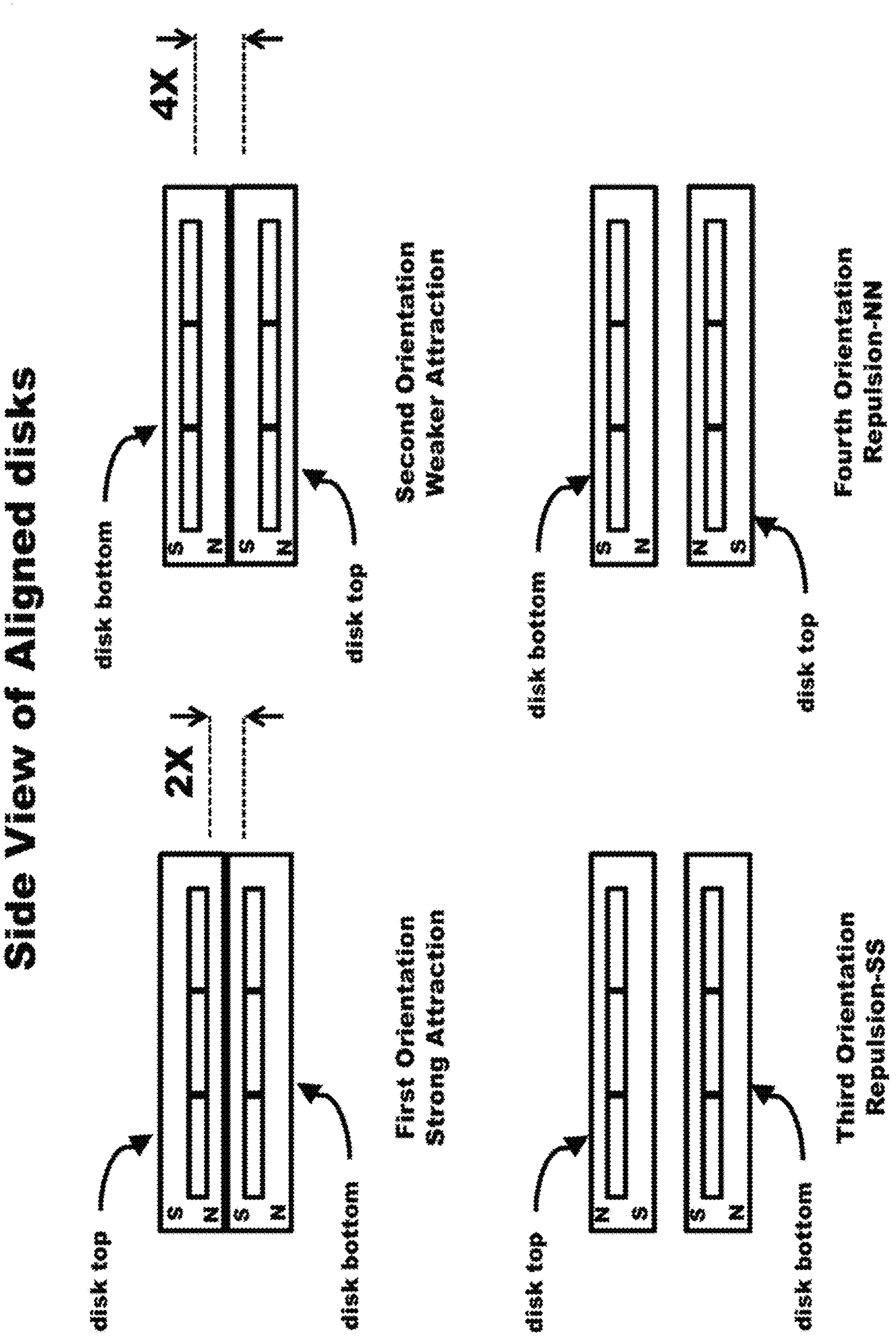
FIG. 29 depicts the disks of FIG. 28 orientated on one another for all four possible variations, two variations are attractive (weak and strong), the two are repulsive in accordance with the present disclosure.

FIG. 29 presents 4 different configurations possible when aligning the 'disk top' to the 'disk bottom.' In the 'First Orientation' a distance of 2X separates the 'north' face from the 'south' face making for a strong attraction between the two disks. In the 'Second Orientation,' both disks are flipped, causing a distance of 4X to separate the 'north' face from the 'south' face making for a weaker attraction between the two disks. In the 'Third Orientation' a magnetic repulsive distance separates the 'south' face from the 'south' face making it difficult to touch the two disks together. In the 'Fourth Orientation' a magnetic repulsive distance separates the 'north' face from the 'north' face making it difficult to touch the two disks together. In both of the latter two cases, the disks can be held in place by the thumb and fingers of both hands of the user balanced against the repelling force, such that the disks are at the optimal placement of a repelling distance and seems to be magically held there in place.

Figure 30:
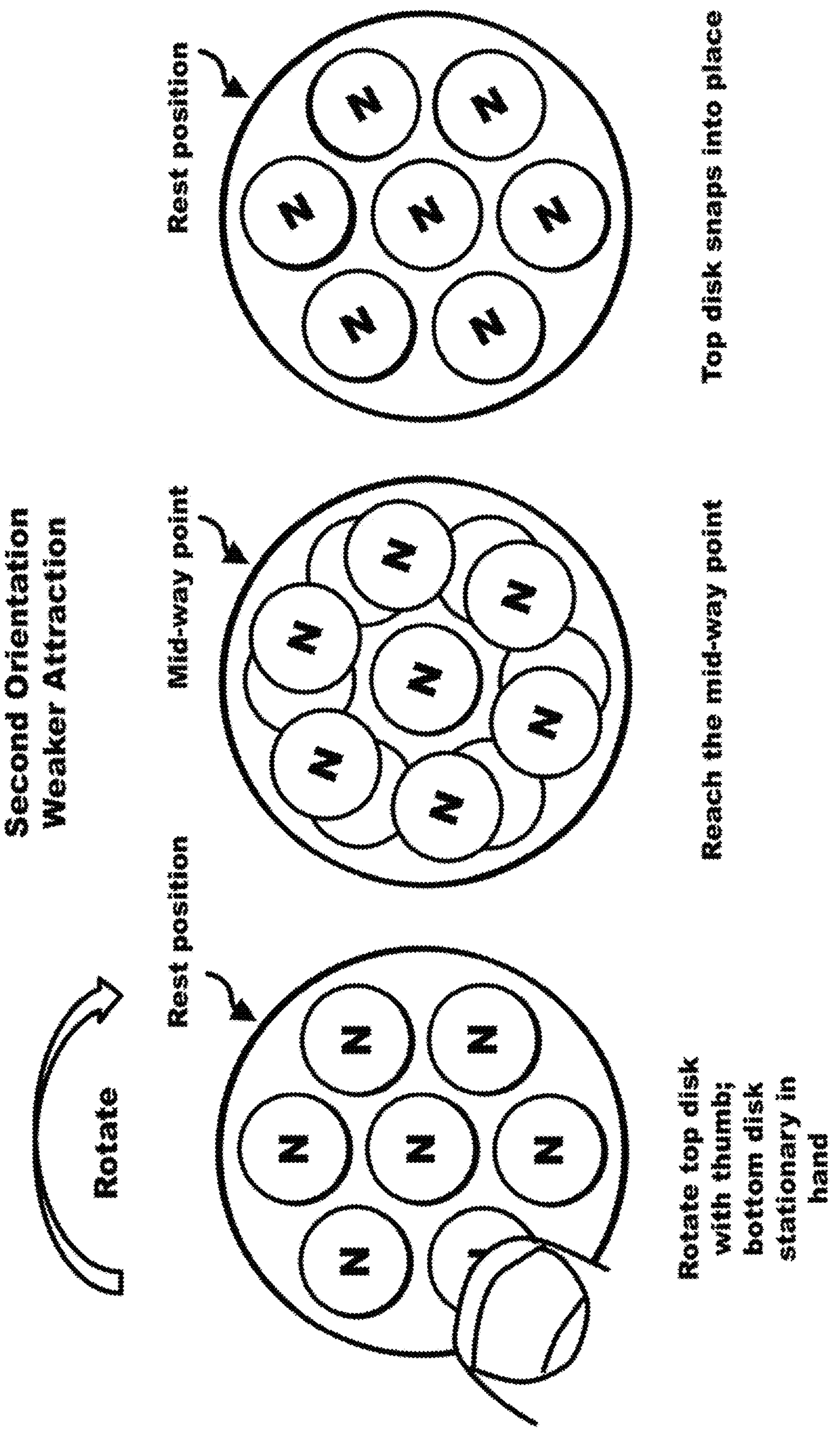
FIG. 30 illustrates the two disks arranged in the ‘second orientation weaker attraction’ in the palm of a hand, the thumb rotating the upper disk against the weakly repulsive force to reach the mid-way point, where upon the disk snaps into the next allowable rotational position in accordance with the present disclosure.

FIG. 30 shows an embodiment with the disks of FIG. 29 in the 'Second Orientation' used as a fidget held within the hand. The weaker attraction, due to the thicker layer of non-magnetic material separates the upper magnets from the lower magnets. The weaker force allows the upper disk to be rotated using the thumb to the mid-way point. This is where the disk has a restoring pull back to its initial position versus a forwarding pull to the next position where the magnets align. A slight push past the mid-way point causes the apparatus to snap into the new position shown on the right.

Figure 31:
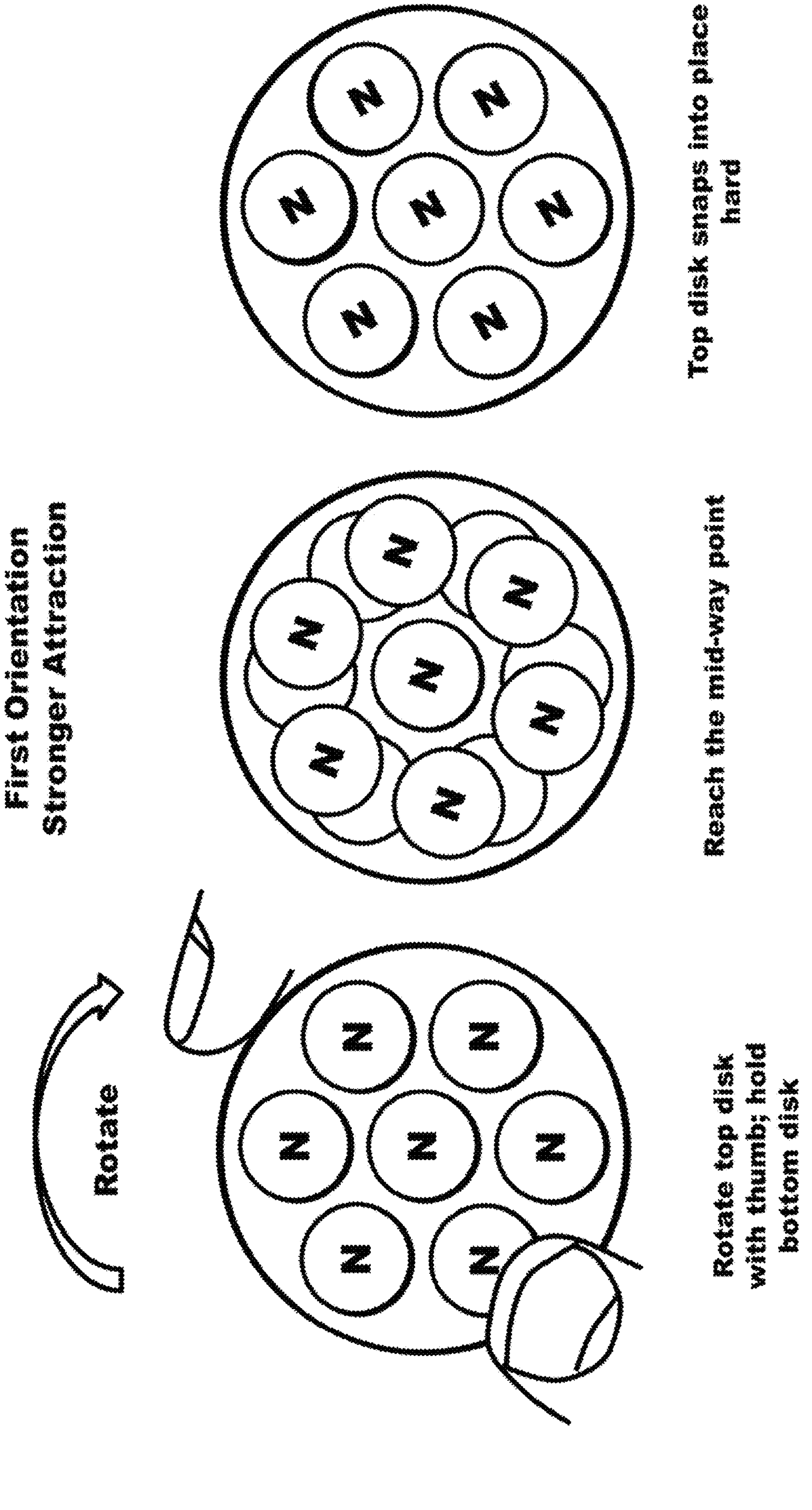
FIG. 31 shows the two disks arranged in the ‘second orientation stronger attraction’ in the palm of a hand, both thumbs help rotate the highly repulsive force presented by the disks to reach the mid-way point, where upon the disk quickly and impulsively snaps into the next allowable rotational position in accordance with the present disclosure.

FIG. 31 shows the disks of FIG. 29 in the 'First Orientation' used as a fidget held within one or between two hands. The stronger attraction makes rotating the disks a little more difficult. The effects of FIG. 30 are amplified due to the increased stronger attraction of magnets. Once the upper disk is rotated to the mid-way point using one or two hands, the restoring pull back to its initial position versus a forwarding pull to the next position where the magnets align is much stronger than the disks being in the 'Second Orientation.' A slight push past the mid-way point causes the apparatus to snap very hard into the new position shown on the right.

Figure 32:
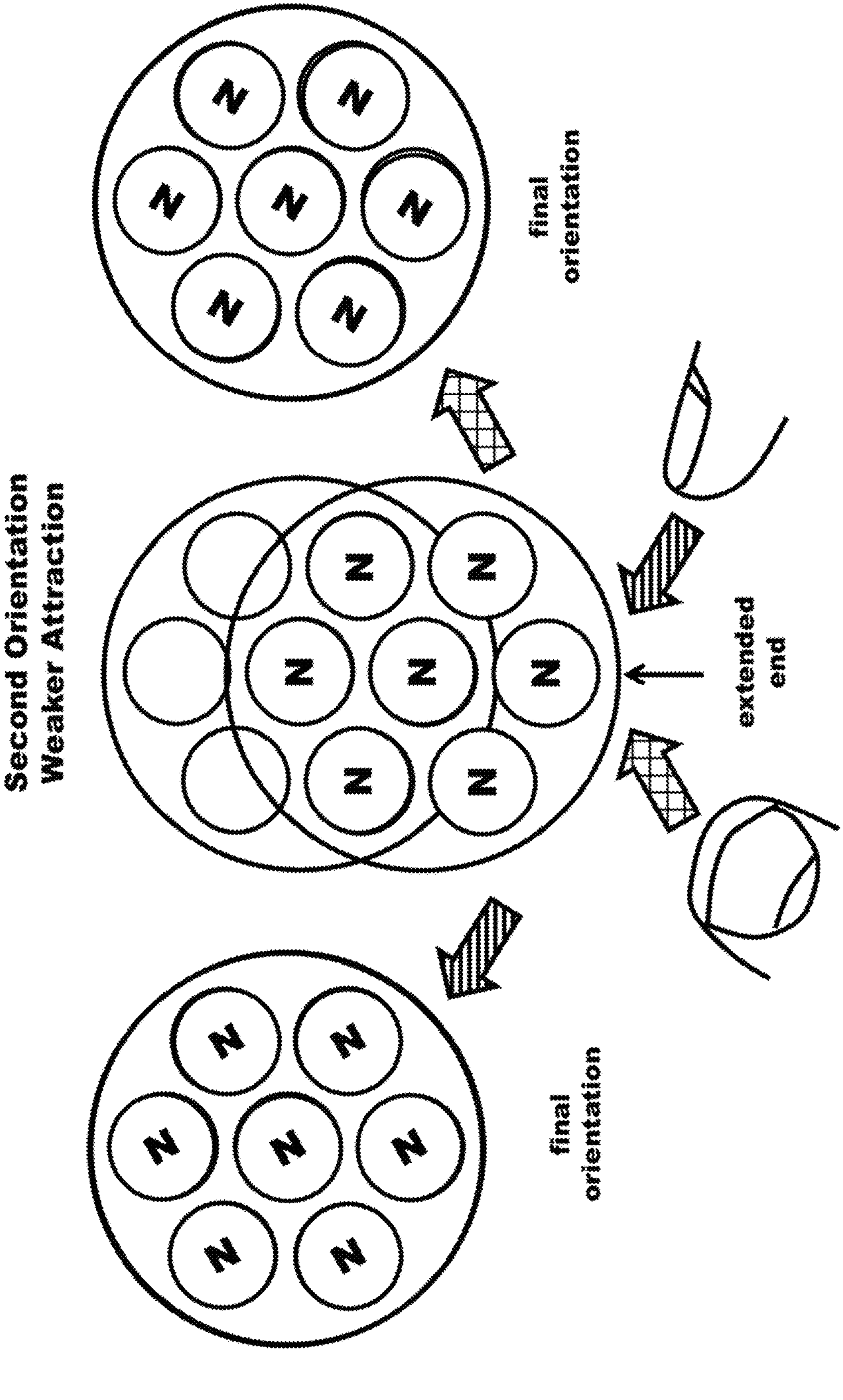
FIG. 32 depicts the two disks arranged in the ‘second orientation weaker attraction’ but shifted down one magnet position, a slight movement of the extended end either way, causes the disk to align in one of two different final orientations in accordance with the present disclosure.

FIG. 32 illustrates one of the many variations the disks can be used to experience the magnetic attraction forces. Using the 'Second Orientation', as shown in the middle diagram, a slight push to the left snaps the upper disk into the final position shown on the left, while a slight push to the right snaps the upper disk into the final position shown on the right.

The fidget toy can be made into a variety of embodiments. One very versatile and unique example is to create a random pattern for the positioning and magnetic orientation of the magnets. To create a random set of disks, place and attached the magnets in random positions (locations on the disk) and in random magnetic orientations ('north', 'south') in the 'disk bottom'. The 'disk top' is then placed face-to-face to the 'disk bottom' (configuration similar to the 'First Orientation' in FIG. 29); any magnets added to the top disk automatically align their positions by magnetic attraction to its compliment in the 'disk bottom.' Add and attach magnets to the 'disk top' until all magnets in the 'disk bottom' are matched. These magnets can be adhered to the disk. Due to the randomness, when this random 'disk top' is rotated, there will be combinations of attractions and repulsions causing the disks to experience a wavy movement during rotation. Furthermore, the disk can be designed for the user to feel repetitive repulsion and attractive forces while rotating the disk.

Figure 33:
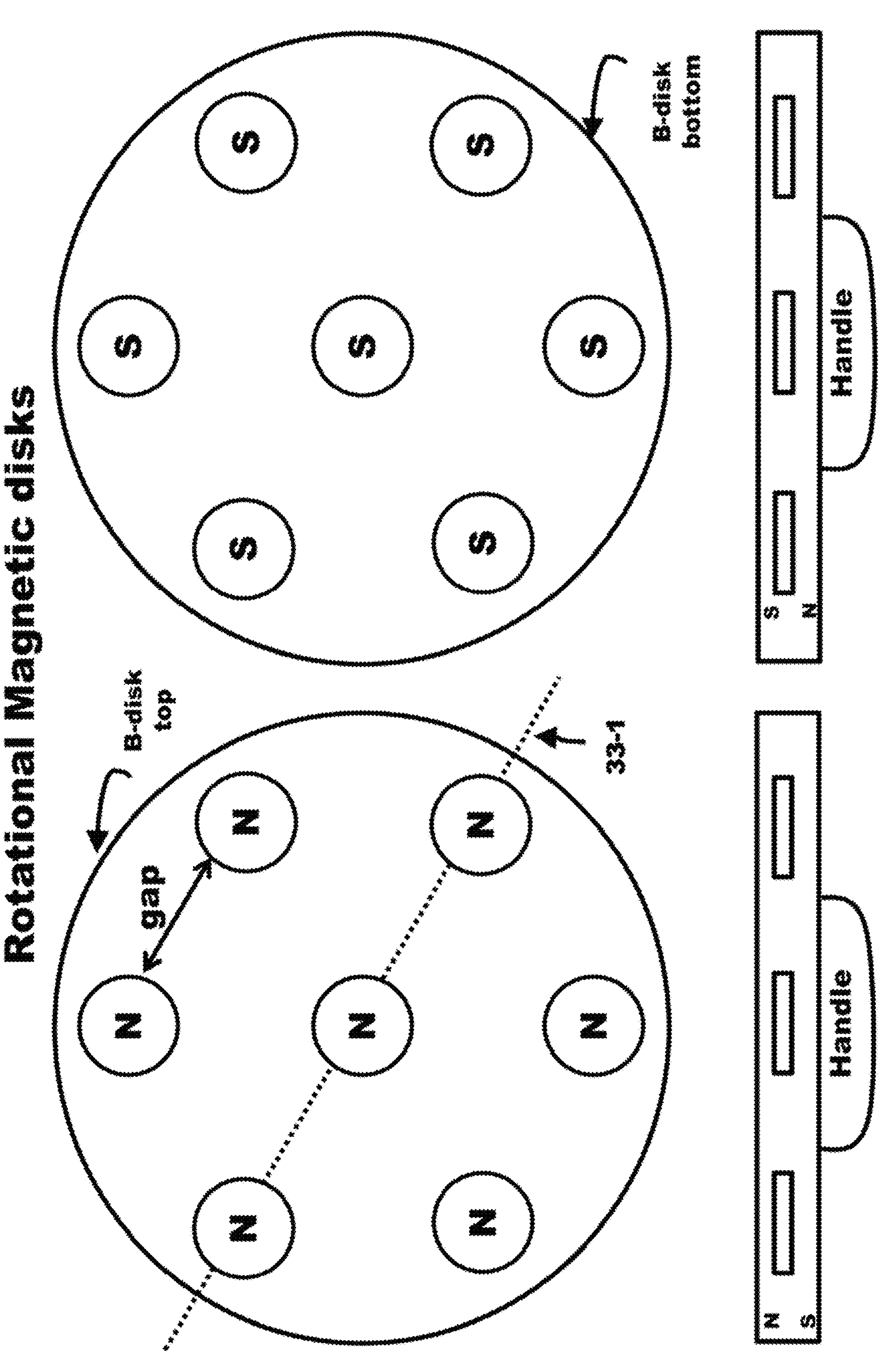
FIG. 33 illustrates the magnetic flux lines between the north face and south face of the disc magnets arranged in accordance with the present disclosure.

FIG. 33 illustrates a top view of a 'B-disk top' that is comprised of five axial magnets, 'north' face up, arranged radially around a central magnet. The side view (to the bottom) shows the 'north' face of the magnets is covered with a first thickness, while the 'south' face of the magnets is covered with a second thickness. The disk to the right presents a top view of a 'B-disk bottom' that comprises five axial magnets, 'south' face up, arranged radially around a central magnet. The two disk's radial positioning of the magnets is identical. The side view shows the 'south' face of the magnets is covered with a first thickness, while the 'south' face of the magnets is covered with a second thickness. The diameters of the 'disk top' and 'disk bottom' are sized similarly. Note that the radial magnets are separated by a gap.

Figures 34A, 34B, 34C:
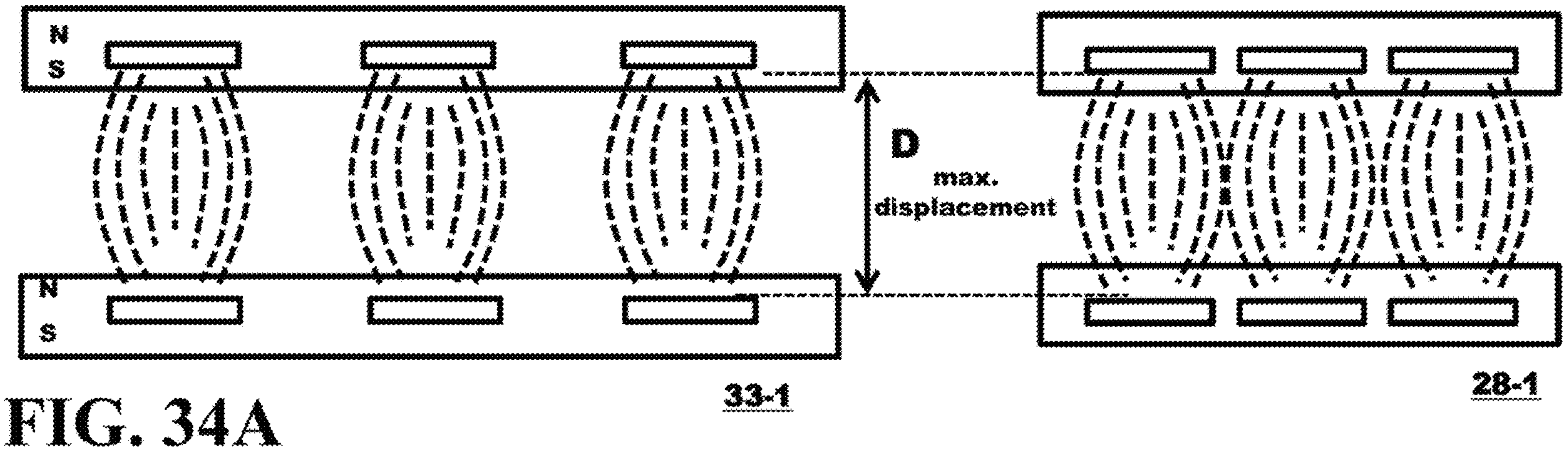
FIG. 34A shows the magnetic flux lines between the north face and south face of the disc magnets for the cross-sectional view along line 33-1 in FIG. 33 and the cross-sectional view along line 28-1 in FIG. 28 showing how segregation of the flux intensities maintains the snapping characteristic for a distance (D) in accordance with the present disclosure.
FIG. 34B depicts Table 3 that provides the properties of the disc magnet and the dimension of the gap for cases 33-1 and 28-1 as the rotational disks are rotated that used in accordance with the present disclosure.
FIG. 34C depicts Table 4 that provides the properties of the snapping effect as the rotational disks are separated and rotated just past its half-way point between two rest points in accordance with the present disclosure.

FIG. 34C presents experimental results of rotating and comparing two different sets of rotational magnetic disks of FIG. 33 and FIG. 28 and feeling if the disks have the ability to snap into place at the mid-way point (see FIG. 30). FIG. 34A illustrates the cross-sectional view of the magnetic flux lines between the top and bottom disks for the system 33-1 shown in FIG. 33 and the system 28-1 shown in FIG. 28 when the disks are in their rest position (as noted in FIG. 30). The gap is the separation of between magnets between the radial magnets.

FIG. 34B presents a Table 4 providing the type of magnet used is a N42 axial disc magnet. The dimensions of the magnet are given, and for the case 33-1 the gap is 27.8 mm while in the case 28-1, the gap is only 1.9 mm.

FIG. 34C provides the measured data, performed on one example of the embodiment, in Table 5 when these two sets of disks were rotated from one rest position, through the mid-position point, then snapping into the next rest position. The max. displacement (D) between the upper and lower disk was varied by placing a non-magnetic block with appropriate dimensions between the disks. Note that the system with the larger gap (33-1) shows the islands of flux separated from one another while the system with the smaller gap (28-1) the islands of flux start to intermingle and start to loss their independence.

FIG. 34C presents the measures results. When the upper and lower disks were separated by 2.4 mm, the snap was very strong for both sets of disks 33-1 and 28-1. Similarly, when the upper and lower disks were separated by 5.5 mm, the snap was strong for both sets of disks 33-1 and 28-1. At a D of 8.6, there was a difference. The system 33-1 experienced a weak snap but it was not discernable for the case 28-1. When D was increased to 11.7 mm, the system 33-1 experienced a very weak snap while it was not discernable for the case 28-1. Finally, at a D of 16 mm, for the case of 33-1, it was discernable and not noticed for the case 28-1. This occurs because of the magnitude of the gap; the separation of the magnets from one another along the radial path. When the gap is larger, the flux line are more separated (see FIG. 34A). This helps prevent the flux lines from one pair of magnets to interfere with the adjacent pair of magnets.

Figure 35:
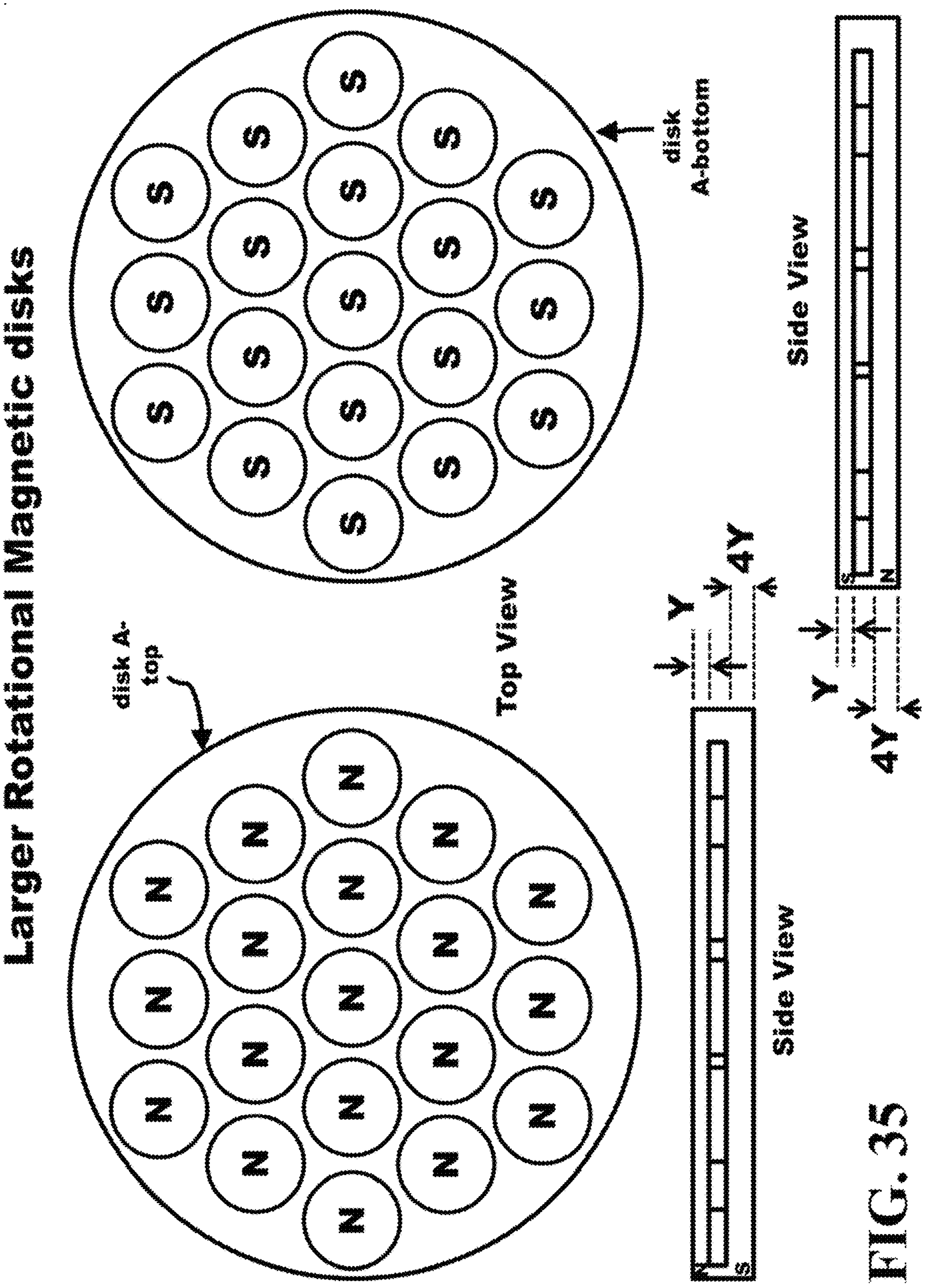
FIG. 35 shows another embodiment of using a periodic magnetic arrangement to create a second larger rotational magnetic disk, one face of the magnets includes a first thickness of non-magnetic material and the other face includes a second thickness of non-magnetic material in accordance with the present disclosure.

FIG. 35 illustrates anther embodiment showing a top view (on the left) of a 'disk A-top' that comprises 19 axial magnets, 'north' face up, arranged radially around a central magnet. The side view shows the 'north' face of the magnets is covered with a first thickness Y, while the 'south' face of the magnets is covered with a first thickness 4Y. In this case, it is a 4 to 1 ratio, but can be of other ratios as well. A top view of a 'disk A-bottom' that comprises 19 axial magnets, 'south' face up, arranged radially around a central magnet. The side view shows the 'south' face of the magnets is covered with a first thickness Y, while the 'south' face of the magnets is covered with a first thickness 3Y. This is the same ratio as in 'disk A-top' but can be other ratios as well. The diameter of the 'disk A-top' and 'disk A-bottom' are substantially sized similarly.

Figure 36:
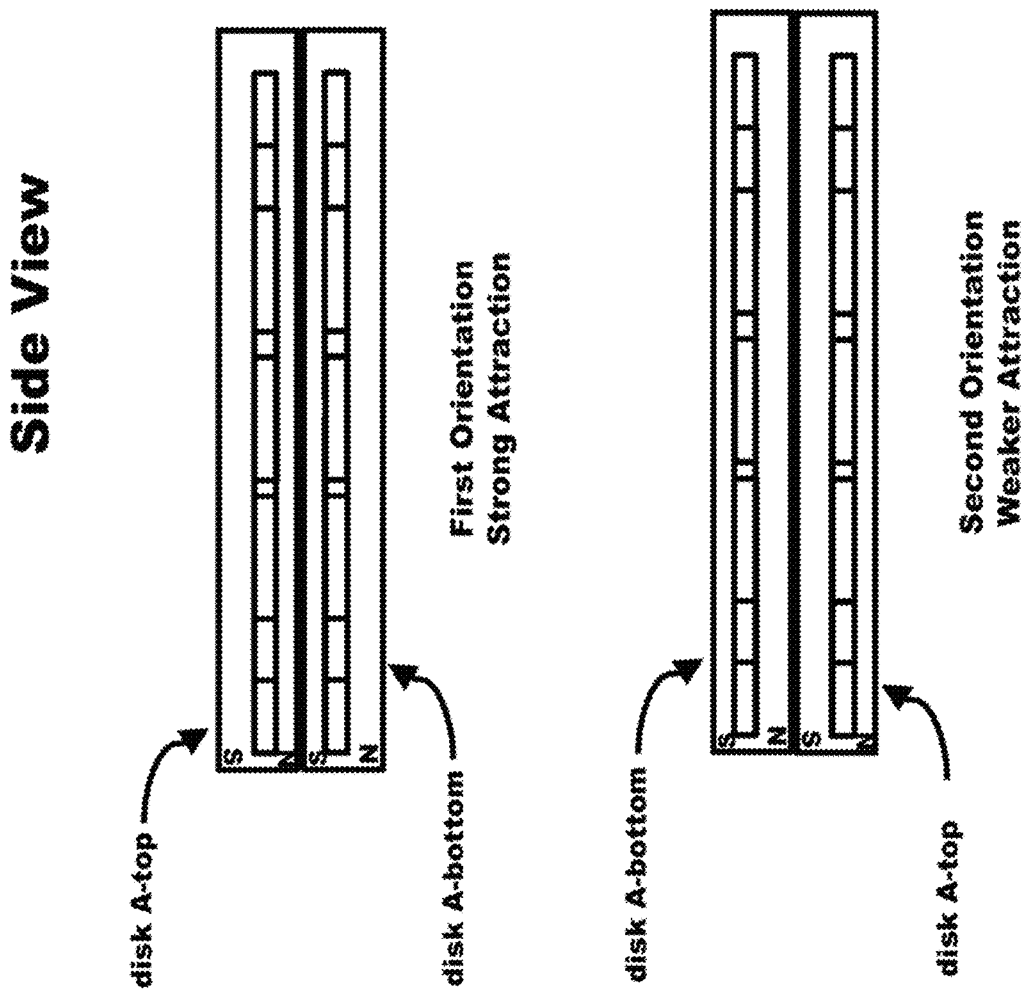
FIG. 36 illustrates the disks of FIG. 35 orientated on one another for two of the four possible variations, the two variations shown are attractive (weak and strong), the other two are repulsive (not shown) in accordance with the present disclosure.

FIG. 36 presents 2 of the 4 different configurations possible when aligning the 'disk A-top' to the 'disk A-bottom.' In the 'First Orientation' a distance of 2Y separates the 'north' face from the 'south' face making for a strong attraction between the two disks. In the 'Second Orientation' a distance of 8Y separates the 'north' faces from the 'south' faces making for a weaker attraction between the two disks. In the 'other two orientations, a magnetic repulsive distance separates the 'north' face from the 'north' face making it difficult to touch the two disks together due to the repulsive force.

Figure 37:
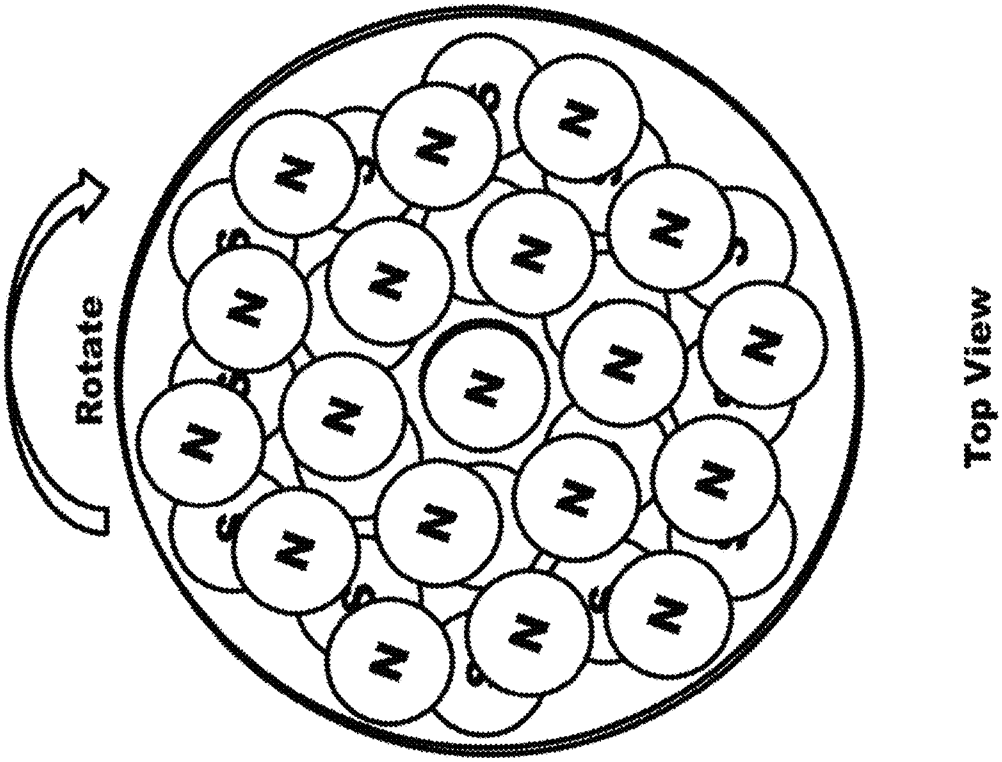
FIG. 37 shows the two disks arranged in one of the two attractive orientations, after the top disk has been rotated about the axis of the disk in accordance with the present disclosure.

FIG. 37 shows the disks of FIG. 35 in the 'First Orientation' used as a fidget. The stronger attraction makes rotating the disks a little more difficult. The effects are amplified due to of stronger attraction of the increased number magnets. Once the upper disk is rotated to the mid-way point (as shown) using one or two hands, the restoring pull back to its initial position versus a forwarding pull to the next position where the magnets align is much stronger than the disks being in the 'Second Orientation.' A slight push past the mid-way point causes the apparatus to snap very hard into the new position.

Figure 38:
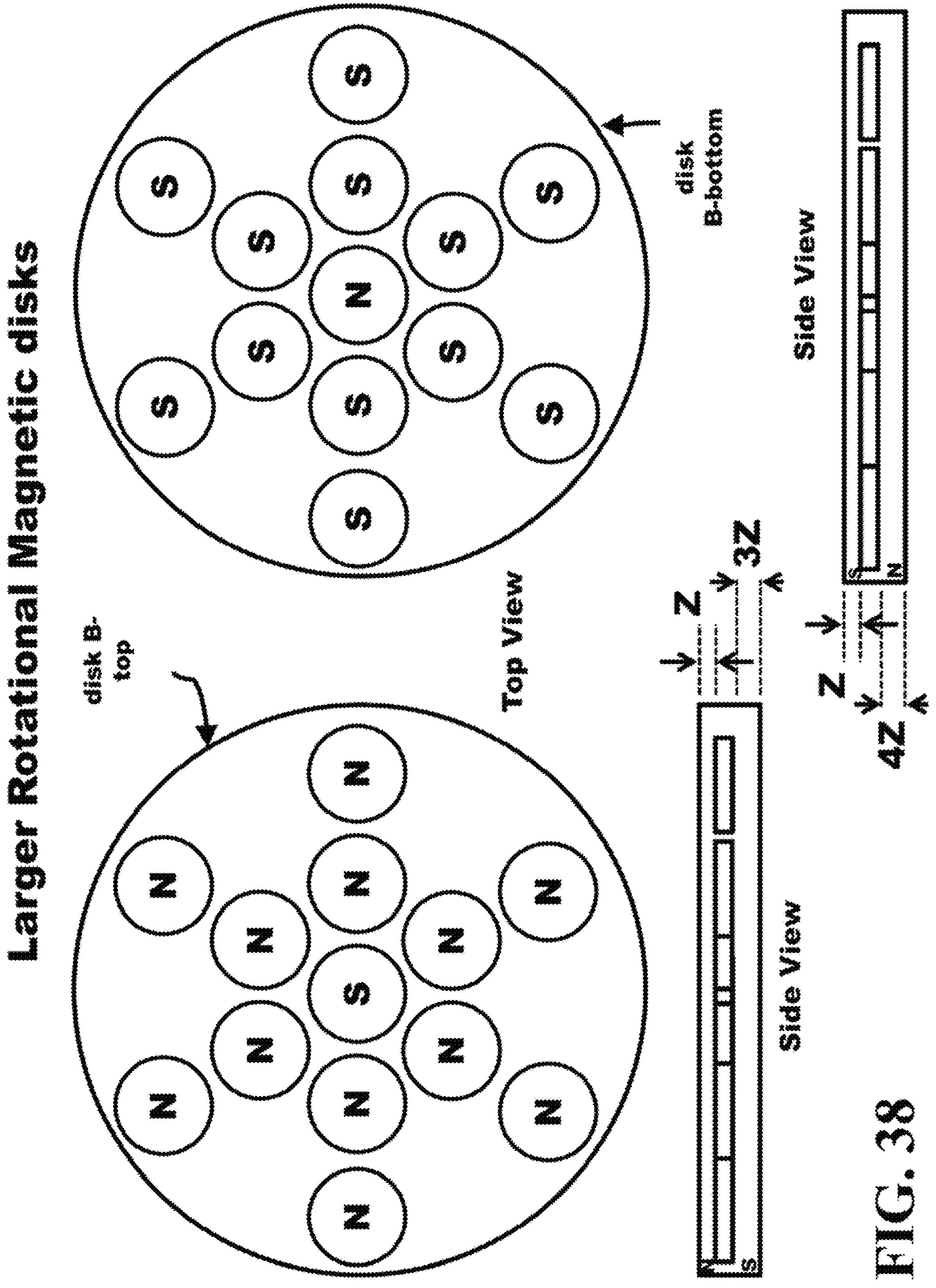
FIG. 38 depicts yet another embodiment of using a periodic magnetic arrangement to create a second larger rotational magnetic disk, one face of the magnets includes a first thickness of non-magnetic material and the other face includes a second thickness of non-magnetic material in accordance with the present disclosure.

The multi-positional magnetic attractions of FIG. 35 can be reduced by just placing the magnets radially in line in yet another embodiment as illustrated in FIG. 38 in disks 'disk-B-top' and 'disk-B-bottom.' Note that the center disc magnet is reversed in polarity from the rest; this helps keep the rotation of the disks aligned. There are six locking positions when the disk is rotated around 360°.

Figure 39:
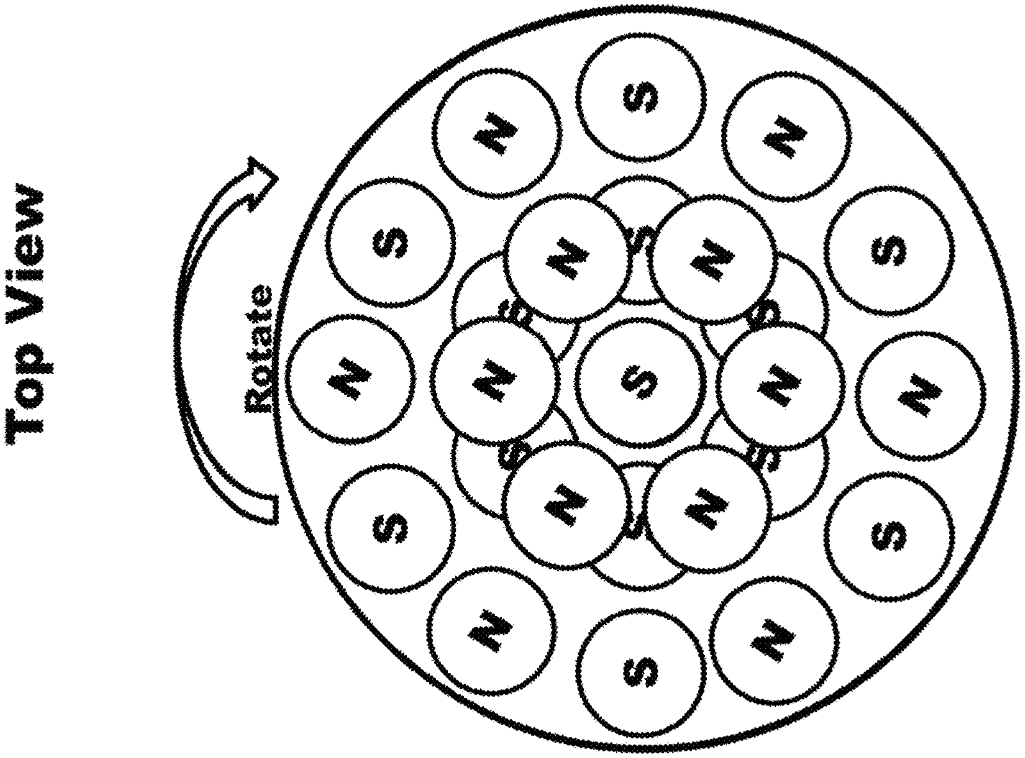
FIG. 39 illustrates the two disks arranged in the ‘second orientation stronger attraction’ where the top disk has been partially rotated the highly repulsive force presented by the disks to reach the mid-way point, where upon the disk quickly and impulsively snaps into the next allowable rotational position (note the center magnet has an opposite polarity) in accordance with the present disclosure.

The side view in FIG. 38 shows the 'north' face of the magnets is covered with a first thickness Z, while the 'south' face of the magnets is covered with a first thickness 3Z. In this case, it is a 3 to 1 ratio, but can be of other ratios as well. A top view of a 'disk B-bottom' that comprises 19 axial magnets, 'south' face up, arranged radially around a central magnet. The side view shows the 'south' face of the magnets is covered with a first thickness Y, while the 'south' face of the magnets is covered with a first thickness 3Y. This is the same ratio as in 'disk B-top' but can be other ratios as well. The diameter of the 'disk B-top' and 'disk B-bottom' are substantially sized similarly. FIG. 39 illustrates the disks of FIG. 38 at their mid-way point.

Figure 40:
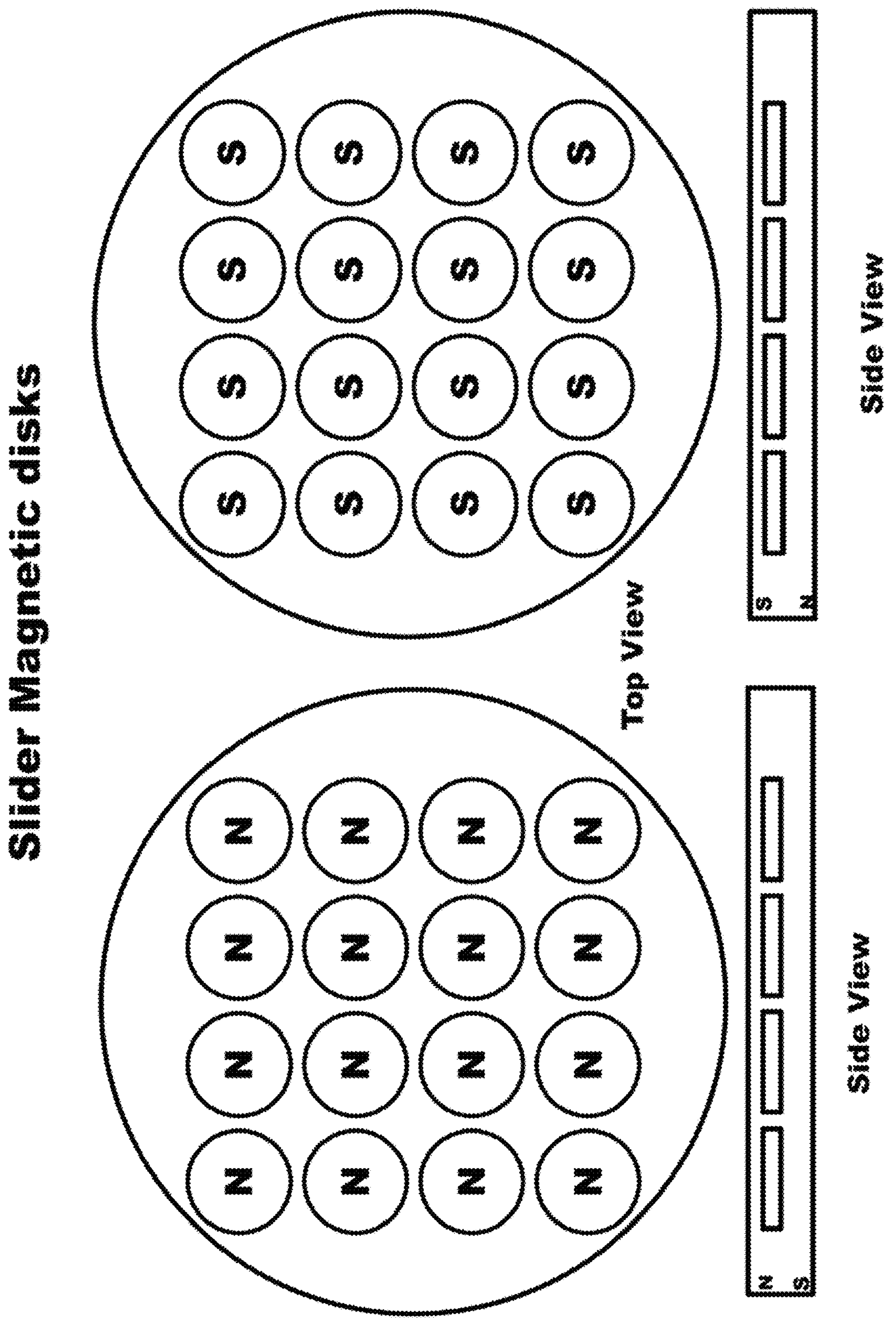
FIG. 40 shows yet another embodiment of using a periodic magnetic arrangement in a rectangular Cartesian configuration to create a slider magnetic disk, one face of the magnets includes a first thickness of non-magnetic material and the other face includes a second thickness of non-magnetic material in accordance with the present disclosure.
Figure 41:
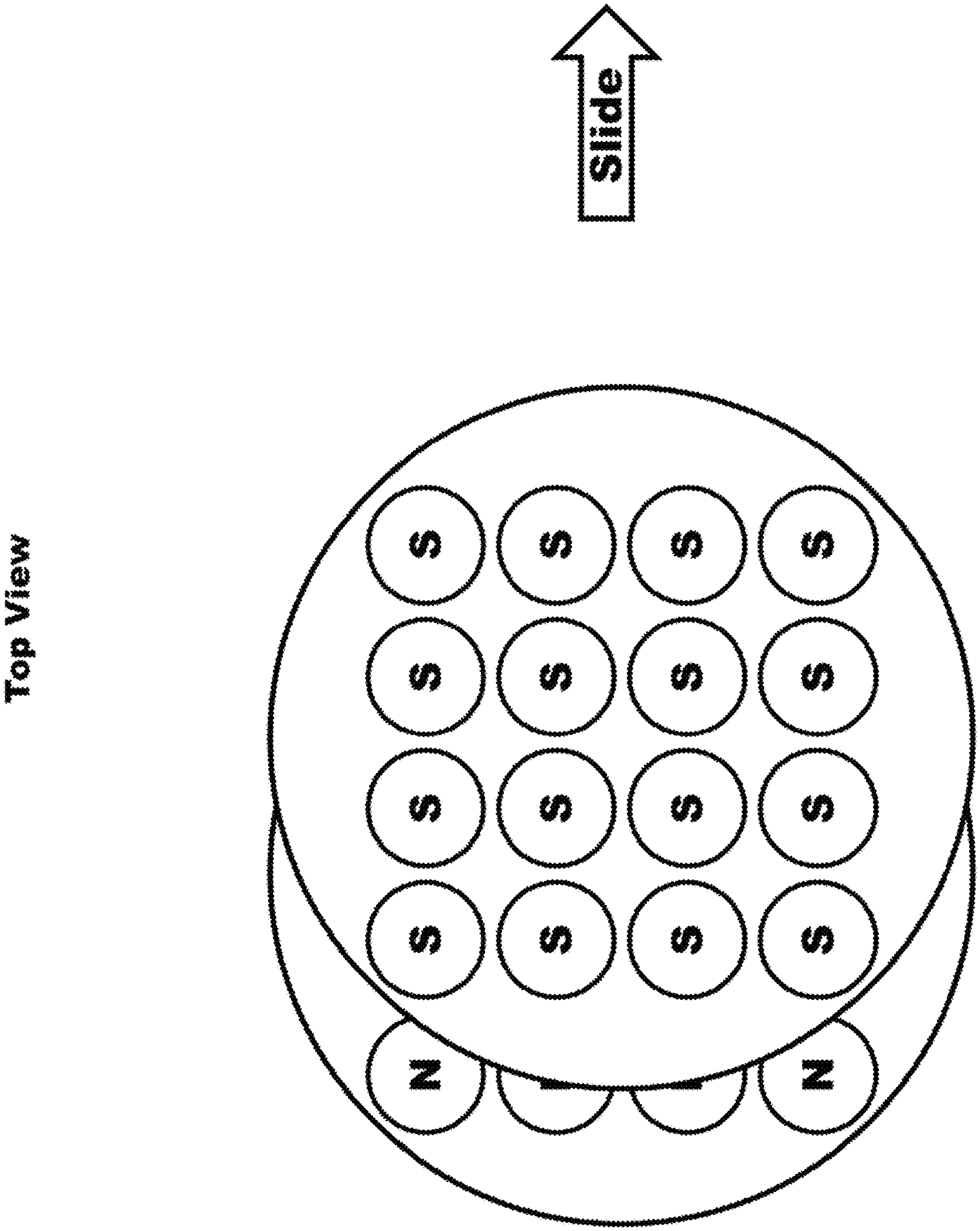
FIG. 41 depicts the upper disk having been slide to the right into the magnetic pockets of the periodic arrangement in accordance with the present disclosure.
Figure 42:
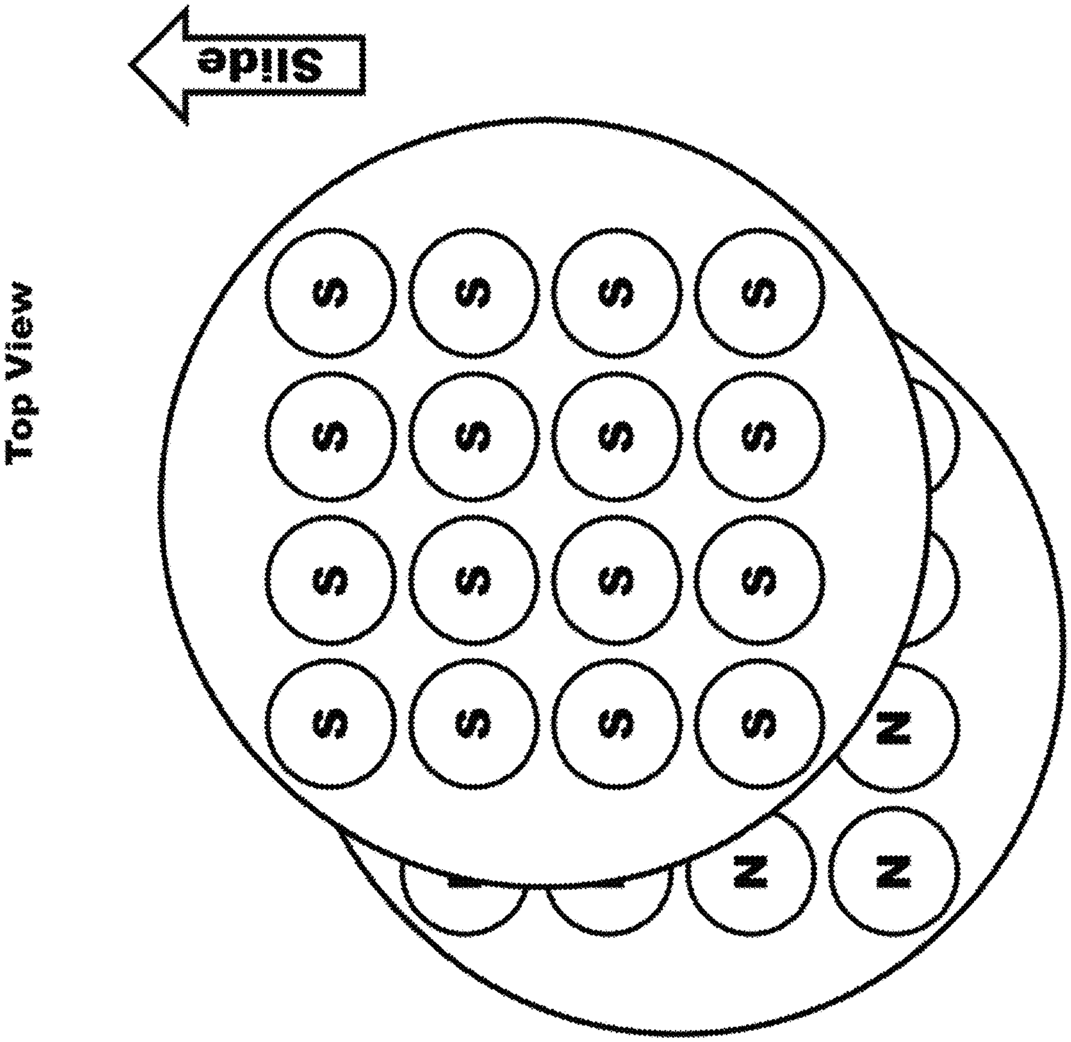
FIG. 42 illustrates the upper disk having been slide upwards one position into the magnetic pockets of the periodic arrangement in accordance with the present disclosure.

FIG. 40 presents an embodiment illustrating a different version of magnet arrangements that is based on the Cartesian coordinate system. The magnets are arranged in a grid pattern and the disks have one side covered with a first thickness of non-magnetic material, while the second side has a second thickness of non-magnetic material (shown below). FIG. 41 illustrates sliding the upper disk to the right, while FIG. 42 illustrates sliding the upper disk being slide upwards. This fidget uses sliding although the disk can also be rotated.

Figure 43A:
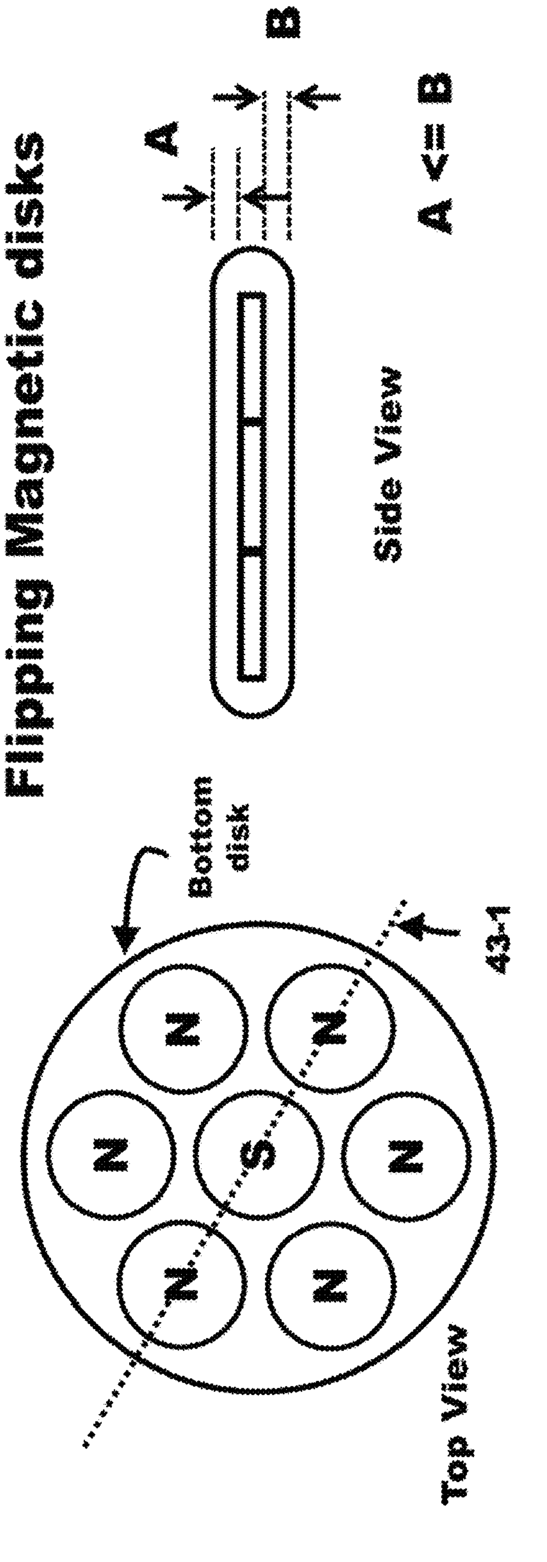
FIG. 43A illustrates one embodiment of the top view and side view of a first magnetic disk in accordance with the present disclosure.

FIG. 43A presents an embodiment showing a top and side view (along dotted line 43-1) of a bottom disk comprising 7 axially magnetized disc magnets (other possible shapes can include, square, ring, rectangular) arranged as illustrated within the non-magnetic disk. The disk section were divided in half, each half were manufactured using using a 3-D printer. In addition, the same design was machined using aluminum to form both half's. Note, in this embodiment, (other arrangements are possible) that the center magnet has a polarity (south) opposite to that of its neighbors (north). The non-magnetic material (plastics or non-magnetic metals) enclosing the magnets forms the shape and structure of the non-magnetic disk which houses and holds the magnets in place. The faces of the enclosed magnets are separated from the outer face of the non-magnetic disk by the distances A and B, where A is less than or equal to B.

Figure 43B:
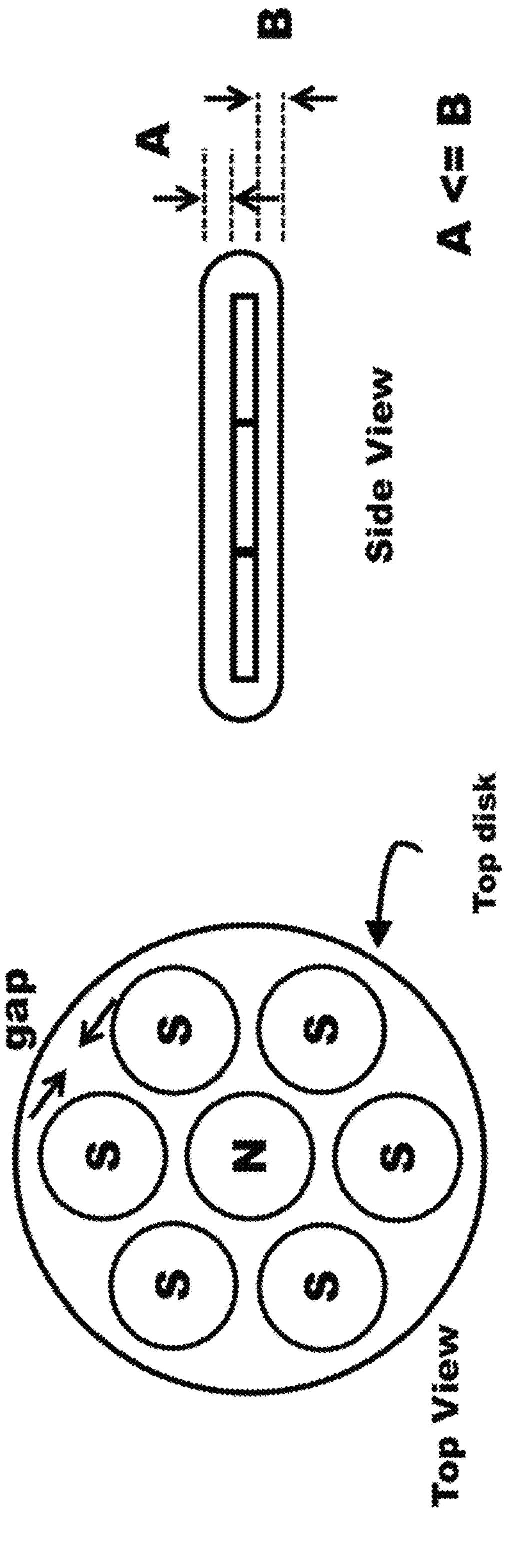
FIG. 43B shows one embodiment of the top view and side view of a second magnetic disk paired with the disk of FIG. 43A in accordance with the present disclosure.

FIG. 43B presents a top and side view of a top disk (the top and bottom disks make a pair) comprising 7 equivalently placed axially magnetized disc magnets arranged as illustrated within the non-magnetic disk. Note, in this embodiment, that the center magnet has a polarity (north) opposite to that of its neighbors (south). The non-magnetic material (plastics or non-magnetic metals) enclosing the magnets forms the shape and structure of the non-magnetic disk which houses and holds the magnets in place. The faces of the enclosed magnets are separated from the outer face of the non-magnetic disk by the distances A and B, where A is less than or equal to B. In one configuration, the edges of the magnets are separated from one another by a gap distance.

Figure 44:
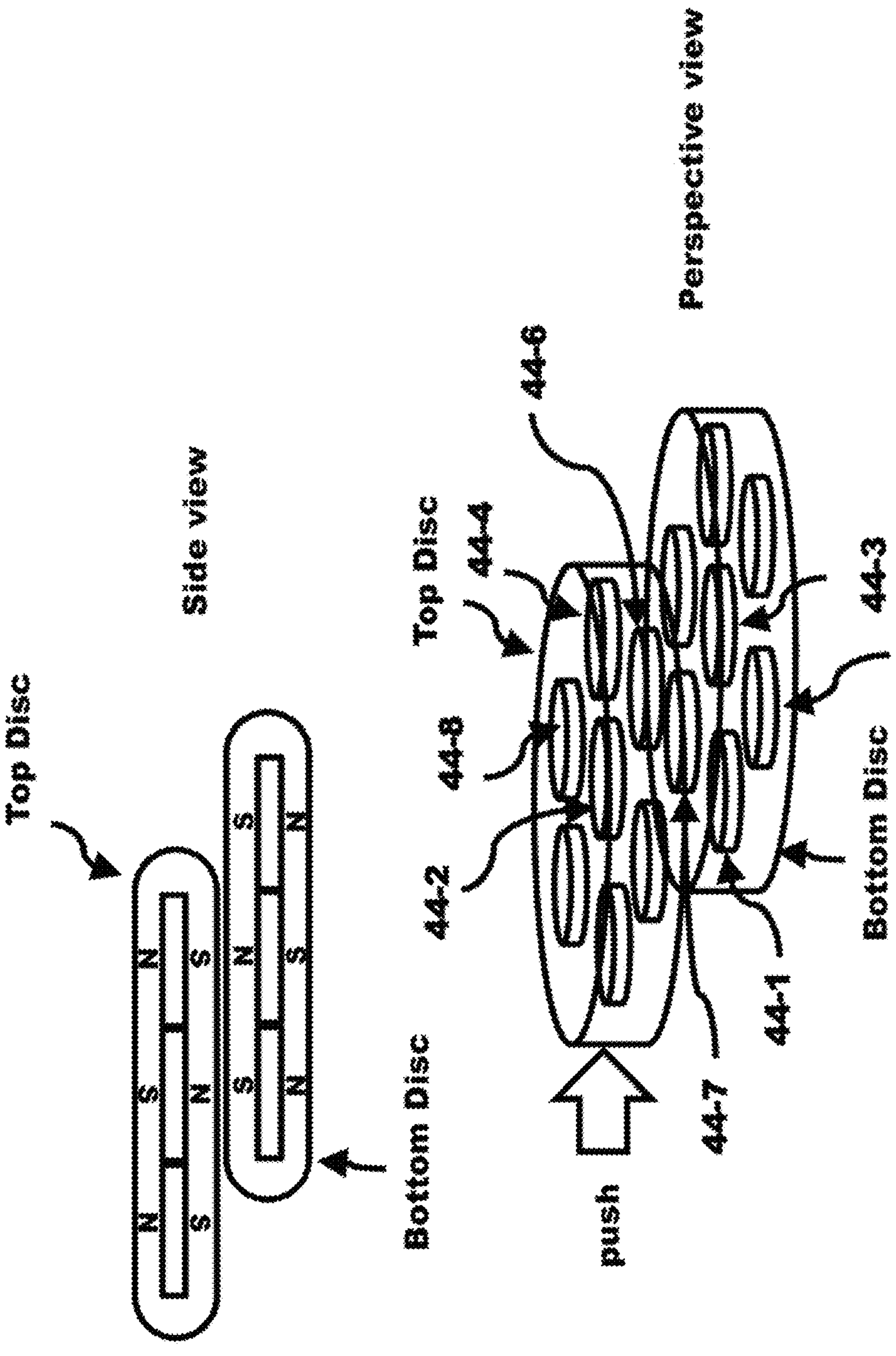
FIG. 44 depicts a side and a perspective view of an initial placement of a pair of magnetic disks in accordance with the present disclosure.
Figure 45:
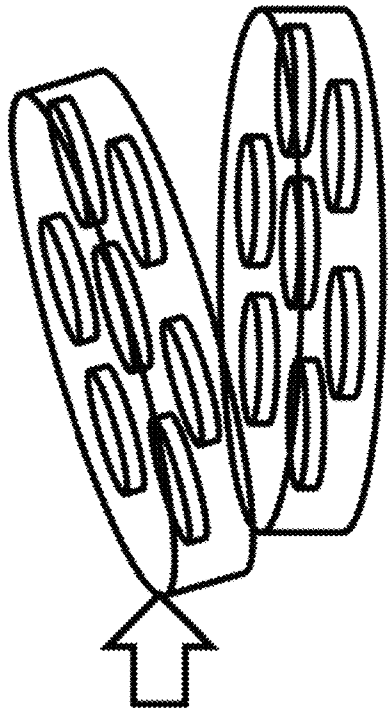
FIG. 45 illustrates a force being applied to the top disk of the assembly illustrated in FIG. 44 in accordance with the present disclosure.
Figure 46:
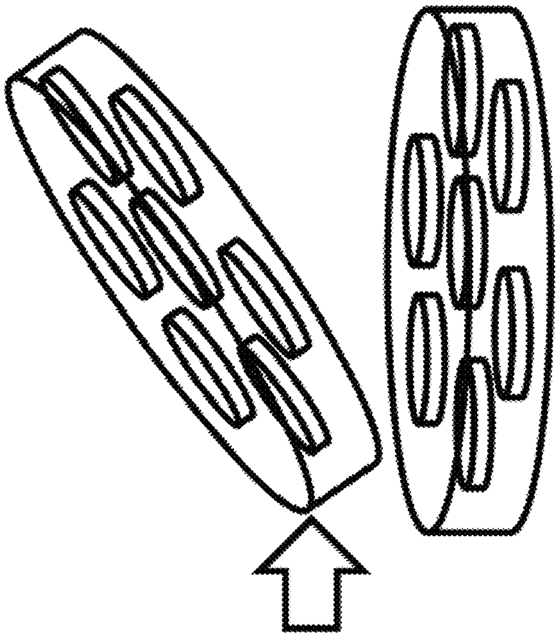
FIG. 46 through FIG. 47 shows said force being applied to the top disk and its reaction to the magnetic forces between the pair of magnetic disks in accordance with the present disclosure.
Figure 47:
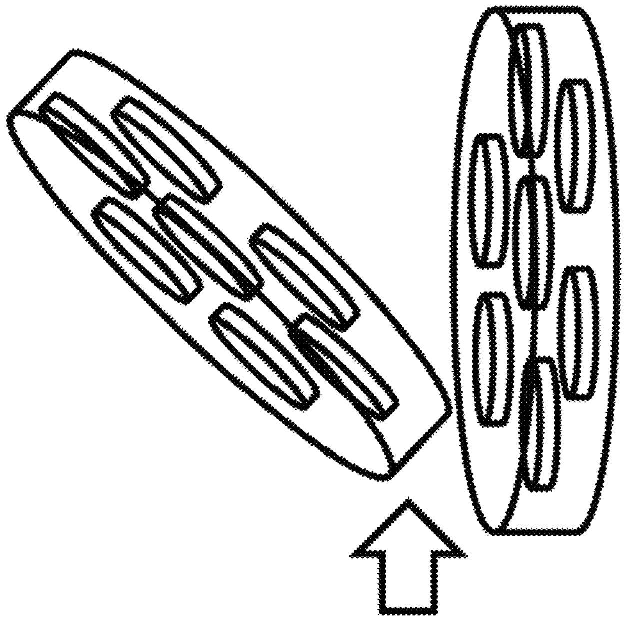
Figure 48:
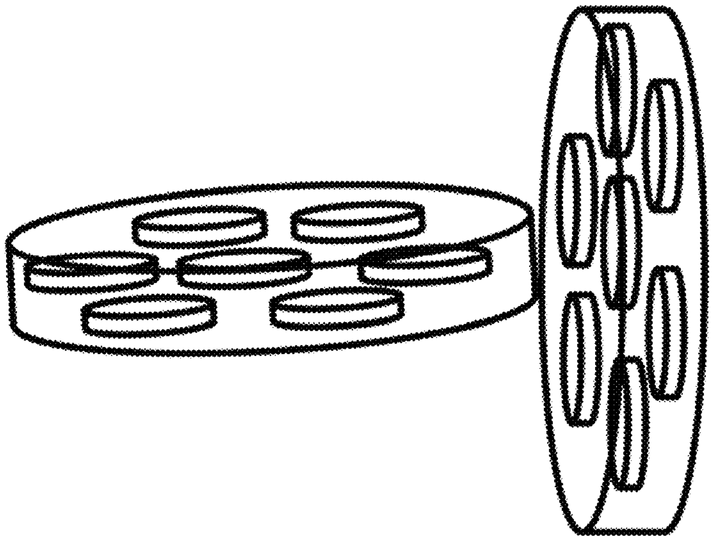
FIG. 48 through FIG. 51 depicts the reaction of the top disk after applying the previous force in accordance with the present disclosure.
Figure 49:
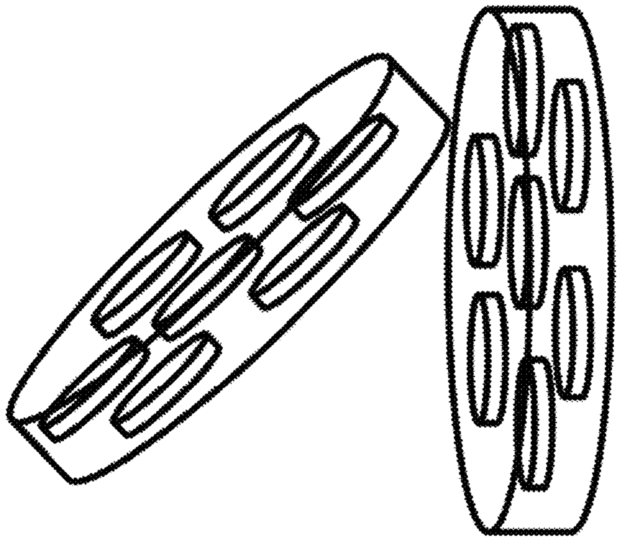
Figure 50:
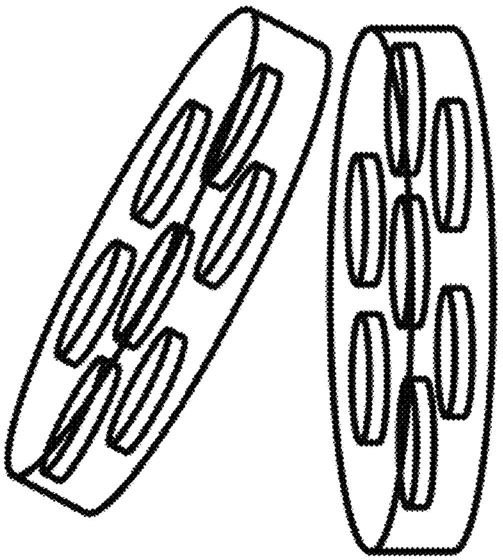
Figure 51:
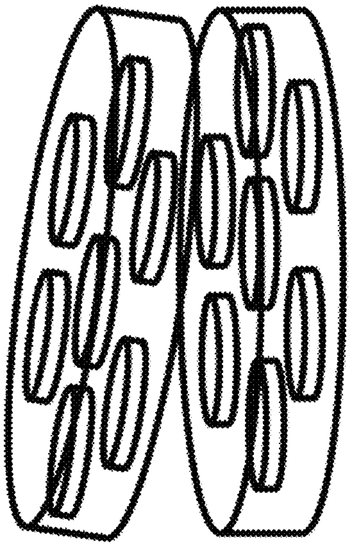

FIG. 44 illustrates a first embodiment of a configuration of the side and perspective view of the pair of magnets presented in FIG. 43. In addition, the following illustration depicts one of the many possible trajectories of the disk. The upper side of magnet 44-1 is south and is attracted to the northern polarity of the lower side of magnet 44-2. The upper side of magnet 44-3 is north and is attracted to the southern polarity of the lower side of magnet 44-4. The upper side of magnet 44-5 is south and is repelled from the southern polarity of the lower side of magnet 44-6. The upper side of magnet 44-7 is south and is repelled from the southern polarity of the lower side of magnet 44-8. When the top disk is pushed in the direction of a line formed between the centers of magnets 44-2 and 44-4, the top disk experiences a change in the magnetic interactions between the magnets of the pair (top and bottom) of disks causing the top disk to flip as illustrated in the sequence of figures of FIG. 45 through FIG. 52. To simplify the diagram, the edges of the non-magnetic disks in the perspective view have not been filleted. Getting the disks to actually flip, as illustrated, is a technique that needs to be learned and developed through practice as to better control the system.

Figure 52:
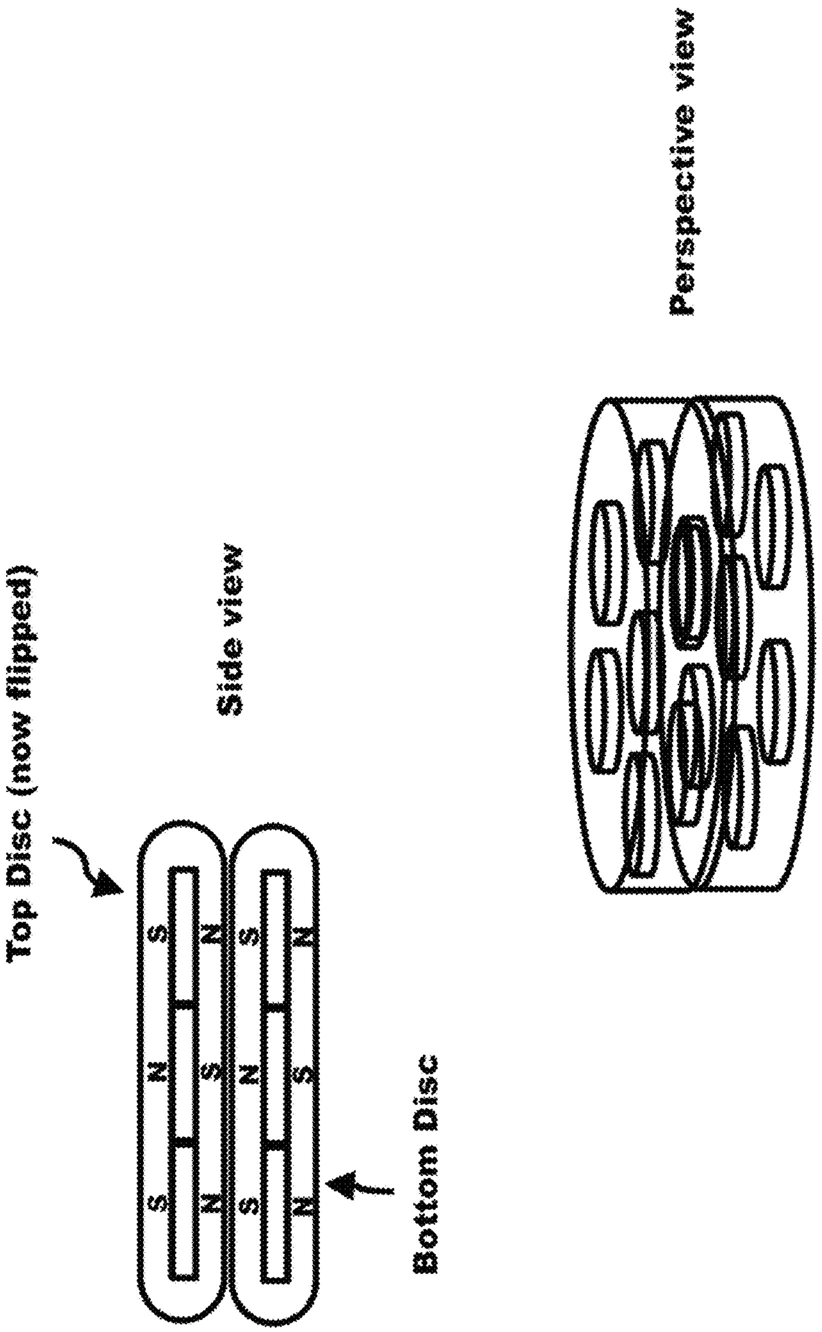
FIG. 52 illustrates a side and a perspective view of one possible final position of the top disk in relation to the bottom disk after the sequence of steps of FIG. 44 through FIG. 51 in accordance with the present disclosure.
Figure 53:
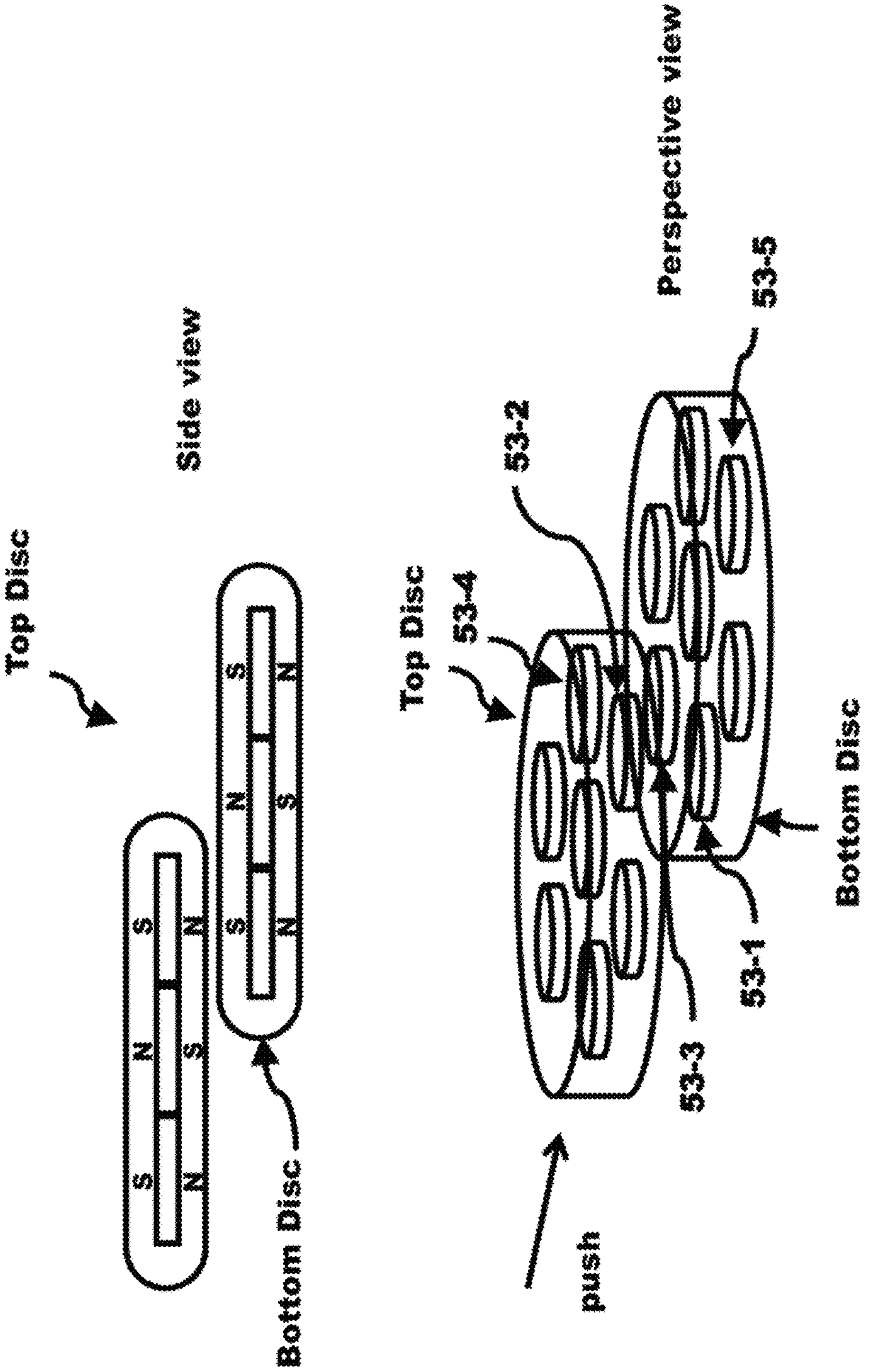
FIG. 53 depicts a side and a perspective view of another embodiment of an initial placement of a pair of magnetic disks in accordance with the present disclosure.

FIG. 53 illustrates another embodiment of a configuration of the side and perspective view of the pair of magnets presented in FIG. 43. The upper side of magnet 53-1 is south and is attracted to the northern polarity of the lower side of magnet 53-2. The upper side of magnet 53-3 is south and is attracted to the northern polarity of the lower side of magnet 53-4. When the top disk is pushed in the direction of a line formed between the centers of magnets 53-1 and 53-5, the top disk experiences a change in the magnetic interactions between the magnets of the pair (top and bottom) of disks causing the top disk to momentarily jump up, displacing the lower face of the top disk from that of the upper face of the lower disk. Once displaced, the lower faces of all of the magnets in the top disk attract the upper faces of all the magnets in the bottom disk causing the pair of disks to rapidly approach one. When the disks make contact, a snapping sound is released from the event. The final position of the pair of disks is illustrated in FIG. 52.

Figure 54:
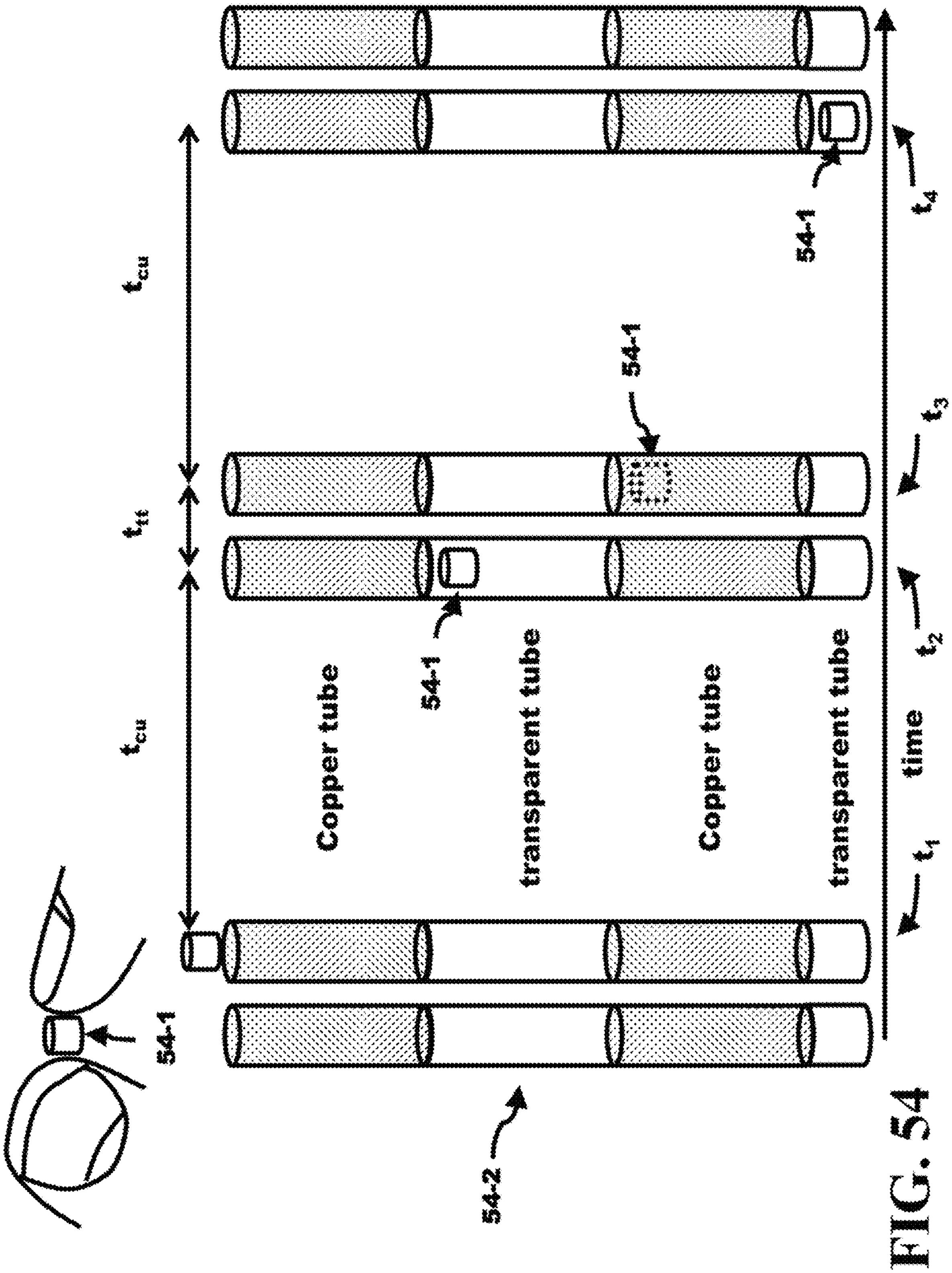
FIG. 54 depicts one embodiment of a hollow tube comprised of alternating copper sections with non-conducting transparent sections (said sections are positioned co-linearly on a common axis and directly attached to each other as illustrated) showing the time sequence of events (Lenz's law within the copper sections and absence of Lenz's law within the non-conducting sections) of a cylindrical magnet falling under the gravitational effect in said hollow tube in accordance with the present disclosure.

FIG. 54 presents a time sequence of events along the x-axis of a falling cylindrical magnet 54-1 as the magnet falls through a tube comprising of alternation sections of equal length segments (other embodiments may include unequal or different lengths) of copper tubes and plastic transparent tubes 54-2. The inside diameter of the segments are substantially equal. It is well known that a magnet falling within a copper tube (a non-ferrous metal) experiences the effect of Lenz's law. The very action of the falling magnet within the copper tube induces an electrical current in the copper tube that generates a magnetic field which opposes the force of gravity on the falling magnet; thus, the falling magnet slows down its transit through the copper tube. Thus, a magnet falling through a vertical section of said metal tube experiences a decrease in velocity due to the repelling force of Lenz's Law, while when falling through a vertical section of said transparent tube experiences an increase in velocity as the restraining force due to Lenz's Law does occur within the plastic or glass transparent tube. One of the utilities of one embodiment is a comparison of variables, the apparent weight change is sensed, is if the tube is held, of said composite tube when a magnet passes through the tube or another is the transit time through equal lengths of space, can be easily evaluated and compared by watching a magnet fall through equal lengths of said tubes.

At time $t_1$, the magnet 54-1 just enters the tube 54-2 after being released by the fingers. The magnet within the copper tube slows down its fall under gravity due to Lenz's law and comes out of the copper tube at $t_1+t_{cu}$ as illustrated at $t_2$. Now, the magnet is falling within the plastic transparent tube and experiences the full effect of gravity. In a short time period, $t_{tt}$, the magnet transits the length of the transparent tube and again enters the second copper tube at $t_2+t_{tt}$. Note that the time period of $t_{cu}$ is greater than $t_{tt}$. The falling magnet enters the second copper tube segment at $t_3$ and slows down again due to Lenz's law exiting the copper segment after a period of $t_{cu}$ as illustrated at $t_4$. Thus, a magnet falling through a vertical section of said metal tube experiences a decreased velocity while said magnet falling through a vertical section of said transparent tube experiences an increased velocity.

Figure 55:
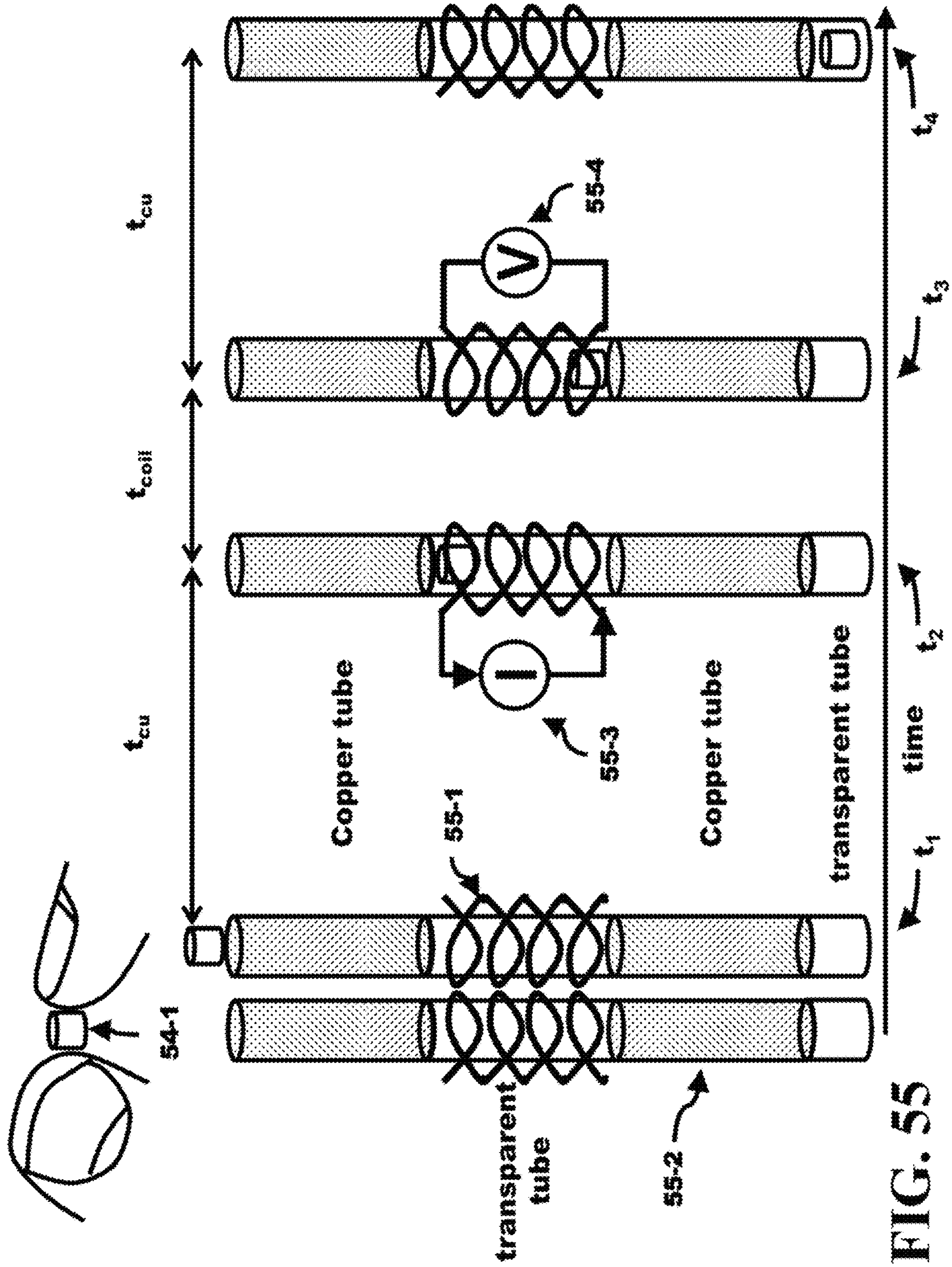
FIG. 55 illustrates a hollow tube comprised of copper and transparent non-conducting alternating sections wrapped with magnetic wire carrying current showing the time sequence of events (Lenz's law within the copper sections and a magnetic field generated by the wrapped coil within the non-conducting sections) of a cylindrical magnet falling under the gravitational effect in said hollow tube in accordance with the present disclosure.

FIG. 55 presents another embodiment of a time sequence of events along the x-axis of a falling cylindrical magnet 54-1 as the magnet falls through a tube comprising of alternation sections of equal length segments of copper tubes and plastic transparent tubes 54-2. The transparent tubes are wrapped with a conducting wire forming a coil 55-1 surrounding the plastic tube. The coil can be used to either detect a voltage 55-4 from the wire as the magnet falls through the coil or introduce a current 55-3 in the wire while the magnet is falling within the plastic tube. The current can be introduced into the coil in either a positive or negative current direction. In one case, the current in the coil creates a magnetic field within the transparent tube that slows down the falling magnet. In a second case, the current in the coil creates a magnetic field within the transparent tube that speeds up the falling magnet. One of the utilities of another embodiments allows a user to change the magnetic environment applied to a falling magnet to gain a better understanding of how magnets falling through a vertical section of said transparent tube are directly affected by the application of a current in a first direction, then, in a second case, to apply an equal but opposite current in said magnetic wire thereby allowing user to better understand the phenomena of Lenz' Law in different situations.

As mentioned earlier, the magnet falling within a copper tube experiences the effect of Lenz's law. The very action of the falling magnet within the copper tube induces an electrical current in the copper tube that generates a magnetic field which opposes the force of gravity on the falling magnet; thus, the falling magnet slows down its transit through the copper tube.

Figure 56:
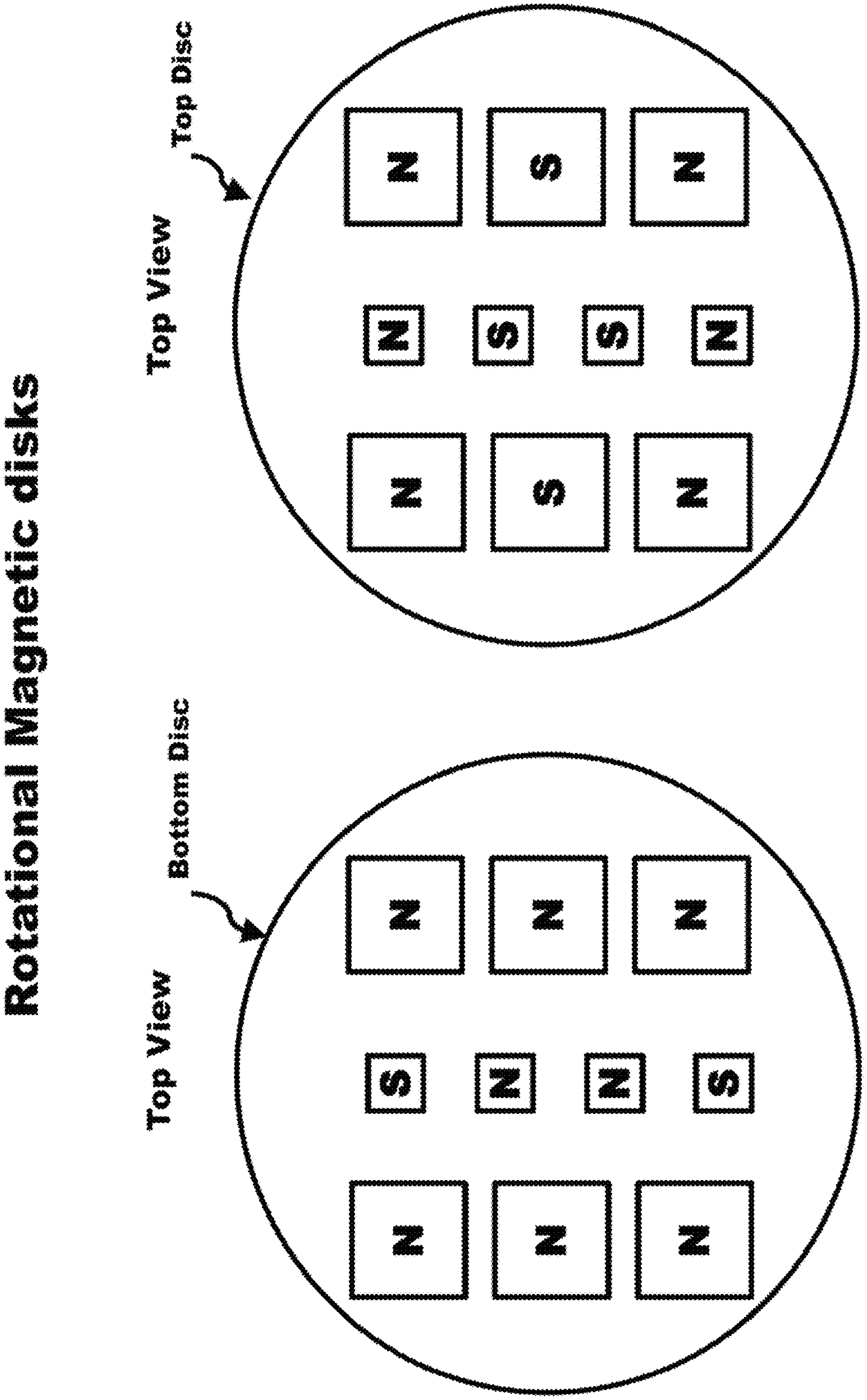
FIG. 56 shows one embodiment of the top view of a pair of magnetic disks comprising rectangular magnets in one of many possible magnet placements and orientation configurations in accordance with the present disclosure.

At time $t_1$, the magnet 54-1 just enters the tube 55-2 after being released by the fingers. The magnet within the copper tube slows down its fall under gravity due to Lenz's law and comes out of the copper tube at $t_1+t_{cu}$ as illustrated at $t_2$. Now, the magnet is falling within the plastic transparent tube wrapped by the coil 55-1 carrying a current I 55-3. The direction of the current flow can either slow down or speed up the fall of the magnet. Assuming the current I slows down the fall of the magnet and after a time period of $t_{coil}$, the magnet transits the length of the transparent tube and again enters the second copper tube at $t_2+t_{coil}=t_3$. Note that the time period of $t_{coil}$ is greater than $t_{tt}$ of FIG. 54. The falling magnet enters the second copper tube segment at $t_3$ and slows down again due to Lenz's law exiting the copper segment after a period of $t_{cu}$ as illustrated at $t_4$. Note the current if it had been reversed in direction during the fall which would speed up the fall of the magnet. Thus, a magnet falling through a vertical section of said transparent tube experiences a decreased velocity when current flows in a first direction within said magnetic wire and an increased velocity when current flows in a direction opposite to said first direction within said magnetic wire FIG. 56 depicts an embodiment of the use of magnets having a square or rectangular shape within the pair of disks. The number of magnets, their magnetic orientation (N or S up) on one disk or between the disks, the positioning of the magnets relative to each other, the magnetic strength of the individual magnets, the shape of the disk (circular, square, etc.), the size of the disk are some of the parameters that can be varied to create various embodiments of this disclosure.

Figure 57:
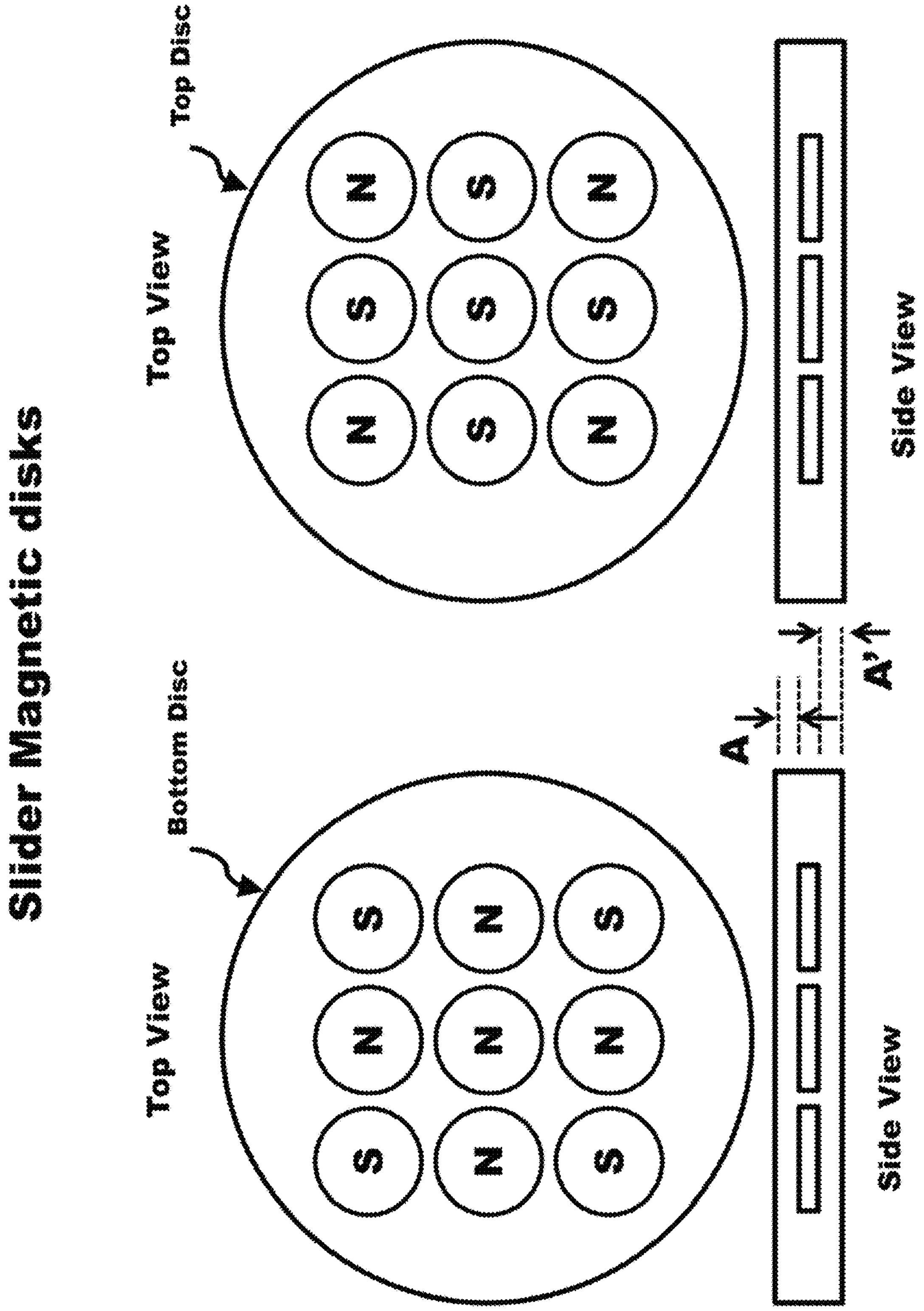
FIG. 57 depicts one embodiment of the top view of a pair of magnetic disks comprising magnets arranged in position and orientation of one embodiment in accordance with the present disclosure.

FIG. 57 presents another embodiment of magnetic arrangement and orientation within the pair of discs. The orientation uses magnets of a first orientation along the x and y axes while the other orientation is used in the four corners of the pattern. The faces of the disks are displaced from the face of the magnetic with a distance of either A or A', where A is less than or equal to A'.

Finally, it is understood that the above description are only illustrative of the principles of the current invention. It is understood that the various embodiments of the invention, although different, are not mutually exclusive. In accordance with these principles, those skilled in the art may devise numerous modifications without departing from the spirit and scope of the invention. Variations can be made to FIG. 33, for example, the 2Y side can have a handle, of sorts. Because of the handle there would only be the possibly of just a single orientation, that of the 'First Orientation,' but a handle may be very helpful to turn the disk. Although, the system and disk configurations have used the disc magnets to construct these systems, other types of magnets; block, ring, cylindrical, and spherical can be used. The central magnet in FIG. 28A and FIG. 28B can be flipped in magnetic moment to help keep the disk move in an annular fashion. The fidget toy can be made very versatile and unique; for example, in the 'disk bottom,' place and attached the magnets in random positions (locations on the disk) and in random magnetic orientations ('north', 'south'). The 'disk top' is then placed face-to-face to the 'disk bottom;' magnets added to the top disk automatically align their positions by magnetic attraction to its compliment in the 'disk bottom.' Add and attach magnets to the 'disk top' until all magnets in the 'disk bottom' are matched. Due to the randomness, when the 'disk top' is rotated, there will be combinations of attractions and repulsions causing the disks to experience a wavy movement during rotation. In one of the experimental embodiments of the magnetic disks, one of the quests is flip the disk several times within a given time. The weight (mass) of the disks can be varied to cause more than one flip of the disk. The weight (mass) of the disk, a strength of its encapsulated magnets, pattern or arrangement of the positions of the magnets, direction of the positions of the magnets, are some of the variables defining the various embodiments described in the present document. Plastics for the non-magnetic material may be comprised of Acrylonitrile Butadiene Styrene (ABS), High-Density Polyethylene (HDPE), Nylon, Polypropylene (PP), Polycarbonate (PC), etc. In place of plastic, glass can be used. Some non-magnetic metals include aluminum, brass, copper, gold, silver, platinum, etc. Various embodiments of the magnetic chute and magnetic disks were manufactured using 3-D printing system. In addition, aluminum blanks were machined to form at least one of the embodiments of the magnetic disks.

What is claimed is:

1. An upper disk positioned over a lower disk, each disk comprising:

an upper planar surface, a first plane, a second plane, and a lower planar surface, all arranged in said given order from top to bottom, respectively, wherein all surfaces and planes are substantially parallel to one another;

a central magnet with its south face aligned to said first plane and its north face aligned to said second plane, wherein said central magnet is substantially located in a central portion of said disk; and a plurality of magnets arranged in a radial pattern around said central magnet, wherein a north face of said plurality of magnets is aligned to said first plane and a south face of said plurality of magnets is aligned to said second plane; and wherein, in a first configuration, when said upper disk is placed over said lower disk and said south face of both said central magnets points upwards, a first attractive position between said disks occurs when said upper disk is placed offset over and in contact with said lower disk, wherein a first magnetic force between said disks attaches and holds said two disks together, wherein when said upper disk is forcefully pushed in a first linear direction to align said upper disk over said lower disk, said upper disk momentarily jumps and becomes magnetically attracted to said lower disk in a second attractive position, said second attractive position is where said upper disk is substantially superimposed and aligned over said lower disk, wherein a second magnetic force between said disks occurs where all magnets between said two discs are attracting each other in said second attractive position, wherein, in a second configuration, when said upper disk is placed over said lower disk and said south face of said central magnet of said lower disk points upwards and said central magnet of said upper disk points downward, a third attractive position between said disks occurs when said upper disk is placed offset over and in contact with said lower disk, wherein a third magnetic force between said disks attaches and holds said two disks together, wherein when said upper disk is forcefully pushed in a second linear direction to align said upper disk over said lower disk, said upper disk is magnetically repelled from said lower disk, and wherein said upper disk, flips one or more times, and lands back on said lower disk, and said upper disk magnetically attaches to said lower disk in either one of said first, second, or third attractive positions.

2. The apparatus of claim 1, wherein said upper planar surface is separated from said first plane by a first distance and said second plane is separated from said lower planar surface by a second distance.

3. The apparatus of claim 1, wherein said plurality of magnets have substantially identical characteristics and substantially equal magnetic moments.

4. The apparatus of claim 1, wherein said central magnets have substantially identical characteristics as said plurality of magnets and equal or greater magnetic moment than said plurality of magnets.

5. The apparatus of claim 1, wherein said plurality of magnets and said central magnet are axial magnetized disk magnets.

6. The apparatus of claim 1, wherein said magnets are secured in place within said disk which is fabricated using a non-magnetic material.

7. The apparatus of claim 6, wherein an injection molding machine is used to manufacture said non-magnetic material of said disks.

8. An apparatus, comprising:

a first disk further comprising:

a magnetic arrangement of a north face of a first plurality of magnets aligned to a first plane and a corresponding south face aligned to a second plane, said first plurality of magnets arranged in a radial pattern around a first central magnet, a south face and a north face of said first central magnet are aligned to said first plane and said second plane, respectively, wherein said first plane is displaced by a first distance from an upper planar surface of said first disk and said second plane is displaced by a second distance from a lower planar surface of said first disk; and a second disk that is identical to said first disk, wherein, in a first configuration, when said second disk is placed over said first disk and said south face of both said central magnets point upwards, a first attractive position between said disks occurs when said second disk is placed offset over and in contact with said first disk, wherein a first magnetic force between said disks attaches and holds said two disks together, wherein when said second disk is forcefully pushed in a first linear direction to align said second disk over said first disk, said second disk momentarily jumps and becomes magnetically attracted to said first disk in a second attractive position, said second attractive position is where said second disk is substantially superimposed and aligned over said first disk, wherein a second magnetic force between said disks occurs where all magnets between said two discs are attracting each other in said second attractive position, wherein, in a second configuration, when said second disk is placed over said first disk and said south face of said central magnet of said first disk points upwards and said central magnet of said second disk points downward, a third attractive position between said disks occurs when said second disk is placed offset, over, and in contact with said first disk, wherein a third magnetic force between said disks attaches and holds said two disks together, wherein when said second disk is forcefully pushed in a second linear direction to align said second disk over said first disk, said second disk is magnetically repelled from said first disk, and wherein said second disk flips 180 degrees and lands back on said first disk, and said second disk magnetically attaches to said first disk in either said first attractive position or said second attractive position.

9. The apparatus of claim 8, wherein said radial pattern of said plurality of magnets of said first disk is identical to and matches said radial pattern of said plurality of magnets in said second disk.

10. The apparatus of claim 8, wherein said upper planar surface, said first plane, said second plane, and said lower planar surface are arranged in order from top to bottom, respectively, and are parallel to each other.

11. The apparatus of claim 8, wherein said plurality of magnets have substantially identical characteristics and substantially equal magnetic moments.

12. The apparatus of claim 8, wherein said central magnets have substantially identical characteristics as said plurality of magnets and equal or greater magnetic moment than said plurality of magnets.

13. The apparatus of claim 8, wherein said plurality of magnets and said central magnet are axial magnetized disk magnets.

14. The apparatus of claim 8, wherein said magnets are secured in place within said disks which is fabricated using a non-magnetic material.

15. The apparatus of claim 14, wherein said non-magnetic material is either copper or aluminum.

16. A magnetic apparatus comprising: an upper disk comprising;

a magnetic arrangement of a north face of a first plurality of magnets aligned to a first plane and a corresponding south face aligned to a second plane, said first plurality of magnets arranged in a radial pattern around a first central magnet, a south face and a north face of said first central magnet are aligned to said first plane and said second plane, respectively, wherein said first plane is displaced by a first distance from an upper planar surface of said first disk and said second plane is displaced by a second distance from a lower planar surface of said first disk, wherein said upper planar surface, said first plane, said second plane, and said lower planar surface are arranged in order from top to bottom, respectively, and are parallel to each other; and a lower disk identical to said upper disk, and wherein in a first configuration, when said upper disk is placed over said lower disk and said south face of both said central magnets points upwards, a first attractive position between said disks occurs when said upper disk is placed offset over and in contact with said lower disk, wherein a first magnetic force between said disks attaches and holds said two disks together, wherein when said upper disk is forcefully pushed in a first linear direction to align said upper disk over said lower disk, said upper disk momentarily jumps and becomes magnetically attracted to said lower disk in a second attractive position, said second attractive position is where said upper disk is substantially superimposed and aligned over said lower disk, wherein a second magnetic force between said disks occurs where all magnets between said two discs are attracting each other in said second attractive position, wherein, in a second configuration, when said upper disk is placed over said lower disk and said south face of said central magnet of said lower disk points upwards and said central magnet of said upper disk points downward, a third attractive position between said disks occurs when said upper disk is placed offset over and in contact with said lower disk, wherein a third magnetic force between said disks attaches and holds said two disks together, wherein when said upper disk is forcefully pushed in a second linear direction to align said upper disk over said lower disk, said upper disk is magnetically repelled from said lower disk, and wherein said upper disk flips 360 degrees and lands back on said lower disk, and said upper disk magnetically attaches to said lower disk in said third attractive position.

17. The apparatus of claim 16, wherein said plurality of magnets have substantially identical characteristics and substantially equal magnetic moments.

18. The apparatus of claim 16, wherein said central magnets have substantially identical characteristics as said plurality of magnets and equal or greater magnetic moment than said plurality of magnets.

19. The apparatus of claim 16, wherein said plurality of magnets and said central magnet are axial magnetized disk magnets.

20. The apparatus of claim 16, wherein said magnets are secured in place within said disk which is fabricated using a non-magnetic material.

* * * * *